United States Patent
Idehara

(10) Patent No.: US 7,376,109 B2
(45) Date of Patent: May 20, 2008

(54) DATA COMMUNICATION SYSTEM, DATA COMMUNICATION DEVICE, PROGRAM PRODUCT FOR CONTROLLING DATA COMMUNICATION DEVICE, AND PORTABLE TERMINAL

(75) Inventor: Takenori Idehara, Yokohama (JP)

(73) Assignee: Minolta Co., Ltd., Osaka-shi (JP)

( * ) Notice: Subject to any disclaimer, the term of this patent is extended or adjusted under 35 U.S.C. 154(b) by 952 days.

(21) Appl. No.: 10/214,733

(22) Filed: Aug. 9, 2002

(65) Prior Publication Data

US 2003/0031155 A1    Feb. 13, 2003

(30) Foreign Application Priority Data

Aug. 10, 2001    (JP)    ............................. 2001-243244

(51) Int. Cl.
  *H04Q 7/24*    (2006.01)
(52) U.S. Cl. .................... 370/338; 370/329; 455/452.2
(58) Field of Classification Search ..................... None
  See application file for complete search history.

(56) References Cited

U.S. PATENT DOCUMENTS

| | | | |
|---|---|---|---|
| 6,201,962 B1 * | 3/2001 | Sturniolo et al. | 455/432.2 |
| 6,438,376 B1 * | 8/2002 | Elliott et al. | 455/437 |
| 6,751,465 B2 * | 6/2004 | Nakada | 455/512 |
| 6,757,269 B2 * | 6/2004 | Dorenbosch et al. | 370/338 |
| 6,873,850 B2 * | 3/2005 | Dowling et al. | 455/456.1 |
| 6,879,584 B2 * | 4/2005 | Thro et al. | 370/352 |
| 6,982,962 B1 * | 1/2006 | Lunsford et al. | 370/278 |
| 2001/0030950 A1 * | 10/2001 | Chen et al. | 370/329 |
| 2002/0181416 A1 * | 12/2002 | Lee et al. | 370/327 |

FOREIGN PATENT DOCUMENTS

| | | |
|---|---|---|
| JP | 2000-287055 | 10/2000 |
| JP | 2001-128237 | 5/2001 |
| JP | 2001-237885 | 8/2001 |

* cited by examiner

*Primary Examiner*—Chi Pham
*Assistant Examiner*—Kevin Mew
(74) *Attorney, Agent, or Firm*—Morrison & Foerster LLP

(57) ABSTRACT

A data communication device includes the first interface for communicating with a portable terminal and the second interface for communicating with another communication device. The data communication device makes a judgment as to whether the first connection format for communication with the portable terminal via the first interface should be allowed when the data communication device receives the first connection request from the portable terminal via the first interface, selects another communication device that is capable of communicating with the portable terminal when the first connection format is not allowed, and transmits to the portable terminal the connection information concerning the second connection format for communication with the portable terminal via the selected another communication device and the second interface.

4 Claims, 57 Drawing Sheets

| ID | SERVER ID INFORMATION | CLIENT ID INFORMATION | RELAY TERMINAL ID INFORMATION |
|---|---|---|---|
| 11112323 | IP Ooo.xxx.oxx.xxx | 2222-3563-5622 | IP Ooo.xxx.ooo.oxx |

FIG. 24

| JOB ID | ID | SERVER ID INFORMATION | CLIENT ID INFORMATION | RELAY TERMINAL ID INFORMATION | COMMUNICATION PROCESS NAME | EXECUTION STATUS |
|---|---|---|---|---|---|---|
| 1 | 11112321 | OWN DEVICE | 1234-1234-1234 | FINISHED | DELETED | FINISHED |
| 2 | 11112322 | OWN DEVICE | 2244-5563-7123 | NO | NORMAL 8 | IN EXECUTION |
| 3 | 11112323 | OWN DEVICE | 2222-3563-5622 | Ooo.xxx.ooo.oxx | NORMAL 1 | IN EXECUTION |
| 4 | 11112324 | Ooo.xxx.oxx.xxx | 2244-5563-7777 | OWN DEVICE | RELAY 2 | IN EXECUTION |
| 5 | 11112325 | OWN DEVICE | 2255-3555-8583 | Ooo.xxx.ooo.ooo | NORMAL 3 | IN EXECUTION |
| 6 | 11112326 | OWN DEVICE | 2255-3777-8583 | FINISHED | DELETED | FINISHED |
| 7 | 11112327 | OWN DEVICE | 2255-3555-8583 | Ooo.xxx.ooo.oxx | NORMAL 5 | IN EXECUTION |
| 8 | 11112329 | OWN DEVICE | Ooo.xxx.oox.oxx | NO | NORMAL 9 | IN EXECUTION |
| 9 | 11112330 | Ooo.xxx.oox.ooo | OWN DEVICE | NO | NORMAL 10 | IN EXECUTION |

FIG. 25

| CONNECTION | CONNECTION DESTINATION |
|---|---|
| SWITCHING CONNECTION | IP Ooo.xxx.ooo.oxx |

FIG. 26

| CONNECTION |
|---|
| CONNECTION APPROVAL |

FIG. 27

| CONNECTING PARTNER DEVICE | CONNECTION RESULT | CONNECTION CONFIRMATION DEVICE | CONNECTION CONFIRMATION DEVICE ID INFORMATION |
|---|---|---|---|
| 2255-3555-8583 | NON-CONNECTABLE | FAX | IP Ooo.xxx.ooo.oxx |

FIG. 28

| CONNECTING PARTNER DEVICE | CONNECTION RESULT | CONNECTION CONFIRMATION DEVICE | CONNECTION CONFIRMATION DEVICE ID INFORMATION |
|---|---|---|---|
| 2255-3555-8583 | CONNECTABLE | FAX | IP Ooo.xxx.ooo.oxx |

FIG. 29

| CONNECTING PARTNER DEVICE | CONNECTABLE DEVICE | CONNECTABLE DEVICE ID INFORMATION |
|---|---|---|
| PORTABLE TERMINAL40B 2222-3563-5622 | FAX | IP Ooo.xxx.ooo.oxx |
| | CORY | IP Ooo.xxx.ooo.oox |
| | PC | IP Ooo.xxx.ooo.oxo |
| | PRINTER | IP Ooo.xxx.ooo.ooo |

FIG. 58

| CONNECTING PARTNER DEVICE | CONNECTION RESULT | CONNECTION CONFIRMATION DEVICE | CONNECTION CONFIRMATION DEVICE ID INFORMATION | RESPONSE TIME THRESHOLD VALUE |
|---|---|---|---|---|
| 2255-3555-8583 | NON-CONNECTABLE | FAX | IP Ooo.xxx.ooo.oxx | 0.3 S |

FIG. 59

| CONNECTING PARTNER DEVICE | CONNECTION RESULT | CONNECTION CONFIRMATION DEVICE | CONNECTION CONFIRMATION DEVICE ID INFORMATION | RESPONSE TIME THRESHOLD VALUE |
|---|---|---|---|---|
| 2255-3555-8583 | CONNECTABLE | FAX | IP Ooo.xxx.ooo.oxx | 0.3 S |

FIG. 60

| CONNECTING PARTNER DEVICE | CONNECTABLE DEVICE | CONNECTABLE DEVICE ID INFORMATION | RESPONSE TIME THRESHOLD VALUE |
|---|---|---|---|
| PORTABLE TERMINAL40B 2222-3563-5622 | FAX | IP Ooo.xxx.ooo.oxx | 0.3 S |
| | CORY | IP Ooo.xxx.ooo.oox | 0.5 S |
| | PC | IP Ooo.xxx.ooo.oxo | 0.7 S |
| | PRINTER | IP Ooo.xxx.ooo.ooo | 0.3 S |

FIG. 61

| JOB ID | ID | SERVER ID INFORMATION | CLIENT ID INFORMATION | RELAY TERMINAL INFORMATION | COMMUNICATION PROCESS NAME | EXECUTION STATUS | RESPONSE TIME THRESHOLD VALUE |
|---|---|---|---|---|---|---|---|
| 1 | 11112321 | OWN DEVICE | 1234-1234-1234 | FINISHED | DELETED | FINISHED | FINISHED |
| 2 | 11112322 | OWN DEVICE | 2244-5563-7123 | NO | NORMAL 8 | IN EXECUTION | 0.1 S |
| 3 | 11112323 | OWN DEVICE | 2222-3563-5622 | Ooo.xxx.ooo.oxx | NORMAL 1 | IN EXECUTION | 0.2 S |
| 4 | 11112324 | Ooo.xxx.oxx.xxx | 2244-5563-7777 | OWN DEVICE | RELAY 2 | IN EXECUTION | 0.3 S |
| 5 | 11112325 | OWN DEVICE | 2255-3555-8583 | Ooo.xxx.ooo.ooo | NORMAL 3 | IN EXECUTION | 0.4 S |
| 6 | 11112326 | OWN DEVICE | 2255-3777-8583 | FINISHED | DELETED | FINISHED | FINISHED |
| 7 | 11112327 | OWN DEVICE | 2255-3555-8583 | Ooo.xxx.ooo.oxx | NORMAL 5 | IN EXECUTION | 0.5 S |
| 8 | 11112329 | OWN DEVICE | Ooo.xxx.oox.oxx | NO | NORMAL 9 | IN EXECUTION | NO |
| 9 | 11112330 | Ooo.xxx.oox.ooo | OWN DEVICE | NO | NORMAL 10 | IN EXECUTION | NO |

FIG. 62

| CONNECTING PARTNER DEVICE | CONNECTION RESULT | CONNECTION CONFIRMATION DEVICE | CONNECTION CONFIRMATION DEVICE ID INFORMATION | CONNECTION COUNT THRESHOLD VALUE |
|---|---|---|---|---|
| 2255-3555-8583 | NON-CONNECTABLE | FAX | IP Ooo.xxx.ooo.oxx | 1 |

FIG. 63

| CONNECTING PARTNER DEVICE | CONNECTION RESULT | CONNECTION CONFIRMATION DEVICE | CONNECTION CONFIRMATION DEVICE ID INFORMATION | CONNECTION COUNT THRESHOLD VALUE |
|---|---|---|---|---|
| 2255-3555-8583 | CONNECTABLE | FAX | IP Ooo.xxx.ooo.oxx | 1 |

FIG. 64

| CONNECTING PARTNER DEVICE | CONNECTABLE DEVICE | CONNECTABLE DEVICE ID INFORMATION | CONNECTION COUNT THRESHOLD VALUE |
|---|---|---|---|
| PORTABLE TERMINAL40B 2222-3563-5622 | FAX | IP Ooo.xxx.ooo.oxx | 1 |
| | CORY | IP Ooo.xxx.ooo.oox | 2 |
| | PC | IP Ooo.xxx.ooo.oxo | 3 |
| | PRINTER | IP Ooo.xxx.ooo.ooo | 4 |

FIG. 65

| JOB ID | ID | SERVER ID INFORMATION | CLIENT ID INFORMATION | RELAY TERMINAL INFORMATION | COMMUNICATION PROCESS NAME | EXECUTION STATUS | CONNECTION COUNT THRESHOLD VALUE |
|---|---|---|---|---|---|---|---|
| 1 | 11112321 | OWN DEVICE | 1234-1234-1234 | FINISHED | DELETED | FINISHED | FINISHED |
| 2 | 11112322 | OWN DEVICE | 2244-5563-7123 | NO | NORMAL 8 | IN EXECUTION | 2 |
| 3 | 11112323 | OWN DEVICE | 2222-3563-5622 | Ooo.xxx.ooo.oxx | NORMAL 1 | IN EXECUTION | 5 |
| 4 | 11112324 | Ooo.xxx.xxx.xxx | 2244-5563-7777 | OWN DEVICE | RELAY 2 | IN EXECUTION | 5 |
| 5 | 11112325 | OWN DEVICE | 2255-3555-8583 | Ooo.xxx.ooo.ooo | NORMAL 3 | IN EXECUTION | 5 |
| 6 | 11112326 | OWN DEVICE | 2255-3777-8583 | FINISHED | DELETED | FINISHED | 5 |
| 7 | 11112327 | OWN DEVICE | 2255-3555-8583 | Ooo.xxx.ooo.oxx | NORMAL 5 | IN EXECUTION | 7 |
| 8 | 11112329 | OWN DEVICE | Ooo.xxx.oox.oxx | NO | NORMAL 9 | IN EXECUTION | NO |
| 9 | 11112330 | Ooo.xxx.oox.ooo | OWN DEVICE | NO | NORMAL 10 | IN EXECUTION | NO |

FIG. 66

| CONNECTING PARTNER DEVICE | CONNECTION RESULT | CONNECTION CONFIRMATION DEVICE | CONNECTION CONFIRMATION DEVICE ID INFORMATION | DATA TRANSFER RATE THRESHOLD VALUE |
|---|---|---|---|---|
| 2255-3555-8583 | NON-CONNECTABLE | FAX | IP Ooo.xxx.ooo.oxx | 1 Mbps |

FIG. 67

| CONNECTING PARTNER DEVICE | CONNECTION RESULT | CONNECTION CONFIRMATION DEVICE | CONNECTION CONFIRMATION DEVICE ID INFORMATION | DATA TRANSFER RATE THRESHOLD VALUE |
|---|---|---|---|---|
| 2255-3555-8583 | CONNECTABLE | FAX | IP Ooo.xxx.ooo.oxx | 1 Mbps |

FIG. 68

| CONNECTING PARTNER DEVICE | CONNECTABLE DEVICE | CONNECTABLE DEVICE ID INFORMATION | DATA TRANSFER RATE THRESHOLD VALUE |
|---|---|---|---|
| PORTABLE TERMINAL40B 2222-3563-5622 | FAX | IP Ooo.xxx.ooo.oxx | 1 Mbps |
| | CORY | IP Ooo.xxx.ooo.oox | 0.5 Mbps |
| | PC | IP Ooo.xxx.ooo.oxo | 0.4 Mbps |
| | PRINTER | IP Ooo.xxx.ooo.ooo | 3 Mbps |

FIG. 69

| JOB ID | ID | SERVER ID INFORMATION | CLIENT ID INFORMATION | RELAY TERMINAL ID INFORMATION | COMMUNICATION PROCESS NAME | EXECUTION STATUS | DATA TRANSFER RATE THRESHOLD VALUE |
|---|---|---|---|---|---|---|---|
| 1 | 11112321 | OWN DEVICE | 1234-1234-1234 | FINISHED | DELETED | FINISHED | FINISHED |
| 2 | 11112322 | OWN DEVICE | 2244-5563-7123 | NO | NORMAL 8 | IN EXECUTION | 3 Mbps |
| 3 | 11112323 | OWN DEVICE | 2222-3563-5622 | Ooo.xxx.ooo.oxx | NORMAL 1 | IN EXECUTION | 2 Mbps |
| 4 | 11112324 | Ooo.xxx.oxx.xxx | 2244-5563-7777 | OWN DEVICE | RELAY 2 | IN EXECUTION | 1 Mbps |
| 5 | 11112325 | OWN DEVICE | 2255-3555-8583 | Ooo.xxx.ooo.ooo | NORMAL 3 | IN EXECUTION | 0.5 Mbps |
| 6 | 11112326 | OWN DEVICE | 2255-3777-8583 | FINISHED | DELETED | FINISHED | FINISHED |
| 7 | 11112327 | OWN DEVICE | 2255-3555-8583 | Ooo.xxx.ooo.oxx | NORMAL 5 | IN EXECUTION | 0.4 Mbps |
| 8 | 11112329 | OWN DEVICE | Ooo.xxx.oox.oxx | NO | NORMAL 9 | IN EXECUTION | NO |
| 9 | 11112330 | Ooo.xxx.oox.ooo | OWN DEVICE | NO | NORMAL 10 | IN EXECUTION | NO |

DATA COMMUNICATION SYSTEM, DATA COMMUNICATION DEVICE, PROGRAM PRODUCT FOR CONTROLLING DATA COMMUNICATION DEVICE, AND PORTABLE TERMINAL

This application is based on Japanese Patent Application No. 2001-243244 filed on Aug. 10, 2001, the contents of which are hereby incorporated by reference.

BACKGROUND OF THE INVENTION

1. Field of the Invention

The present invention relates to a data communication system, a data communication device, a program product for controlling the data communication device, and a portable terminal.

2. Description of the Related Art

With the popularization of portable terminals, technology concerning local wireless communication based on standards such as Bluetooth® is attracting the industry's attentions thanks to the simplicity of the connection between portable terminals and various devices.

This local wireless communication is based on the peer-to-peer connection and it is not necessary to set up the other party's address information such as the IP address, so that the user can perform various communications by connecting the user's portable terminal with other devices with extreme ease.

However, since it is necessary to secure the data transfer between each portable terminal and the device of a party to communicate with if multiple portable terminals are connected with such a single device, the wireless channel has to be divided for being used by multiple portable terminals. Therefore, in a case such as described above, a problem existed that the communication speed per each portable terminal slows down considerably.

SUMMARY OF THE INVENTION

It is an object of the invention to provide a data communication system, a data communication device, a computer program product for controlling the data communication device, and a portable terminal, which are improved for solving the above-mentioned problems.

It is a further object of the present invention to provide a data communication system, a data communication device, a program product for controlling the data communication device, and a portable terminal that are capable of preventing the communication speed's reduction when a portable terminal is used to communicate with a data communication device.

According to an aspect of the invention, there is provided a data communication system comprising: a portable terminal having a first communication interface for wireless communication; a first communication device having a first network interface for communication via a network, and a second wireless communication interface for conducting wireless communication with the portable terminal; and a second communication device having a second network interface for communication via a network, and a third wireless communication interface for conducting wireless communication with the portable terminal, wherein the first communication device makes a judgment as to whether a first connection format for communication with the portable terminal via the second wireless communication interface should be allowed when the first communication device receives a first connection request from the portable terminal via the second wireless communication interface, selects the second communication device that is capable of wirelessly communicating with the portable terminal when the first connection format is not allowed, and transmits to the portable terminal the connection information concerning a second connection format for communication with the portable terminal via the second communication device, the network, and the first network interface; and the portable terminal transmits a second connection request to the second communication device for forming the second connection format via the first wireless communication interface when the portable terminal receives the connection information via the first wireless communication interface from the first communication device.

According to another aspect of the invention, there is provided a data communication device comprising: a first interface for communicating with a portable terminal; a second interface for communicating with another communication device; and a controller that makes a judgment as to whether a first connection format for communication with the portable terminal via the first interface should be allowed when the data communication device receives a first connection request from the portable terminal via the first interface, selects another communication device that is capable of communicating with the portable terminal when the first connection format is not allowed, and transmits to the portable terminal the connection information concerning a second connection format for communication with the portable terminal via the another communication device and the second interface.

According to still another aspect of the invention, there is provided a program product for controlling a data communication device having a first interface for communicating with a portable terminal and a second interface for communicating with another communication device, the program product causing the data communication device to execute a process comprising the steps of: making a judgment as to whether a first connection format for communication with the portable terminal via the first interface should be allowed when the data communication device receives a first connection request from the portable terminal via the first interface; selecting another communication device that is capable of communicating with the portable terminal when the first connection format is not allowed; and transmitting to the portable terminal the connection information concerning a second connection format for communication with the portable terminal via the selected another communication device and the second interface.

According to a further aspect of the invention, there is provided a portable terminal comprising: a first interface for communicating with a first communication device and a second communication device; and a controller that transmits a connection request to the second communication device via the first interface when the portable terminal receives connection information concerning a connection format via the second communication device for a connection request transmitted to the first communication device via the first interface.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 23 shows an example of ID information;

FIG. 24 shows an example of the job list;

FIG. 25 shows an example of the contents of a connection switch request;

FIG. 26 shows an example of the contents of connection approval information;

FIG. 27 is an example of the contents of a response indicating non-connectability:

FIG. 28 is an example of the contents of a response indicating connectability:

FIG. 29 shows an example table of a search result for connectable devices;

FIG. 58 is an example of the contents of a response indicating non-connectability including information about response time threshold values;

FIG. 59 is an example of the contents of a response indicating connectability including information about response time threshold values;

FIG. 60 is an example table of a search result for connectable devices including a column for response time threshold values;

FIG. 61 is an example of a job list including a column for response time threshold values;

FIG. 62 is an example of the contents of a response indicating non-connectability including information about connection count threshold values in the sixth embodiment;

FIG. 63 is an example of the contents of a response indicating connectability including information about connection count threshold values;

FIG. 64 is an example table of a search result for connectable devices including a column for connection count threshold values;

FIG. 65 is an example of a job list including a column for connection count threshold values;

FIG. 66 is an example of the contents of a response indicating non-connectability including information about data transfer rate threshold values in the seventh embodiment;

FIG. 67 is an example of the contents of a response indicating connectability including information about data transfer rate threshold values;

FIG. 68 is an example table of a search result for connectable devices including a column for data transfer rate threshold values; and FIG. 69 is an example of a job list including a column for data transfer rate threshold values.

DETAILED DESCRIPTION OF THE PREFERRED EMBODIMENTS

The embodiments of this invention will be described below with reference to the accompanying drawings.

Figure 1:
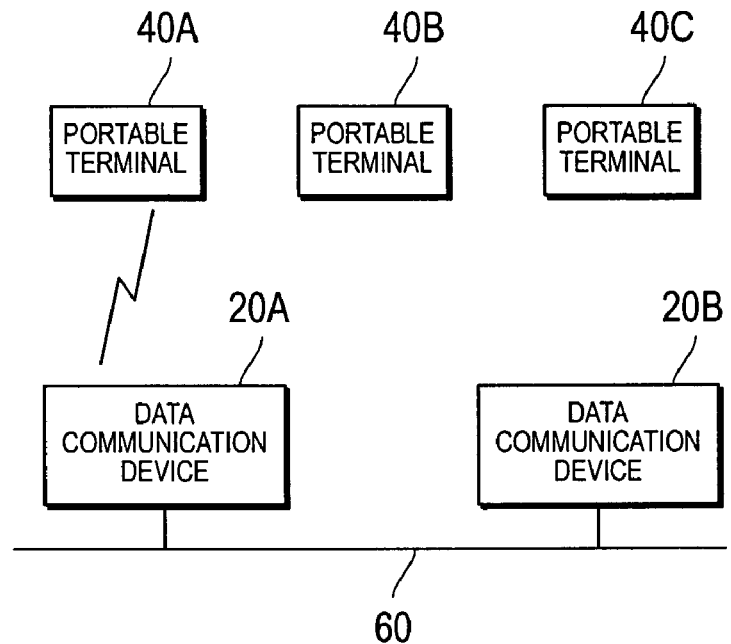
FIG. 1 is a diagram showing the constitution of a data communication system according to the first embodiment of the invention.

FIG. 1 is a diagram showing the constitution of a data communication system according to the first embodiment of the invention.

The data communication system shown in FIG. 1 has data communication devices 20A and 20B that are communicable with each other via a network 60 and portable terminals 40A through 40C. The types and number of units of devices on the network 60 are in actuality not limited to those shown in FIG. 1.

The network 60 can be a LAN such as an Ethernet®, a TokenRing, an FDDI (fiber distributed data interface), a wireless LAN (IEEE802.11), or a WAN consisting of a combination of multiple LANs.

Portable terminals 40A through 40C can conduct local wireless communication with data communication devices 20A and 20B. The local wireless communication herein means a communication based on peer-to-peer type connections within short distances (preferably less than 100 m, or more preferably less than 10 m of communication distances) without using the network 60. Specifically, a standard such as Bluetooth® is applicable to the local wireless communication.

Figure 2:
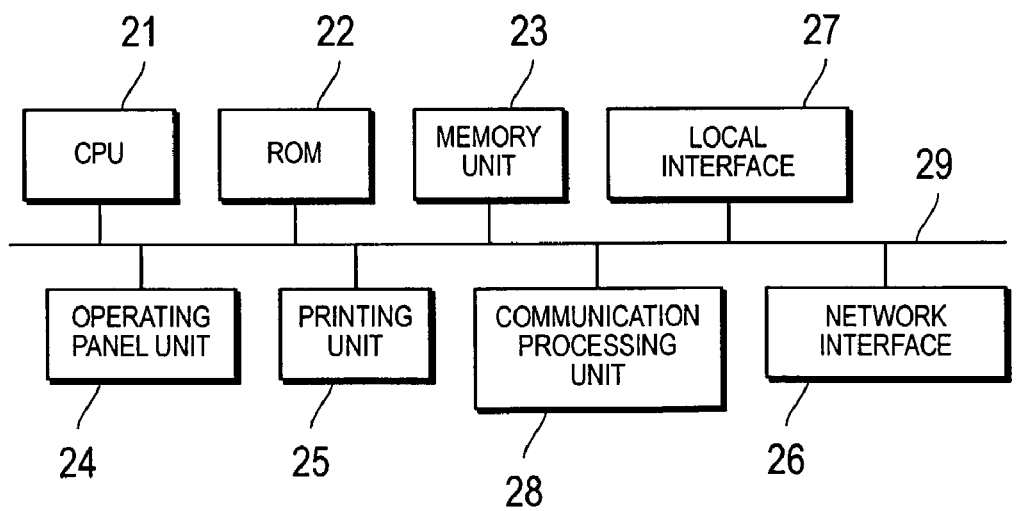
FIG. 2 is a block diagram of an example constitution of a data communication device.

FIG. 2 is a block diagram of an example constitution of a data communication device.

Each of the data communication devices 20A and 20B has a CPU 21, a ROM 22, a memory unit 23, an operating panel unit 24, a printing unit 25, a network interface 26, a local interface 27, a communication processing unit 28, and a bus 29 for exchanging signals between each of the units described above. In other words, the data communication devices 20A and 20B are specifically printers. However, the data communication device does not have to have a printing capability but rather simply has to have a capability of communicating with portable terminals and other data communication devices. The data communication devices 20A and 20B can be facsimile machines, copying machines, personal computers, MFP (multi-function peripherals), etc.

The CPU 21 is in charge of controlling various units mentioned above and performing various arithmetic operations according to a program. The ROM 22 stores various programs and data. The memory unit 23 stores various data such as image data and provides working areas for executing various processes.

The operating panel unit 24 consists of an operating unit for the user to enter various operating instructions and a display unit for various displays. The printing unit 25 is for printing various data.

The network interface 26 is an interface for the network communication for communicating with other data communication devices via the network 60.

The local interface 27 is an interface for local wireless communication for communicating directly among devices in short distances in conformance with standards such as Bluetooth®, etc.

Figure 3:
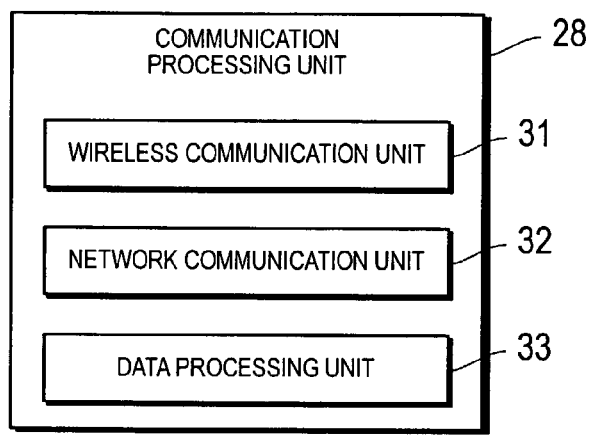
FIG. 3 is a block diagram of an example constitution of a communication processing unit.

The communication processing unit 28, as show in FIG. 3, has a wireless communication unit 31 that controls local wireless communication via the local interface 27, a network communication unit 32 that controls network communication via the network interface 26, and a data processing unit 33 that processes the data and commands to be received and transmitted by the wireless communication unit 31 and the network communication unit 32. The data processing unit 33 is designed to make judgments only on the contents of communication, processing procedures, and destinations of transmissions for sending or receiving data by the wireless communication unit 31 and the network communication unit 32, thus being able to process communication without recognizing which of the communication interfaces they have to be transmitted through.

Figure 4:
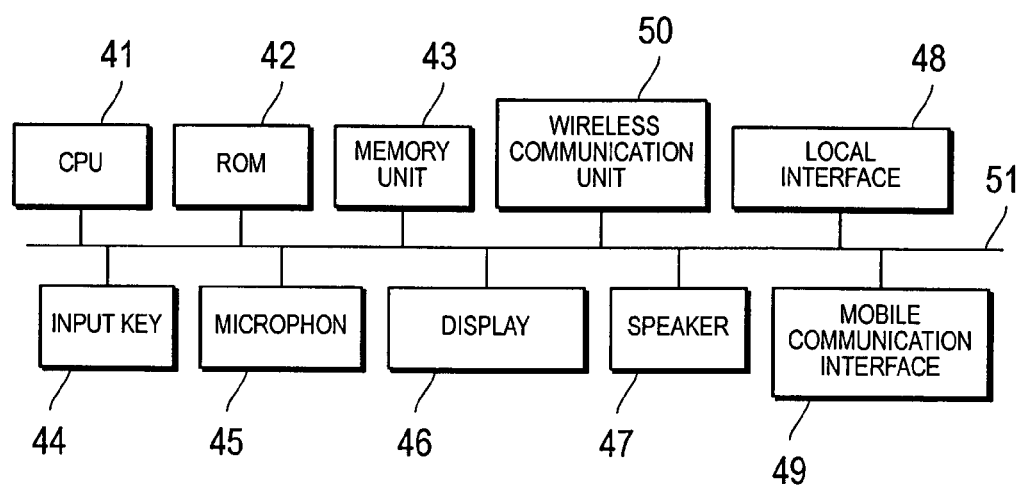
FIG. 4 is a block diagram of an example constitution of a portable terminal.

FIG. 4 is a block diagram of an example constitution of a portable terminal.

The portable terminals 40A through 40C have a CPU 41, a ROM 42, a memory unit 43, an input key 44, a microphone 45, a display 46, a speaker 47, a local interface 48, a mobile communication interface 49, a wireless communication unit 50, and a bus 51 for exchanging signals between each of the units described above. In other words, the portable terminals 40A through 40C are specifically cellular telephones in this embodiment. However, the portable terminals 40A through 40C can also be PHS® (personal handy-phone system), PDA (personal digital assistant), notebook type personal computers, electronic pocketbooks, etc.

Since CPU, ROM, memory unit, local interface, and wireless communication unit of the portable terminals 40A through 40C have functions identical to the data communication devices 20A through 20B, the descriptions will not be repeated here.

The input key 44 is used for entering various inputs and the microphone 45 is used for entering voice inputs. The display 46 is used for various displays and the speaker 47 is used for outputting various audio signals. The mobile communication interface 49 is an interface for mobile communication for performing wireless communication with the outside world via the mobile communication network using radio waves of a specified frequency band.

The abovementioned mobile communication interface is not needed in case of a portable terminal that has no capability of wireless communication via the mobile communication network. In other words, the minimum requirement for the portable terminals 40A and 40B are to have the CPU 41, ROM 42, memory unit 43, local interface 48, wireless communication unit 50, and bus 51.

Next, the operation of the data communication device will be described referring to FIGS. 5 through 17. The algorithm shown in the flowchart of FIGS. 5 through 17 is stored as a program in, for example, the ROM 22 and is executed by the CPU 21.

Figure 5:
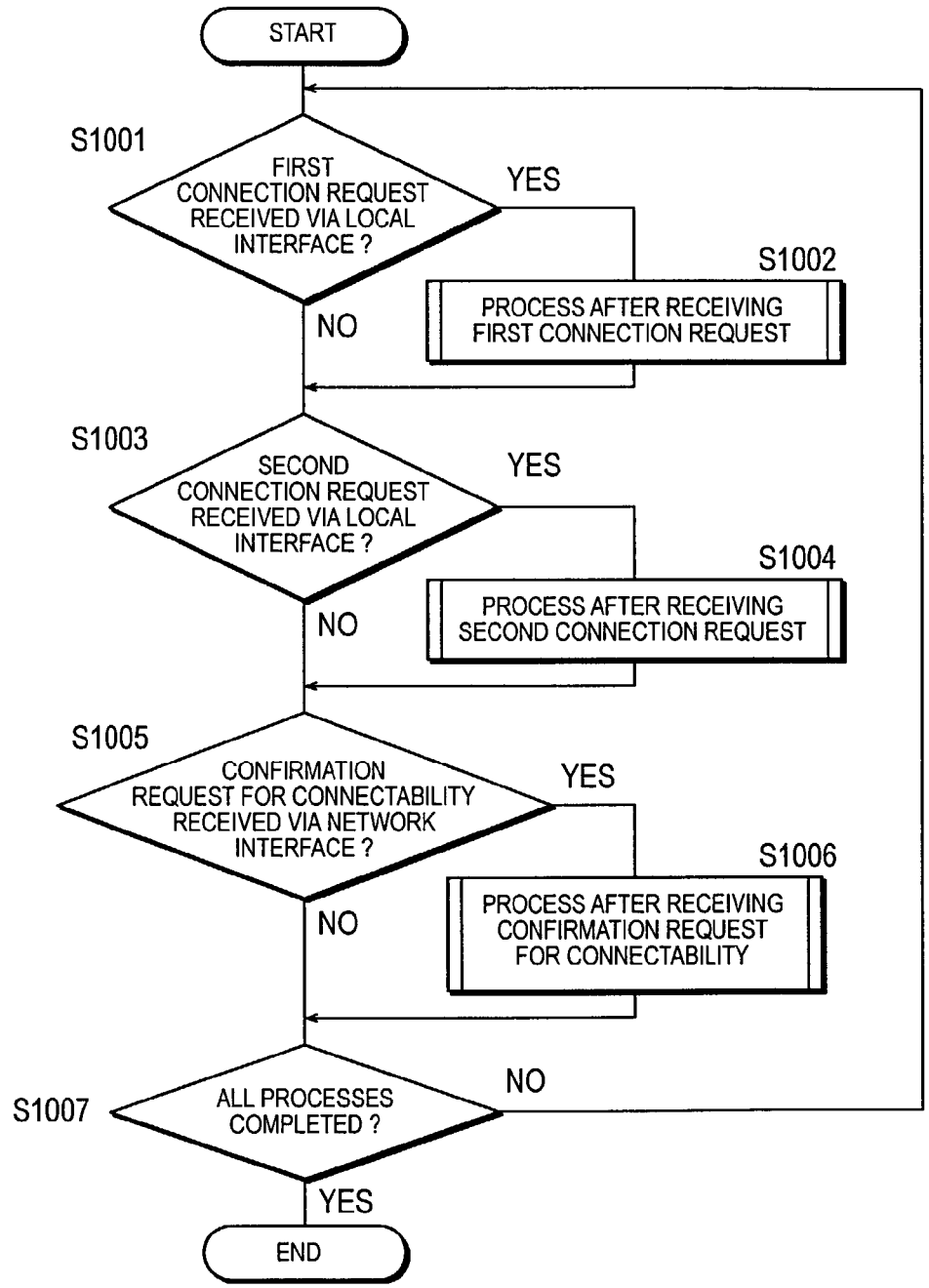
FIG. 5 is a flowchart showing the steps for an overall process for using local wireless communication in the data communication device.

First, let us describe the steps of the overall process using the local wireless communication in the data communication device referring to FIG. 5.

In the step S1001, the data communication device (hereinafter simply called "device" as well) 20A determines whether it has received the first connection request from the portable terminal 40A or 40B via the local interface 27. The first connection request here is a request for connection for local wireless communication of the device 20A directly with the portable terminal 40A or 40B. When the first connection request is received (step S1001: Yes), the process that follows the receipt of the first connection request is executed in the step S1002, the detail of which will be described later.

In the step S1003, a judgment is made as to whether the device 20B has received the second connection request from the portable terminal 40B via the local interface 27. The second connection request here is a request for connection for local wireless communication of the portable terminal 40B with the device 20B in order to communicate with the device 20A via the device 20B and the network 60.

A data communication device can either process its own communication with a portable terminal (normal data communication) or serve as a relaying unit for communication between another device and a portable terminal (relaying data communication) depending on the situation. For the sake of easier understanding, a situation will be described in the following wherein the portable terminal 40A transmits the first connection request to the device 20A in order to conduct local wireless communication with the device 20A, after which the portable terminal 40B transmits the first connection request to the device 20A in order to conduct local wireless communication with the device 20A. Also, when both the devices 20A and 20B are quoted, one date communication device can be either the device 20A that conducts the normal data communication or the device 20B that conducts the relaying data communication.

When the second connection request is received (step S1003: Yes), the process that follows the receipt of the second connection request is executed in the step S1004, the detail of which will be described later.

In the step S1005, a judgment is made as to whether the device 20B has received the confirmation request for connectability from the device 20A via the network interface 26. The confirmation request for connectability here is a request for confirming whether the device 20B for relay processing is capable of making local wireless communication with, for example, the portable terminal 40B. When the confirmation request is received (step S1005: Yes), the process after receiving the confirmation request for connectability is executed in the step S1006, the detail of which will be described later.

In the step S1007, a judgment is made as to whether all the processes are completed. When all the processes are completed (step S1007: Yes), the program execution is terminated. If all the processes are not completed (step S1007: No), the control returns to the step S1001.

Figure 6:
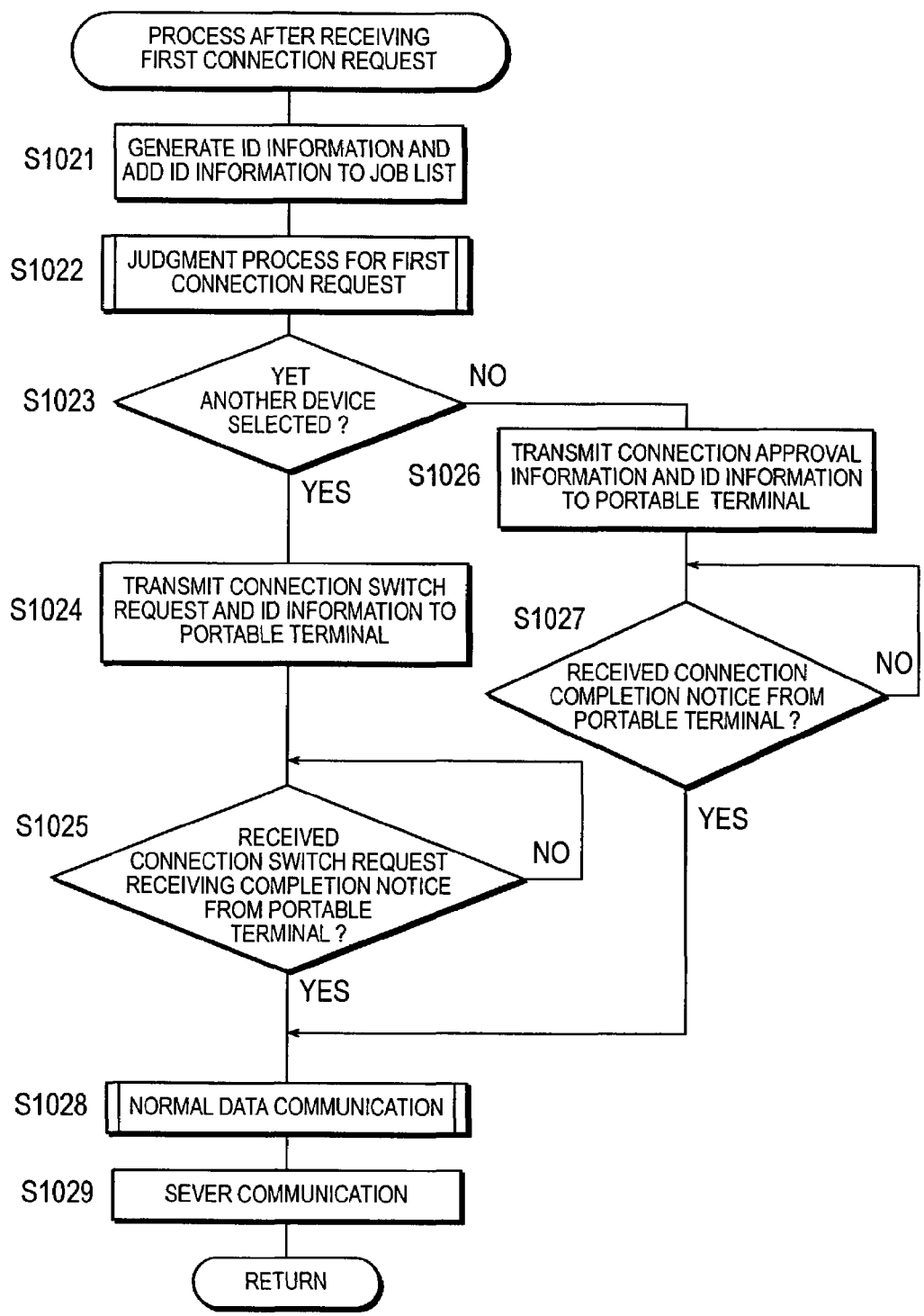
FIG. 6 is a flowchart showing the steps of a process after receiving the first connection request.

Next, we will describe the steps of the process that follows the receipt of the first connection request, for example, at the device 20A in the step S1002 of FIG. 5 with reference to FIG. 6.

In the step S1021, ID information is prepared and this ID information is added to the job list. These ID information and job list are stored in the memory unit 23 of the device 20A.

FIG. 23 shows an example of ID information. FIG. 23 shows a case wherein the portable terminal 40A communicates with the device 20A via the device 20B, indicating that the specified address of the device 20A is written into the server identification information column, the specified address of the portable terminal 40A is written into the client identification information column, and the specified address of the device 20B is written into the relay terminal identification information column. Various addresses can be used such as an IP address, a MAC address, a Bluetooth® address, etc., as a specified address.

FIG. 24 shows an example of the job list. The job list stores the received jobs in the order of reception. The job list consists of various columns such as the job ID, ID, server identification information, client identification information, relay terminal identification information, communication process name, and execution status columns. Therefore, the server identification information, client identification information, and relay terminal identification information columns are entered according to the ID information. The communication types (normal data communication of relay data communication) are entered into the communication process name column.

The ID is set up in such away that they do not overlap with an ID issued by another device on the network. The ID can be set up by adding the own MAC address or IP address at the top of the job ID that consists of a sequential number. Alternatively, it is possible to identify it on the network by using the job ID and the server identification information in combination.

In the step S1022, the judgment process for the first connection request is performed. A judgment is made here as to whether the first connection format should be approved for connecting the device 20A with a portable terminal via the local interface 27 based on the communication status in the device 20A; if the first connection format is not approved, another device, which is capable of local wireless communication with the portable terminal and which is different from the device 20A that received the first connection request, is selected. If another specified device is selected, the second connection format is specified for the portable terminal to communicate with the device 20A via the device 20B and the network 60.

For example, the first connection format is approved for the portable terminal 40A that first transmitted the first connection request to the device 20A, and the second connection format is assigned, by selecting another specified device, to the portable terminal 40B, which transmitted the first connection request to the device 20A after the portable terminal 40A's request. The detail of the process in the step S1022 will be discussed later.

In the step S1023, a judgment is made as to whether another specified device is selected in the step S1022. If another device is selected (step S1023: Yes), the process of the step S1024 is executed; if no other device is selected (step S1023: No), the process of the step S1026 is executed.

In the step S1024, a connection switch request and ID information are transmitted to, for example, the portable terminal 40B. The ID information can be connection information for establishing the connection concerning the second connection format. The connection switch request means a request for switching the connection for local wireless communication. In this step, a connection switch request is transmitted to the portable terminal 40B so that the portable terminal 40B can connect with the device 20B for the purpose of communicating with the device 20A via the device 20B and the network 60. FIG. 25 shows an example of the contents of a connection switch request.

In the step S1025, the control waits for a receiving completion notice of the connection switch request that notifies that the connection switch request has been received from the portable terminal 40B.

In the step S1026, a connection approval information and ID information are transmitted to, for example, the portable terminal 40A. FIG. 26 shows an example of the contents of connection approval information.

In the step S1027, the control waits for a connection completion notice that notifies that the connection has been completed from the portable terminal 40A.

In the step S1028, the normal data communication is executed, wherein the own device, for example, the device 20A, communicates with the portable terminal 40A or 40B. The detail of the process in the step S1028 will be discussed later.

In the step S1029, the communication is severed.

Next, the judgment process for the first connection request in the step S1022 of FIG. 6 will be described referring to FIG. 7.

In the step S1041, a judgment is made whether the connection for the local wireless communication (hereinafter called "wireless connection" as well) is not currently established. If wireless connection is not established (step S1041: Yes), the process of the step S1046 will be executed; if wireless connection is established (step S1041: No), the process of the step S1042 will be executed. In the step S1041, a judgment can be made alternatively whether the number of wireless connections is not more than the specified value, for example, not more than one (same as in the steps S1161 and S1241).

In the step S1042, wirelessly connectable devices are searched among other devices on the network 60. For example, the portable terminal 40B that transmitted the first connection request to the device 20A after the request of the portable terminal 40A, and wirelessly connectable devices are searched here. The detail of the process in the step S1042 will be discussed later.

In the step S1043, a judgment is made as to whether any wirelessly connectable devices that are wirelessly connectable with the portable terminal 40B exist based on the search result of the step S1042. If a wirelessly connectable device exists (step S1043: Yes), the process of the step S1044 is executed; if no wirelessly connectable device exists (step S1043: No), the process of the step S1046 is executed.

In the step S1044, the device 20B is selected as another specified device among the wirelessly connectable devices that are searched in the step S1042. It is possible to select as another specified device, for example, a device, for which the connectability response is obtained earliest. However, another specified device can be selected based on an arbitrary standard. For example, it is possible to select as another specified device a device with a minimum number of wireless connections among the wirelessly connectable devices, or a device with a shortest measured response time in communication with a portable terminal via a local interface, or a device with a highest measured data transfer rate in communication with a portable terminal via a local interface. Moreover, another specified device can be selected according to characteristic information including at least one of the above mentioned characteristic information concerning the local wireless communication with a portable terminal, i.e., the number of wireless connections, response time, and data transfer rate.

In the step S1045, the second connection format that goes through, for example, the device 20B, which was selected in the step S1044, is specified.

On the other hand, in the step S1406, the first connection format is approved, wherein the own device, the device 20A, makes a direct connection with the portable terminal 40A via the local interface 27.

Next, referring to FIG. 8, the search process for connectable devices in the step S1042 of FIG. 7 will be described.

In the step S1061, a connectability confirmation request is transmitted to other devices on the network 60 for confirming whether wireless connection with the portable terminal 40B is possible. The connectable confirmation request is broadcasted here, for example, to all devices within the same LAN.

In the step S1062, the control waits for responses from other devices to the connectability confirmation request. FIG. 27 shows the contents of an example response indicating non-connectability, while FIG. 28 shows the contents of an example response indicating connectability.

In the step S1063, a judgment is made as to whether the response to the connectability confirmation request is indicating connectability. If the response shows connectability (step S1063: Yes), the process of the step S1064 is executed; if the response shows non-connectability (step S1063: No), the process advances to the step S1065.

In the step S1064, the response showing connectability is adding to the connectable device search result table that shows a list of information concerning other devices that are wirelessly connectable with the portable terminal 40B.

In the step S1065, the control waits for responses to be received from all other devices, to which the connectability confirmation request was sent, and repeats the steps S1062 through S1064 described above.

Next, referring to FIG. 9, the search process for the normal data communication in the step S1028 of FIG. 6 will be described.

In the step S1081, the control waits for data reception.

In the step S1082, a judgment is made as to whether it is a new communication process for receiving data for the first time after the connection is established. If it is a new communication process (step S1082: Yes), the process of the step S1083 is executed; if it is not a new communication process (step S1082: No), the control advances to the step S1084.

In the step S1083, the normal communication process for conducting the normal data communication is generated by being read out from, for example, the ROM 22 to the working area of the memory unit 23.

In the step S1084, the job list concerning the normal data communication to be conducted and the contents of the ID information are applied to the normal communication process.

In the step S1085, the normal communication process is executed. The normal communication process includes a process for the own device, for example, the device 20A, to conduct local communication with the portable terminal 40A, and a process for the own device, for example, the device 20A, to communicate with the portable terminal 40B via the device 20B and the network 60. The detail of the process in the step S1085 will be discussed later.

Next, referring to FIG. 10 and FIG. 11, the normal communication process in the step S1085 of FIG. 9 will be described.

Figure 9:
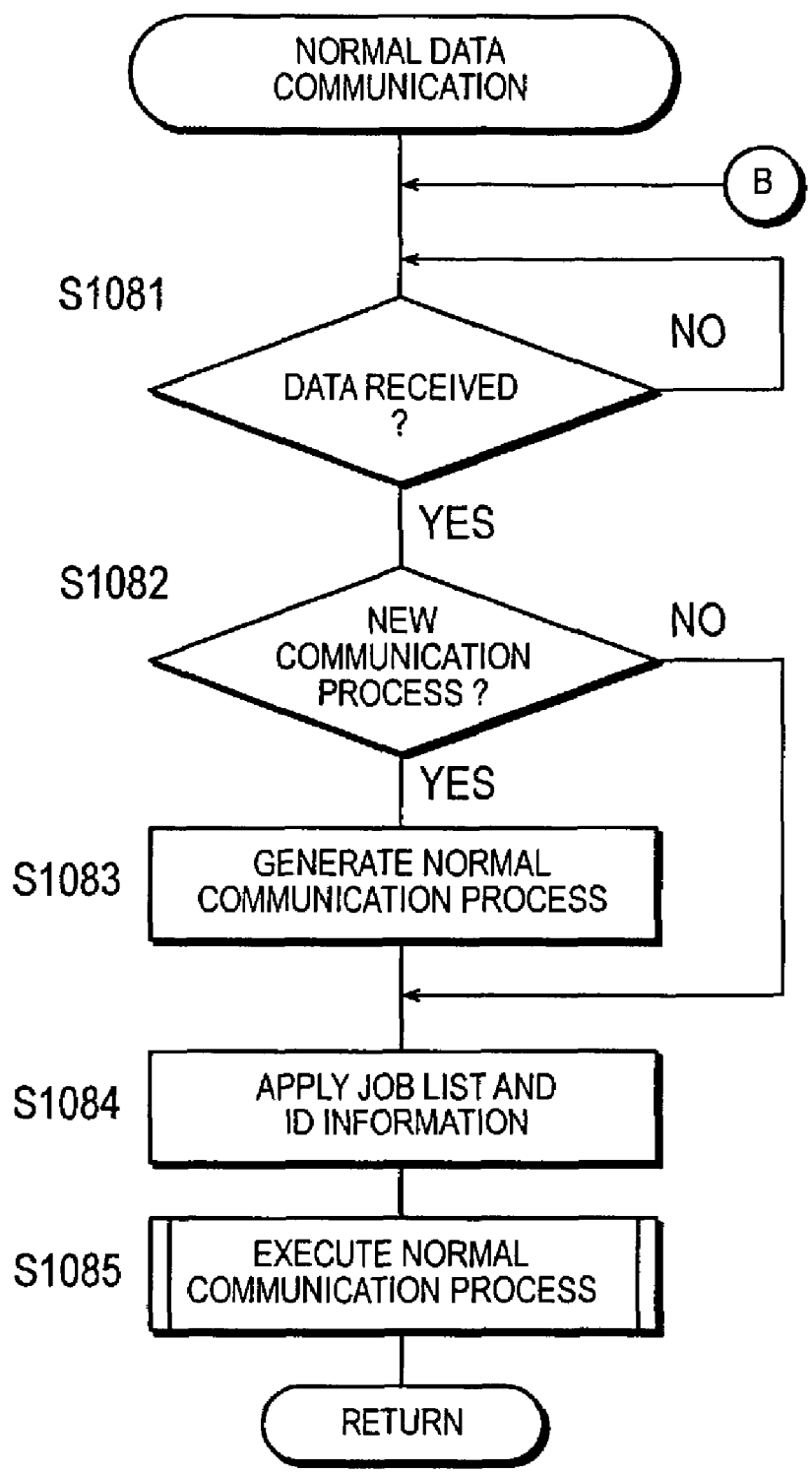
FIG. 9 is a flowchart showing the steps of a normal data communication process.

In the step S1101, the data received in the step S1081 of FIG. 9 is analyzed. It is detected here that the received data is data for printing.

In the step S1102, a judgment is made as to whether there is a need for processing at another processing unit based on the result of analysis in the step S1101. If there is a need for processing in another processing unit (step S1102: Yes), the processing of the step S1103 is executed; if there is no need for processing in another processing unit (step S1102: No), the control advances to the step S1105.

In the step S1103, another processing unit is assigned with the specified process. For example, if the received data is data for printing, an instruction is issued for printing the data at the printing unit 25.

In the step S1104, the control waits for a process completion notice that notifies that the process instructed in the step S1103 has been completed.

In the step S1105, a judgment is made as to whether it is necessary to transmit data from the device 20A to the portable terminal 40A or 40B. For example, a case of transmitting a printing completion notice corresponds to a case where it is necessary to transmit data. If there is a need for transmitting data (step S1105: Yes), the processing of the step S1106 is executed; if there is no need for transmitting data (step S1105: No), the control advances to the step S1109 of FIG. 11.

In the step S1106, a judgment is made as to whether the particular communication is a communication based on the connection via the local interface 27 of the device 20A. If it is a communication based on the connection via the local interface 27 (step S1106: Yes), the process of the step S1107 is executed; if it is not a communication based on the connection via the local interface 27 (step S1106: No), the process of the step S1108 is executed.

In the step S1107, the ID information and data are transmitted to the portable terminal 40A via the local interface 27 of the device 20A. On the other hand, in the step S1108, the ID information and data are transmitted to the device 20B via the network interface 26 of the device 20A.

Figure 11:
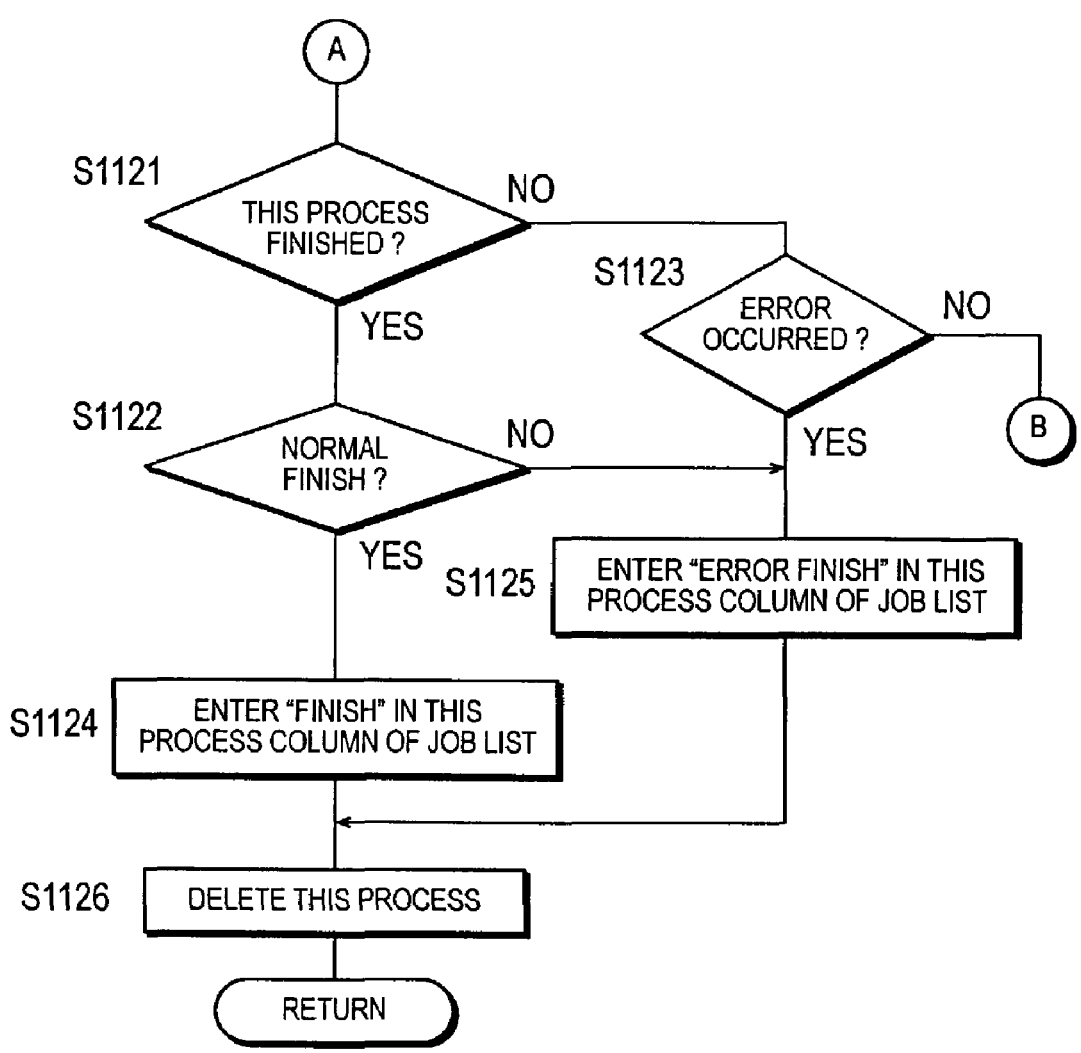
FIG. 11 is a flowchart continued from FIG. 10 showing the steps of executing a normal communication process.

In the step S1121 of FIG. 11, a judgment is made as to whether this normal communication process is completed. If this process is finished (step S1121: Yes), the process of the step S1122 is executed; if this process is not finished (step S1121: No), the process of the step S1123 is executed.

In the step S1122, a judgment is made as to whether this process is finished normally. If it is a normal finish (step S1122: Yes), the process of the step S1124 is executed; if it is not a normal finish (step S1122: No), the process of the step S1125 is executed.

On the other hand, in the step S1123, a judgment is made as to whether any error has occurred. If any error has occurred (step S1123: Yes), the process of the step S1125 is executed; if no error has occurred (step S1123: No), the control returns to the step S1081 of FIG. 9.

In the step S1124, a comment "Finish" is entered into the execution status cell for this process in the job list; in the step S1125, a comment "Error Finish" is entered into the execution status cell for this process in the job list.

In the step S1126, this process is deleted by erasure from the working area of the memory unit 23 of the device 20A.

Figure 12:
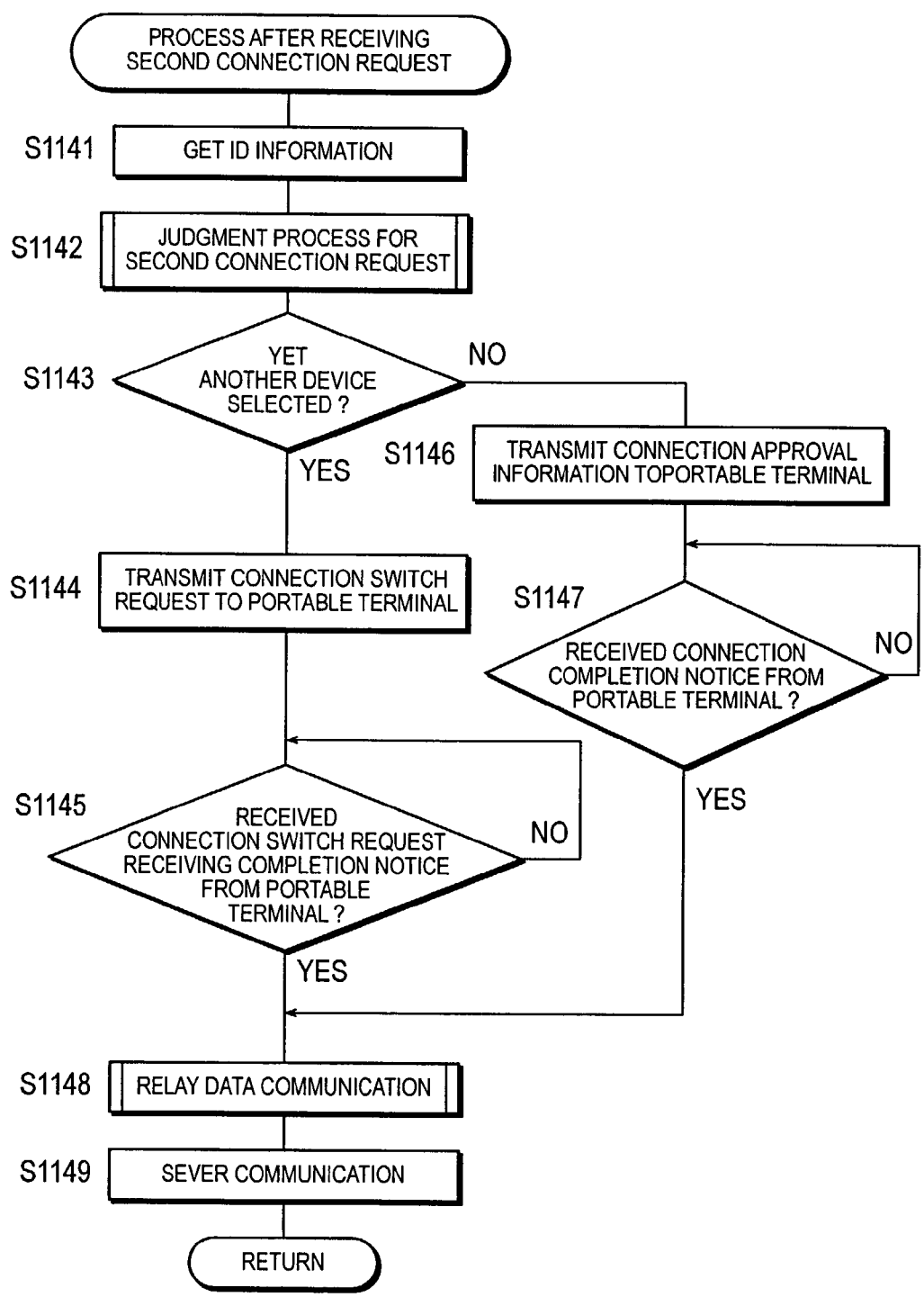
FIG. 12 is a flowchart showing the steps of a process after receiving the second connection request.

Next, we will describe the steps of the process that follows the receipt of the second connection request, for example, at the device 20B in the step S1004 of FIG. 5 with reference to FIG. 12.

In the step S1141, the ID information that has been transmitted from, for example, the portable terminal 40B.

In the step S1142, the judgment process for the second connection request is performed. A judgment is made here as to whether the second connection format should be approved for communicating with the device 20A via the device 20B and the network 60 based on the communication status in the device 20B; if the second connection format is not approved, yet another device, which is capable of local wireless communication with the portable terminal 40B and which is different from the device 20B that received the second connection request, is selected. If yet another specified device is selected, the second connection format is specified for the portable terminal 40B to communicate with the device 20A via the yet another specified device and the network 60. The detail of the process in the step S1142 will be discussed later.

In the step S1143, a judgment is made as to whether yet another specified device is selected in the step S1142. If yet another device is selected (step S1143: Yes), the process of the step S1144 is executed; if no other device is selected (step S1143: No), the process of the step S1146 is executed.

In the step S1144, a connection switch request is transmitted to, for example, the portable terminal 40B. In this step, a connection switch request is transmitted to the portable terminal 40B so that the portable terminal 40B can connect with yet another device for the purpose of communicating with the device 20A via yet another device and the network 60.

In the step S1145, the control waits for a receiving completion notice of the connection switch request that notifies that the connection switch request has been received from the portable terminal 40B.

In the step S1146, connection approval information is transmitted to, for example, the portable terminal 40B.

In the step S1147, the control waits for a connection completion notice that notifies that the connection has been completed from the portable terminal 40B.

In the step S1148, a relay data communication is executed by, for example, the device 20B for relaying communication between the device 20A and the portable terminal 40B. However, if yet another device is selected in the step S1142, relay data communication is executed by said yet another device. The detail of the process in the step S1148 will be discussed later.

In the step S1149, the communication is severed.

Next, the steps of the judgment process for the second connection request in the step S1142 of FIG. 12 will be described referring to FIG. 13.

In the step S1161, a judgment is made as to whether wireless connection is currently established. If wireless connection is not established (step S1161: Yes), the process of the step S1166 will be executed; if wireless connection is established (step S1161: No), the process of the step S1162 will be executed.

In the step S1162, devices wirelessly connectable with the portable terminal 40B will be searched from yet other devices that are different from the device 20B on the network 60. The process of this step S1162 are as shown in FIG. 8.

In the step S1163, a judgment is made as to whether any wirelessly connectable devices that are wirelessly connectable with the portable terminal 40B exist based on the search result in the step S1162. If a wirelessly connectable device exists (step S1163: Yes), the process of the step S1164 is executed; if no wirelessly connectable device exists (step S1163: No), the process of the step S1166 is executed.

In the step S1164, yet another specified device is selected among the devices that are wirelessly connectable that are searched in the step S1162. It is possible to select as yet another specified device, for example, a device, for which the connectability response is obtained earliest. However, yet another specified device can be selected based on an arbitrary standard.

In the step S1165, the second connection format that goes through the yet another device, which was selected in the step S1164, is specified.

On the other hand, in the step S1166, the second connection format, which goes through the device 20B that has received the second connection request, is specified.

In the step S1167, the ID information is added to the job list stored in the memory unit 23 of the device 20B that has received the second connection request.

Next, referring to FIG. 14, the search process for the relay data communication in the step S1148 of FIG. 12 will be described.

In the step S1181, the control waits for data reception.

In the step S1182, a judgment is made as to whether it is a new communication process for receiving data for the first time after the connection is established. If it is a new communication process (step S1182: Yes), the process of the step S1183 is executed; if it is not a new communication process (step S1182: No), the control advances to the step S1184.

In the step S1183, the relay communication process for conducting the relay data communication is generated by being read out from, for example, the ROM 22 to the working area of the memory unit 23.

In the step S1184, the job list concerning the normal data communication to be conducted and the contents of the ID information are applied to the relay communication process.

In the step S1185, the relay communication process is executed. The relay communication process is a process of relaying the communication between the device 20A and the portable terminal 40B via the device 20B, which is the own device in this case.

Next, referring to FIG. 15, the relay communication process in the step 1185 of FIG. 14 will be described.

Figure 14:
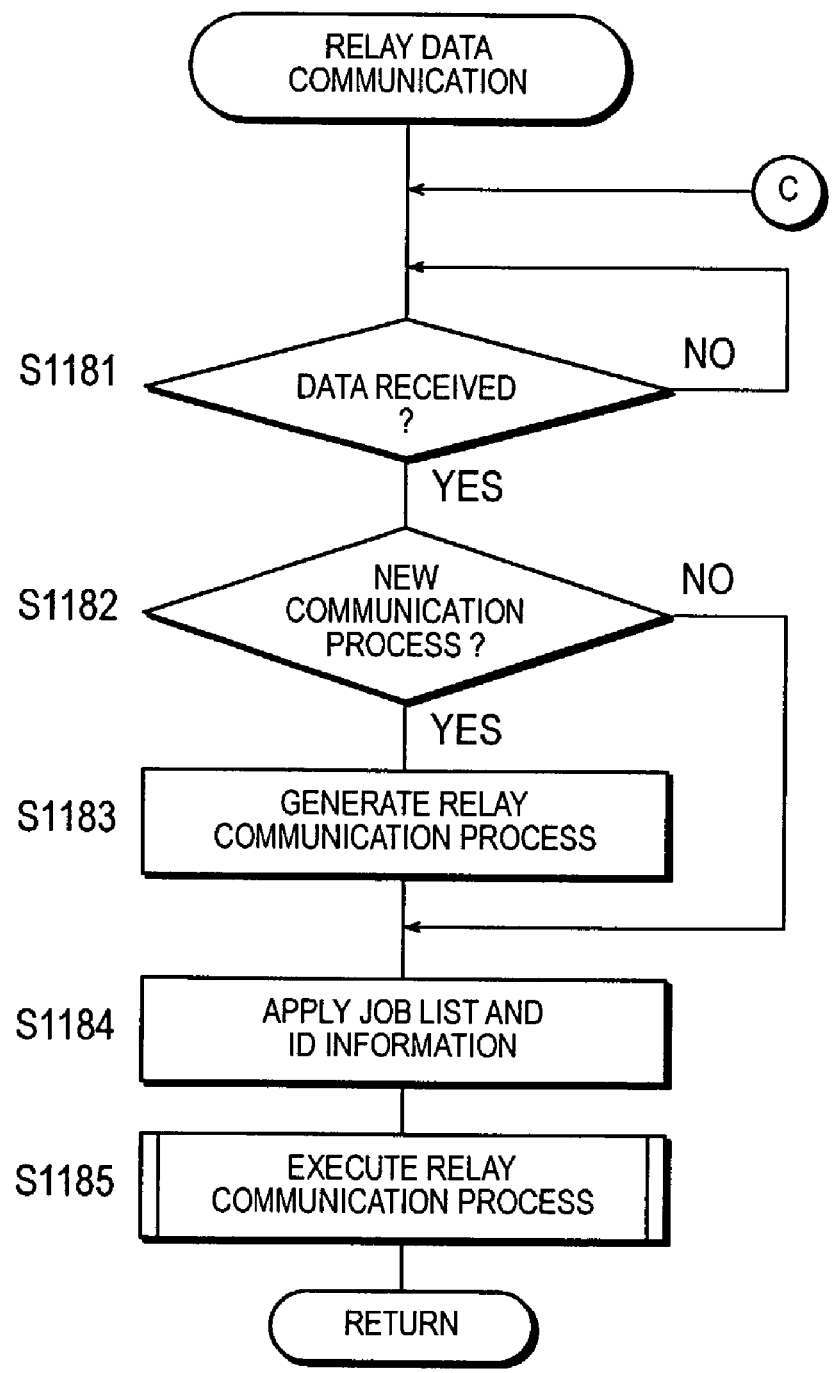
FIG. 14 is a flowchart showing the steps of a relay data communication process.

In the step S1201, a judgment is made as to whether the data received in the step S1181 of FIG. 14 is, for example, data received via the local interface 27 of the device 20B. If it is data received via the local interface 27 (step S1201: Yes), the process of the step S1202 is executed; if it is not data received via the local interface 27 (step S1201: No), the process of the step S1203 is executed.

In the step S1202, the data is transmitted to the device 20A based on the ID information via the network interface 26 of the device 20B. On the other hand, in the step S1203, the data is transmitted to the portable terminal 40B based on the ID information via the local interface 27 of the device 20B.

In the step S1204, a judgment is made as to whether this relay communication process is finished. If this process is finished (step S1204: Yes), the process of the step S1205 is executed; if this process is not finished (step S1204: No), the process of the step S1206 is executed.

In the step S1205, a judgment is made as to whether this process is finished normally. If it is a normal finish (step S1205: Yes), the process of the step S1209 is executed; if it is not a normal finish (step S1205: No), the process of the step S1207 is executed.

On the other hand, in the step S1206, a judgment is made as to whether any error has occurred. If any error has occurred (step S1206: Yes), the process of the step S1207 is executed; if no error has occurred (step S1206: No), the control returns to the step S1181 of FIG. 14.

In the step S1207, an abnormality notice is transmitted to the device 20A based on the ID information via, for example, the network interface 26 of the device 20B, and in the step 1208, an abnormality notice is transmitted to the portable terminal 40B based on the ID information via, for example, the local interface 27 of the device 20B.

In the step S1209, a cell corresponding to this process of the job list is deleted.

In the step S1210, this process is deleted by erasure from the working area of the memory unit 23 of the device 20B.

Figure 16:
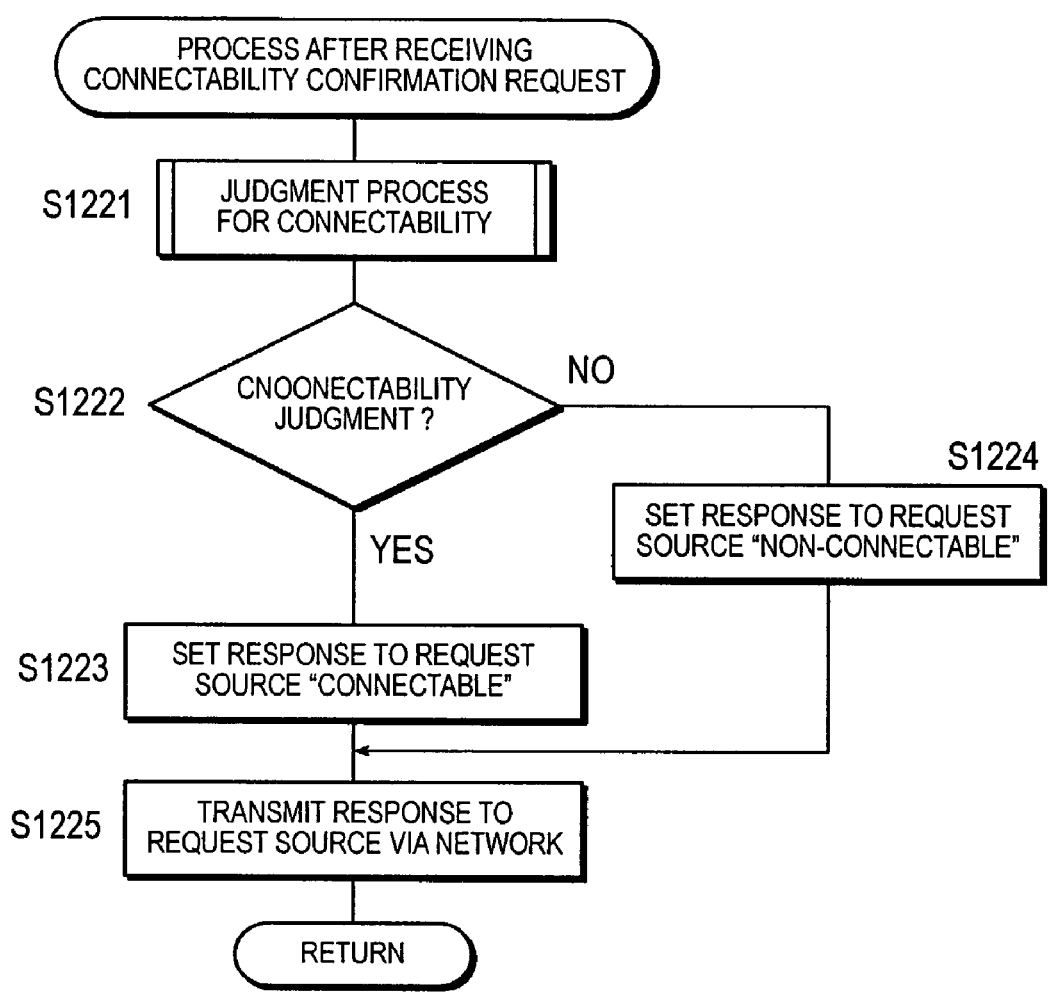
FIG. 16 is a flowchart showing the steps of a process after receiving a request for confirmation of connectability.

Next, we will describe the steps of the process that follows the receipt of the confirmation request for connectability at the device 20B in the step S1006 of FIG. 5 with reference to FIG. 16.

In the step S1221, a judgment process for the connectability is executed. A judgment is made here as to whether the device 20B is connectable to the portable terminal 40B. The detail of the process in the step S1221 will be discussed later.

In the step S1222, a judgment was made as to whether a connectability judgment is made in the step S1221. If a connectability judgment was made (step S1222: Yes), the process of the step S1223 is executed; if no connectability judgment was made (step S1222: No), the process of the step S1224 is executed.

In the step S1223, the response to the device 20A concerning its confirmation request for connectability is set to "connectable." On the other hand, in the step S1224, the response to the device 20A concerning its confirmation request for connectability is set to "non-connectable."

In the step S1225, a response is transmitted to the device 20A via the network 60 for the confirmation request for connectability Next, referring to FIG. 17, the judgment process for connectability in the step 1221 of FIG. 16 will be described.

In the step S1241, a judgment is made as to whether wireless connection is not established. If wireless connection is not established (step S1241: Yes), the process of the step S1242 will be executed; if wireless connection is established (step S1241: No), the process of the step S1245 will be executed.

In the step S1242, a connection request for confirming the connection is transmitted to the portable terminal 40B specified by the device 20A, which is asking for the confirmation of connectability.

In the step S1243, a judgment is made as to whether the response for connectability is received from the portable terminal 40B within a specific time period. If a response for connectability is received (step S1243: Yes), the process of the step S1244 is executed; if no response for connectability is received (step S1243: No), the process of the step S1245 is executed.

In the step S1244, it is determined that the portable terminal 40B is connectable. On the other hand, in the step S1245, it is determined that the portable terminal 40B is not connectable.

Next, the operation of the portable terminal will be described referring to FIGS. 18 through 22. The algorithm shown in the flowchart of FIGS. 18 through 22 is stored as a program in, for example, the ROM 42 and is executed by the CPU 41.

Figure 18:
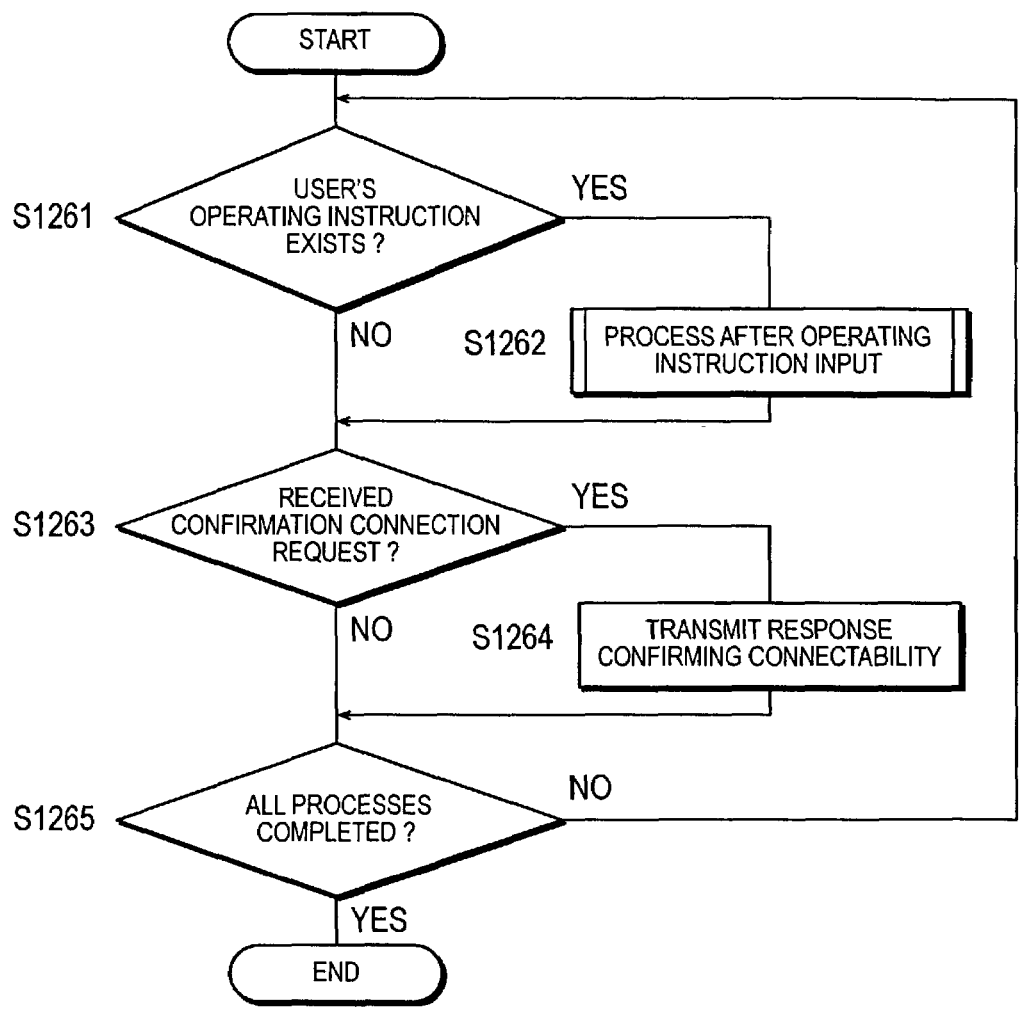
FIG. 18 is a flowchart showing steps of an overall process using local wireless communication in a portable terminal.

First, let us describe the steps of the overall process using the local wireless communication in the portable terminal referring to FIG. 18.

In the step S1261, a judgment is made as to whether the portable terminal 40A has received the operator's operating instruction through the input keys 44. When an operating instruction is received (step S1261: Yes), the process after receiving the operating instruction input is executed in the step S1262, the detail of which will be described later.

In the step S1263, a judgment is made as to whether the portable terminal 40B has received the connection request for connectability confirmation from a device such as the device 20B. If the connection request for confirmation is received (step S1263: Yes), a response confirming that it is connectable is transmitted to the device, which sent the connection request for confirmation (S1264).

In the step S1265, a judgment is made as to whether all the processes are completed. When all the processes are completed (step S1265: Yes), the program execution is finished. If all the processes are not completed (step S1265: No), the control returns to the step S1261.

Figure 19:
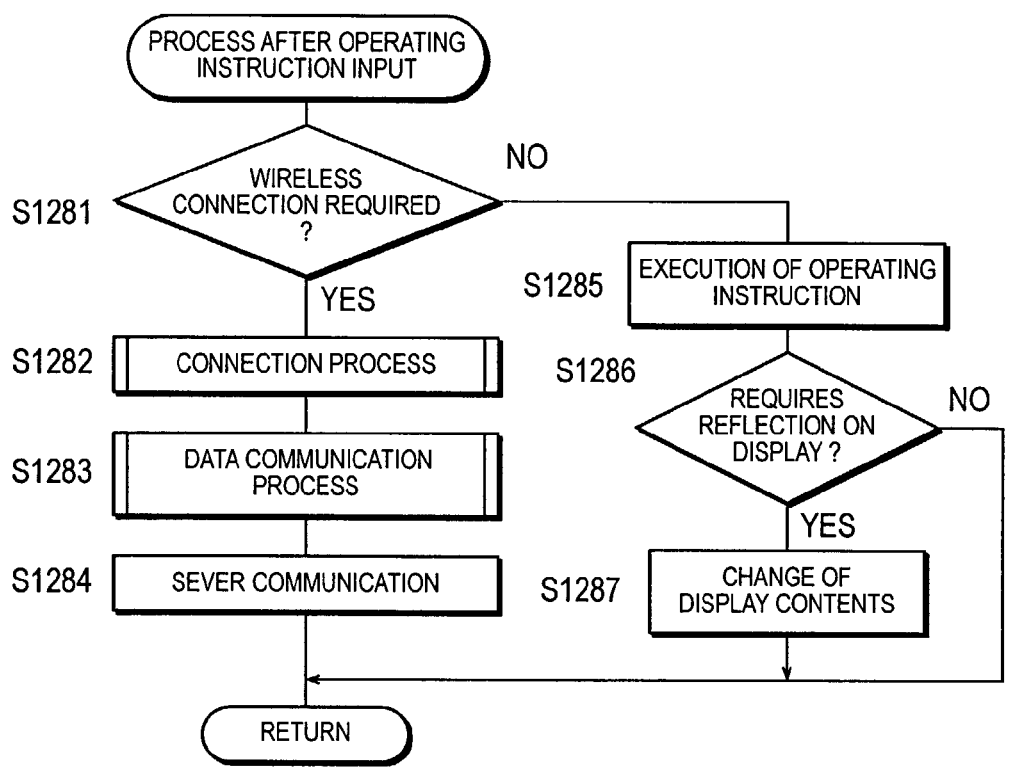
FIG. 19 is a flowchart showing the steps of a process after operation input.

Next, referring to FIG. 19, the search process in the step 1261 of FIG. 18 will be described.

In the step S1281, a judgment is made as to whether wireless connection is required. If wireless connection is required (step S1281: Yes), the process of the step S1282 will be executed; if wireless connection is not required (step S1281: No), the process of the step S1285 will be executed.

In the step S1282, the connection process for a portable terminal to communicate, for example, with the device 20A, is executed, and the detail of the process will be described later.

In the step S1283, the data communication process for a portable terminal to communicate, for example, with the device 20A, is executed, and the detail of the process will be described later.

In the step S1284, the communication is severed.

On the other hand, in the step S1285, the operating instruction received in the step S1261 of FIG. 18 is executed, and the display content on the display 46 will be changed (step S1287), if it needs to be reflected on the display on the display 46 (step S1286: Yes)

Figure 20:
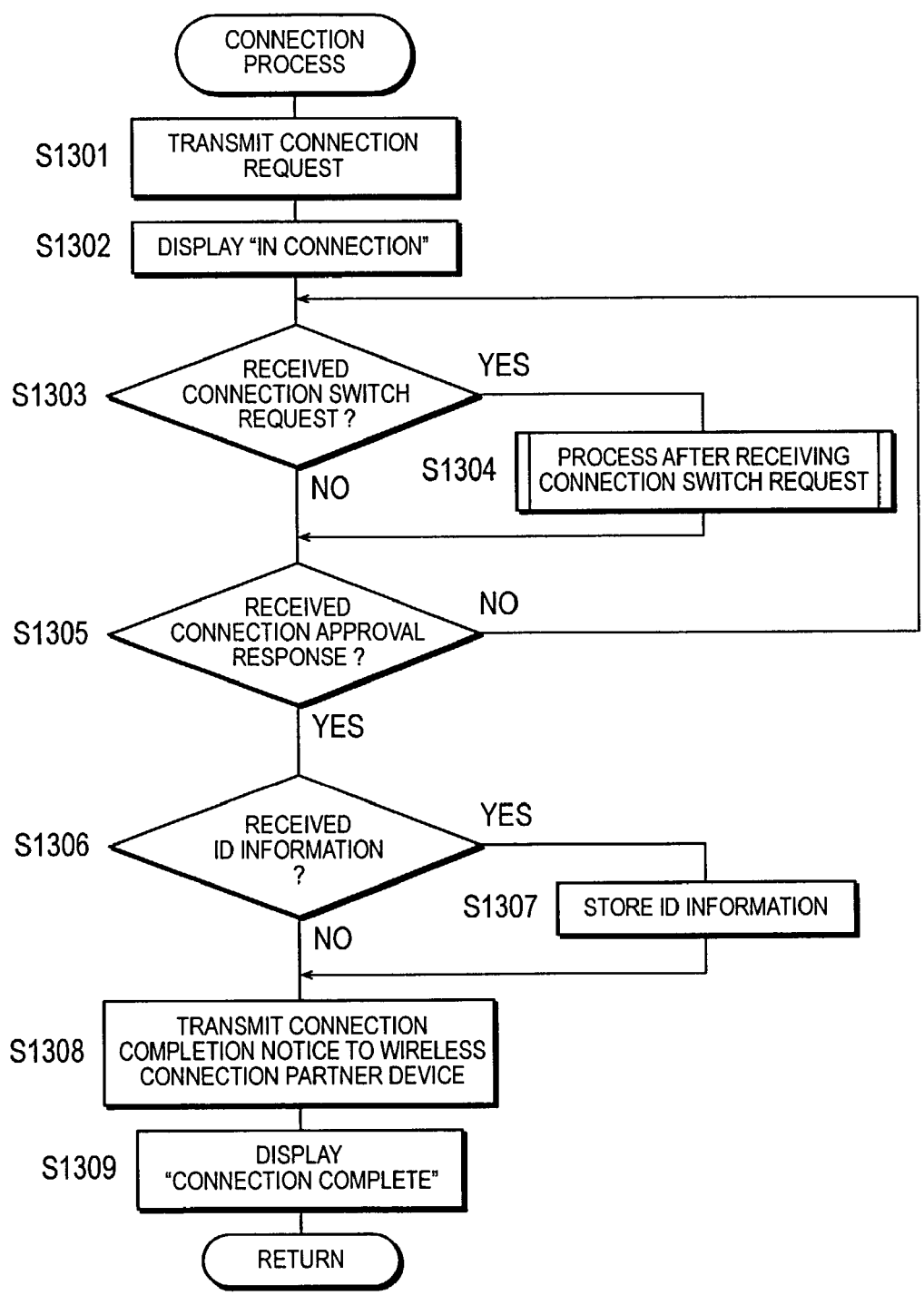
FIG. 20 is a flowchart showing the steps of a connection process.

Next, referring to FIG. 20, the connection process for connectability in the step 1282 of FIG. 19 will be described.

In the step S1301, the first connection request is transmitted to, for example, the device 20A via the local interface 48.

In the step S1302, a sign of "in connection" is displayed on the display 46.

In the step S1303, a judgment is made as to whether a connection switch request for switching the connection to another device is received from the device 20A. When the connection switch request is received (step S1303: Yes), the process after receiving the connection switch request for connectability is executed in the step S1304, the detail of which will be described later.

In the step S1305, the control waits for receiving a response of connection approval. If the connection approval response is not received (step S1305: No), the control returns to the step S1303.

In the step S1306, a judgment is made whether the ID information is received accompanying the response of connection approval. If the ID information is received (step S1306: Yes), the ID information is stored in the memory unit 43 in the step S1307.

In the step S1308, a connection completion notice for notifying the completion of the connection is transmitted to the corresponding device of the wireless communication.

In the step S1309, a sign of "connection completion" is displayed on the display 46.

Figure 21:
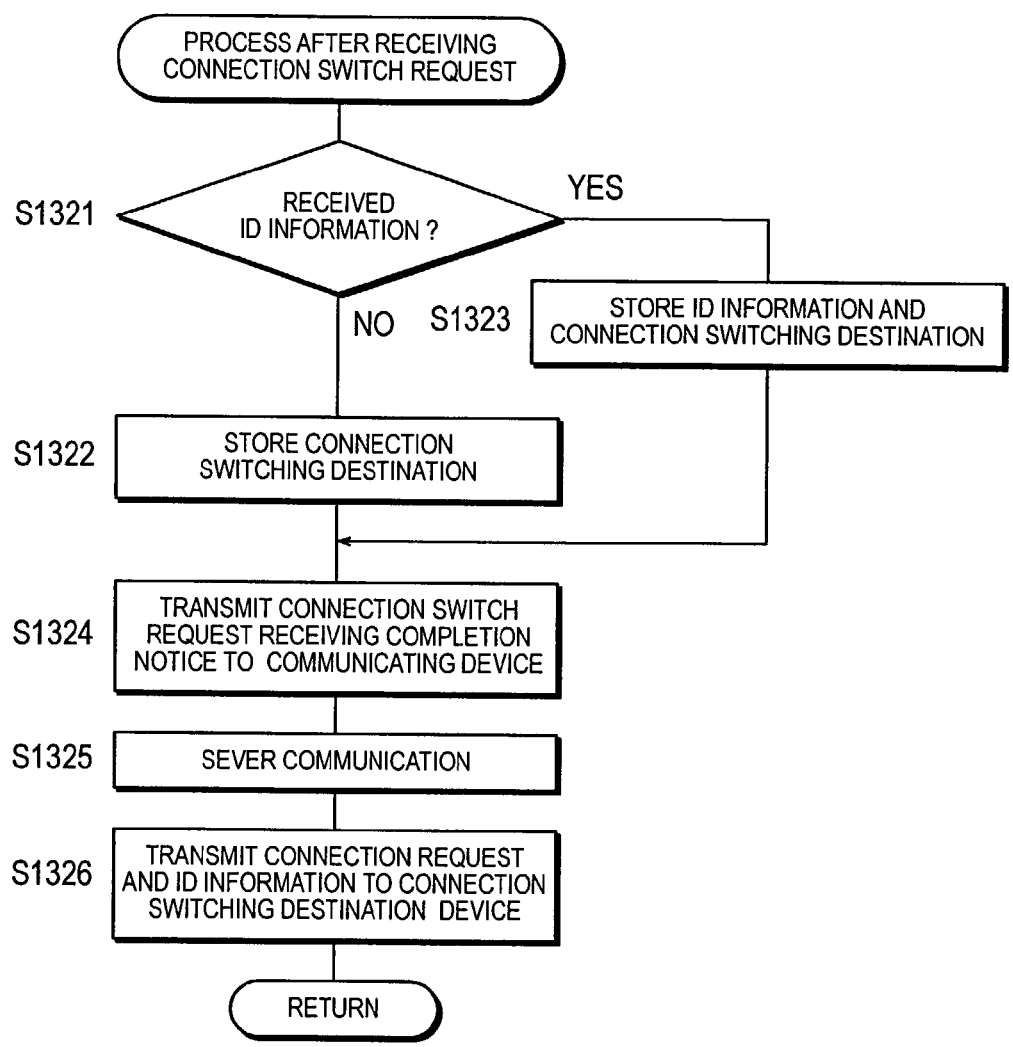
FIG. 21 is a flowchart showing the steps of a process after receiving a connection switch request.

Next, referring to FIG. 21, the process after receiving the connection switch request in the step 1304 of FIG. 20 will be described.

In the step S1321, a judgment is made whether the ID information is received accompanying the response of connection approval. If the ID information is received (step S1321: Yes), the ID information and the information of connection switching destination contained in the connection switch request are stored into the memory unit 43 (step S1323). If the ID information is not received (step S1321: No), the information of the connection switching destination is stored into the memory unit 43 (step S1322).

In the step S1324, a connection completion notice for notifying the completion of the connection switch request reception is transmitted to the device being communicating with.

In the step S1325, the communication is severed.

In the step S1326, the second connection request and the ID information are transmitted to the connection switching destination, for example, the device 20B, which is stored in the memory unit 43, through the local interface 48.

Figure 22:
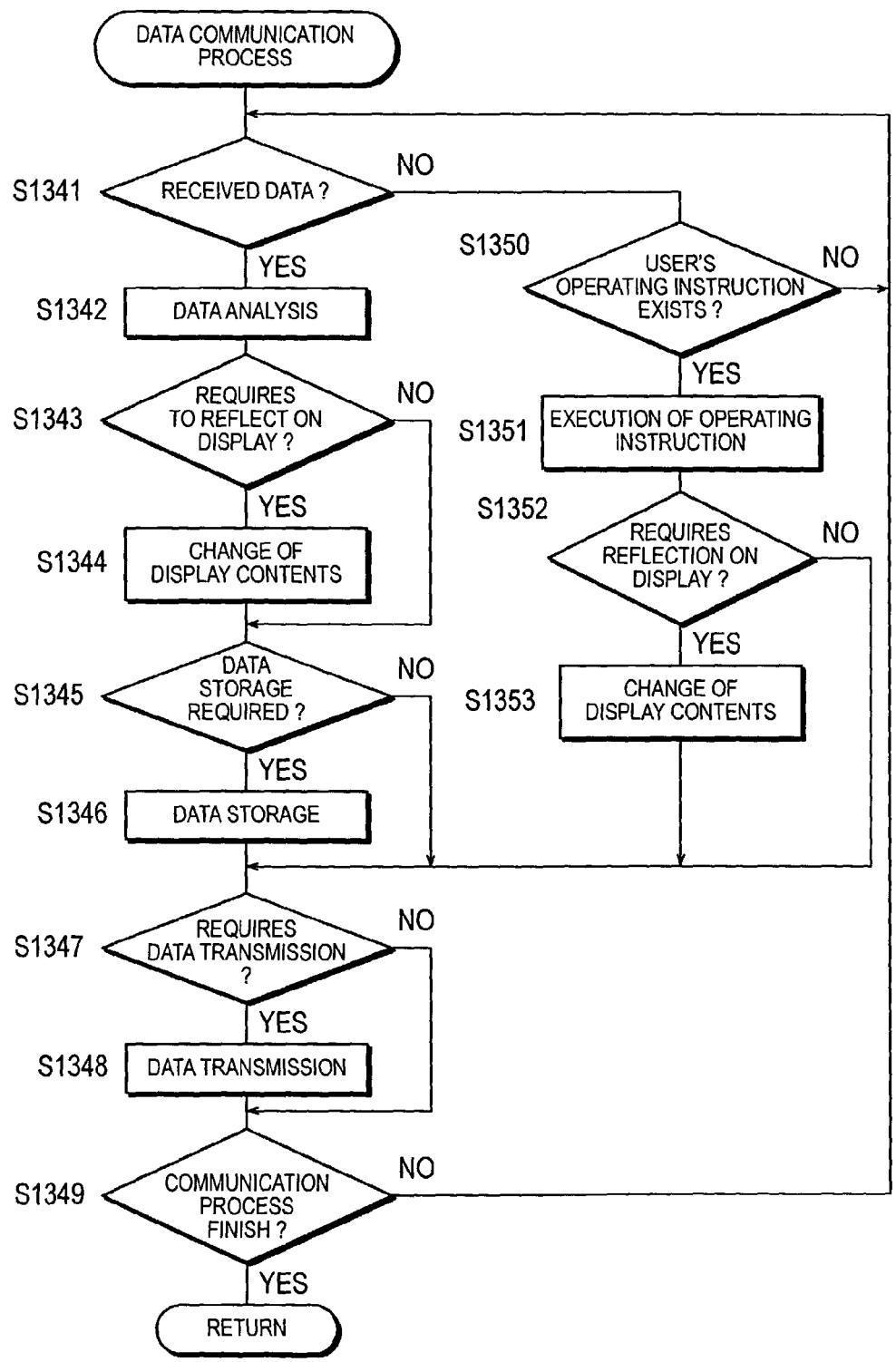
FIG. 22 is a flowchart showing the process of a data communication process.

Next, referring to FIG. 22, the data communication process in the step 1283 of FIG. 19 will be described.

In the step S1341, a judgment is made as to whether the data is received. If the data is received (step S1341: Yes), the process of the step S1342 is executed; if the data is not received (step S1341: No), the process of the step S1350 is executed.

In the step S1342, the received data is analyzed. It is detected here that the received data is the completion notice of a printing process.

In the step S1343, the display content on the display 46 is changed (step S1344) if the result of the analysis in the step S1342 is required to be reflected on the display (step S1343: Yes). The content of the completion notice of the printing process is displayed here on the display 46.

In the step S1345, a judgment is made as to whether the received data needs to be stored, and the data is stored into the memory unit 43 (step S1346) if the data is required to be stored (step S1345: Yes).

In the step S1347, a judgment is made as to whether the specified data needs to be transmitted, and the data is transmitted to the corresponding device being communicated with (step S1348) if the data is required to be transmitted (step S1347: Yes).

In the step S1349, a judgment is made as to whether the communication process is completed. When the communication process is completed (step S1349: Yes), the control returns to the flowchart shown in FIG. 19. If the communication process is not completed (step S1349: No), the control returns to the step S1341.

In the step S1350, a judgment is made as to whether the user's operating instruction has been received through the input keys 44. If the operating instruction has been received (step S1350: Yes), the process in the step 1351 is executed. If no operating instruction is received (step S1350: No), the control returns to the step S1341.

In the step S1351, the operating instruction received in the step S1350 is executed, and the display content on the display 46 will be changed (step S1353), if it needs to be reflected on the display on the display 46 (step S1352: Yes).

In the first embodiment, as can be seen from the above, when the portable terminal 40B transmits the first connection request to the device 20A while the portable terminal 40A is communicating with the device 20A, the device 20A asks devices on the network 60 whether they can communicate with the portable terminal 40B. The device 20A, upon receiving a response from, for example, a device 20B, which can communicate with the portable terminal 40B, instructs the portable terminal 40B to communicate with the device 20B providing the ID information. Moreover, the device 20A registers the ID information to the job list in itself. The potable terminal 40B transmits the second connection request to the designated device 20B and delivers the ID information. The device 20B, which serves as a relaying device, delivers the data received from the portable terminal 40B to the device 20A noted on the ID information. Moreover, when the device 20B receives data from the device 20A with the ID information, it delivers the data to the portable terminal 40B.

Thus, according to the first embodiment, when a portable terminal tries to establish a communication with a specified device and if the specified device is already occupied by wireless communication, it can assume the second connection format via another device on the network. Therefore, the situation where all wireless connections concentrate on one specific device can be avoided. Consequently, the reduction of the communication speed can be avoided when portable terminals try to communicate with corresponding devices utilizing local wireless communication.

Next, the second embodiment of the present invention will be described below. The description of the second embodiment below will primarily be concerned with the points which differ from those already described in the first embodiment, avoiding repetitious descriptions on commonality.

The operations of the data communication device of the second embodiment will be described below referring to FIG. 30 through FIG. 39. The algorithm shown in the flowchart of FIGS. 30 through 39 is stored as a program in, for example, the ROM 22 and is executed by the CPU 21.

The flowcharts in FIG. 5, FIG. 6, FIG. 8, FIG. 9, FIG. 10 and FIG. 12 in the first embodiment are used in similar manners in the second embodiment, so that their descriptions will not be repeated.

Figure 30:
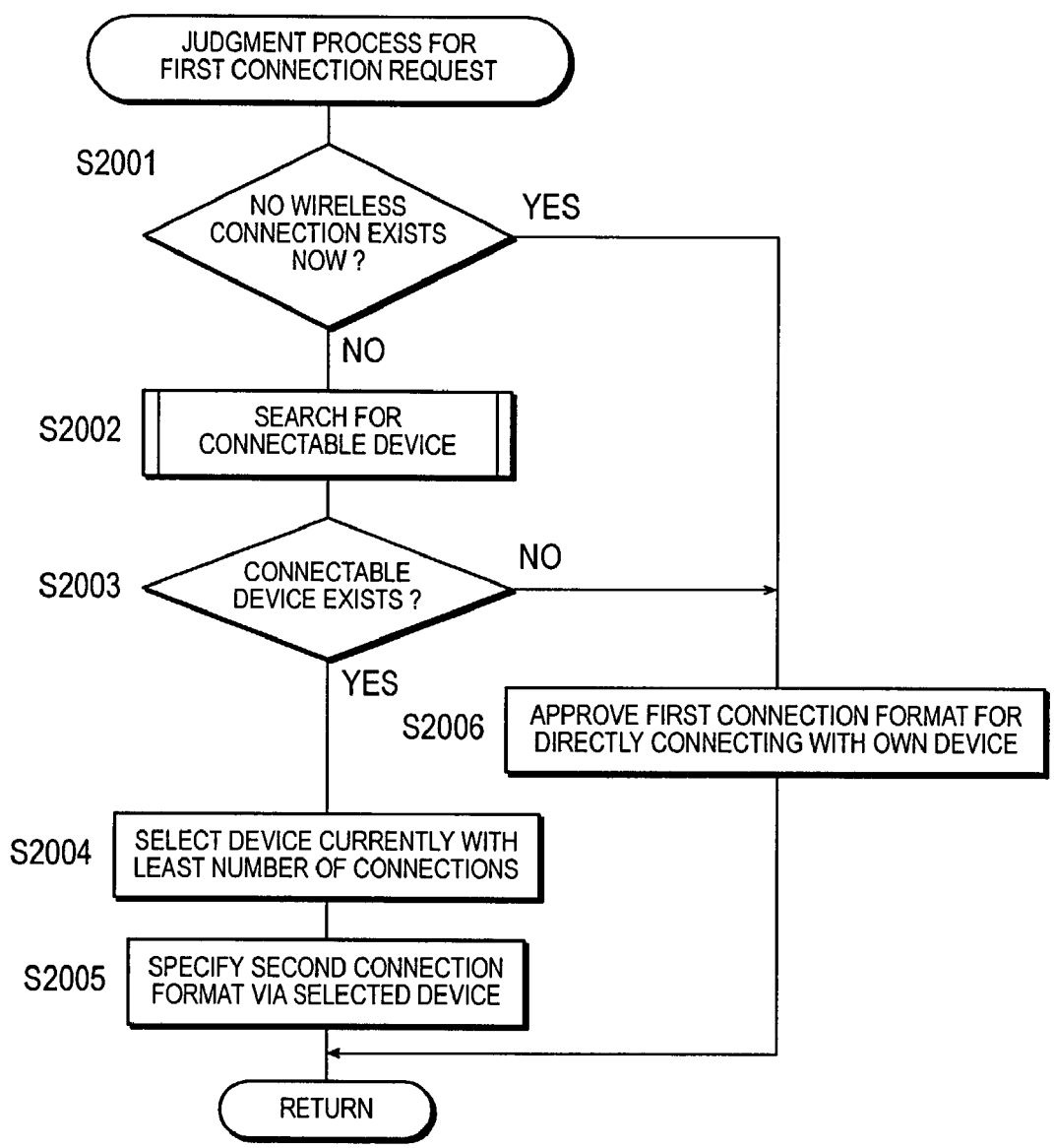
FIG. 30 is a flowchart showing the steps of a judgment procedure in response to the first connection request in the second embodiment.

First, the steps of the judgment process for the first connection request in the step S1022 of FIG. 6 will be described referring to FIG. 30 for the second embodiment.

Figure 7:
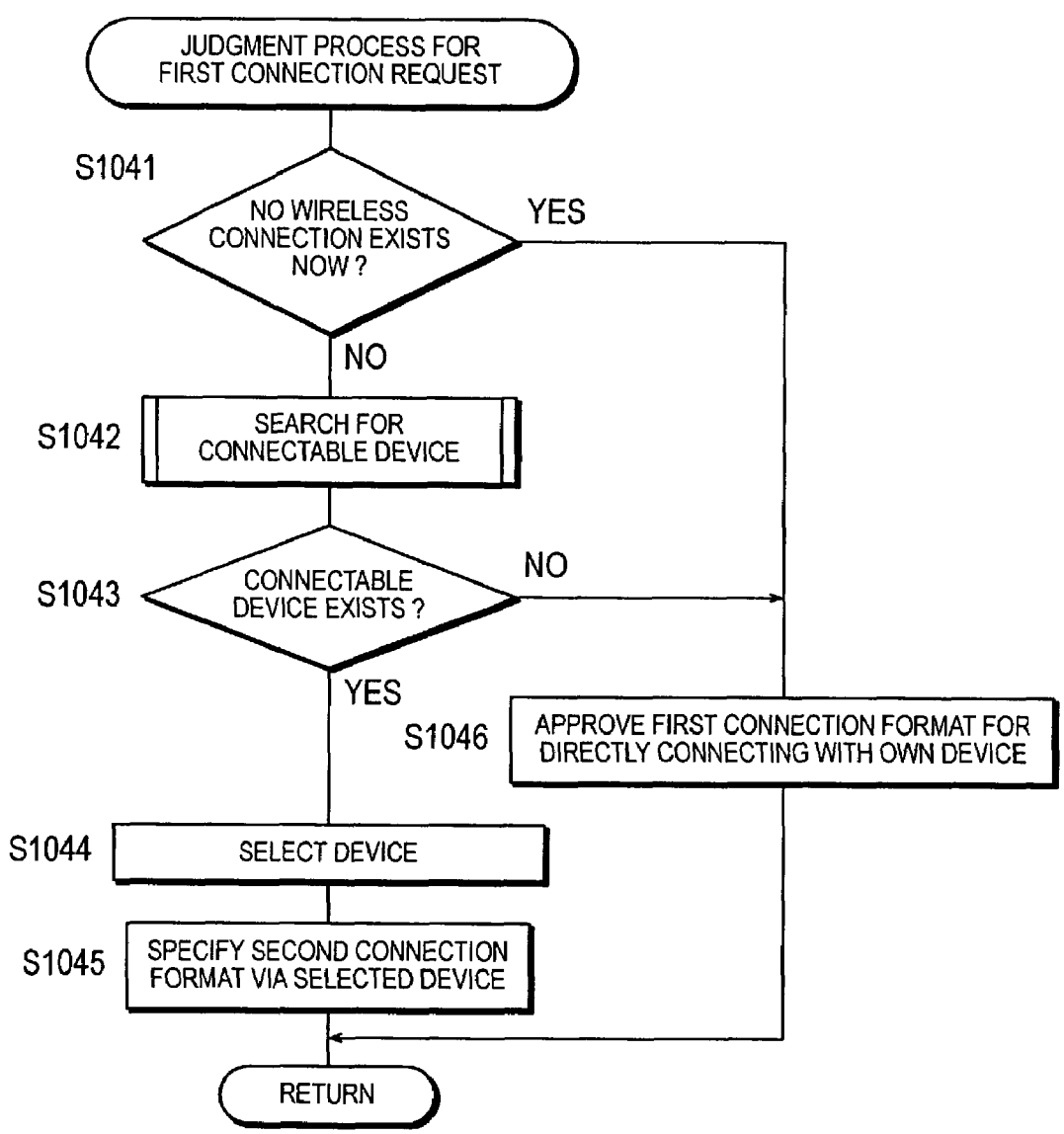
FIG. 7 is a flowchart showing the steps of a judgment process in response to the first connection request.

The processes except that of the step S2004 are identical to those shown in FIG. 7, so that their descriptions are omitted.

In the step S2004, a device that currently has a minimum number of connections is selected among wirelessly connectable devices that are searched in the step S2002.

Next, referring to FIG. 31, the normal communication process in the step S1085 of FIG. 9 will be described for the second embodiment.

Figure 31:
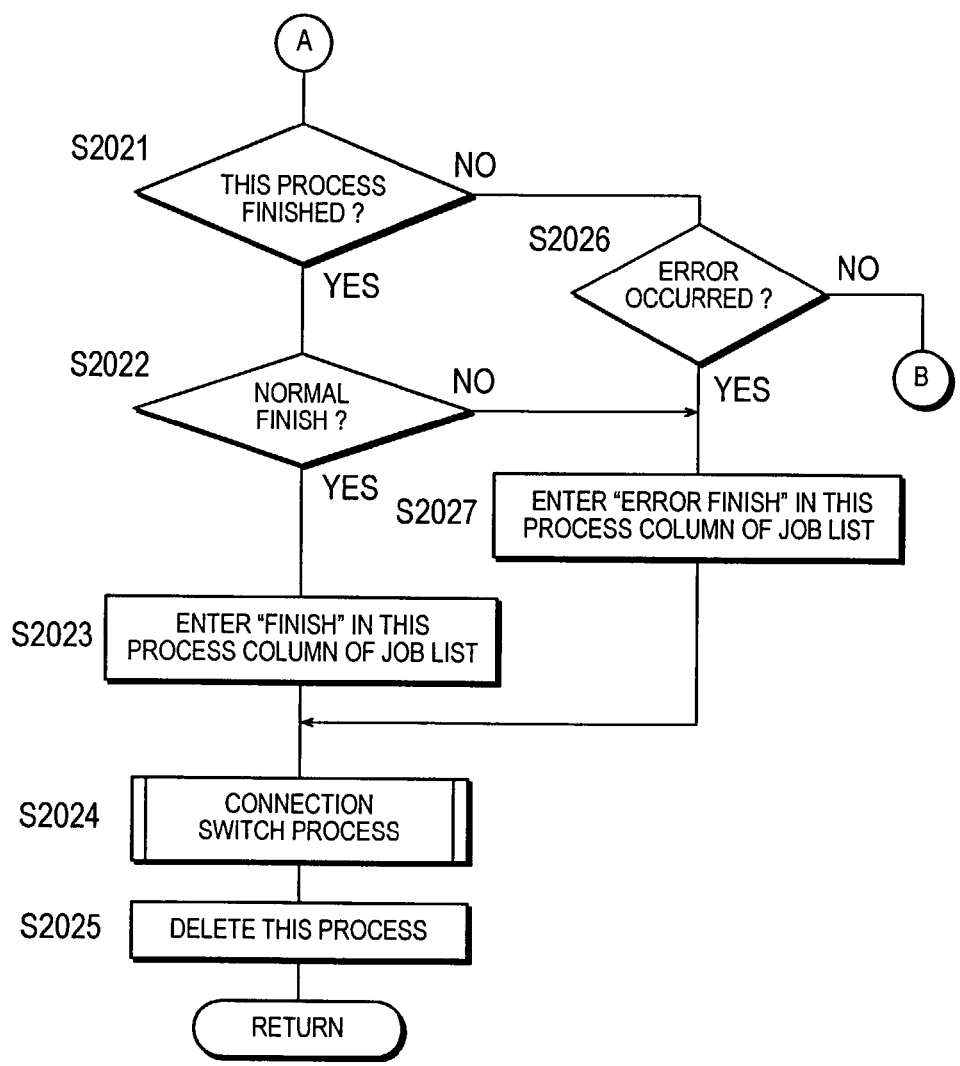
FIG. 31 is a flowchart showing the steps of executing a normal communication process.

As shown in FIG. 31, the process of the step S2024 is added to FIG. 11. The processes except that of the step S2024 are identical to those shown in FIG. 11, so that their descriptions are omitted.

In the step S2024, the connection switch process is conducted for switching the corresponding partner of the portable terminal to another device.

Figure 32:
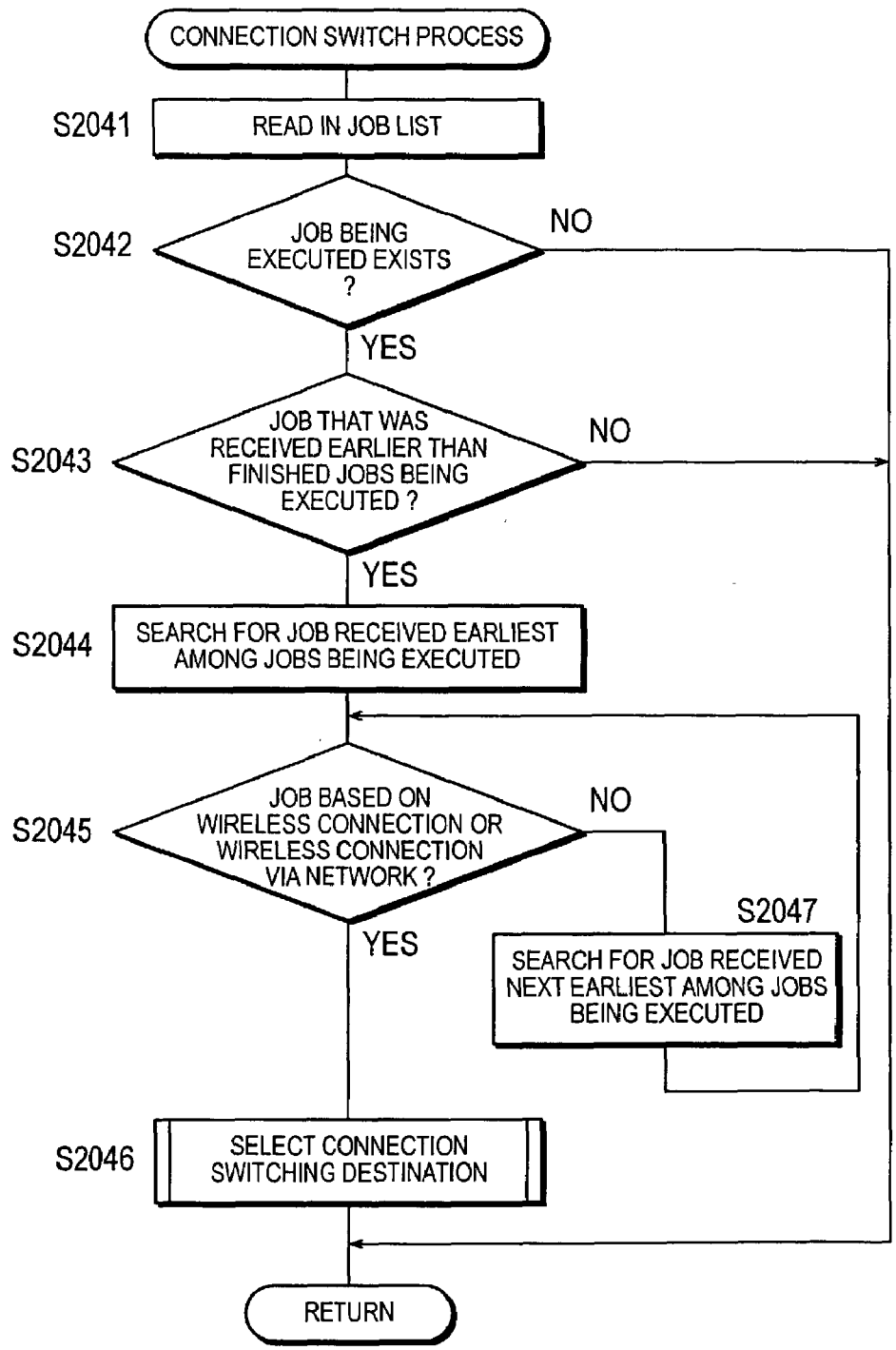
FIG. 32 is a flowchart showing the steps of a connection switching process.

Next, referring to FIG. 32, the connection switch process in the step 2024 of FIG. 31 will be described.

In the step S2041, the job list of, for example, the device 20A will be read into the working area of the memory unit 23.

In the step S2042, a judgment is made whether there is a job currently being executed among jobs listed in the job list. If there is a job currently being executed (step S2042: Yes), the process of the step S2043 is executed; if there is no job currently being executed (step S2042: No), it returns to the flowchart shown in FIG. 31.

In the step S2043, a judgment is made whether there is a job currently being executed that was registered to the device 20A earlier than the job that was finished in the step S2021 of FIG. 31. If a job that was registered earlier than the finished job is currently being executed (step S2043: Yes), the process of the step S2044 is executed; if no job that was registered earlier than the finished job is currently being executed (step S2043: No), the control returns to the flowchart of FIG. 31. The process of the step S2043 can be omitted.

In the step S2044, the control searches the job that was registered earliest among those currently being executed.

In the step S2045, a judgment is made as to whether the job searched in the step S2044 is a job based on a wireless connection or a wireless connection via the network 60. If it is a job based on a wireless connection (step S2045: Yes), the process of the step S2046 will be executed. If it is not a job based on a wireless connection (step S2045: No), the control searches the job that was registered earliest among those that are being executed currently (step S2047) and then returns to the step S2045.

In the step S2046, the connection switching destination, which is the switching destination for the connection partner of the portable terminal, is selected.

Figure 33:
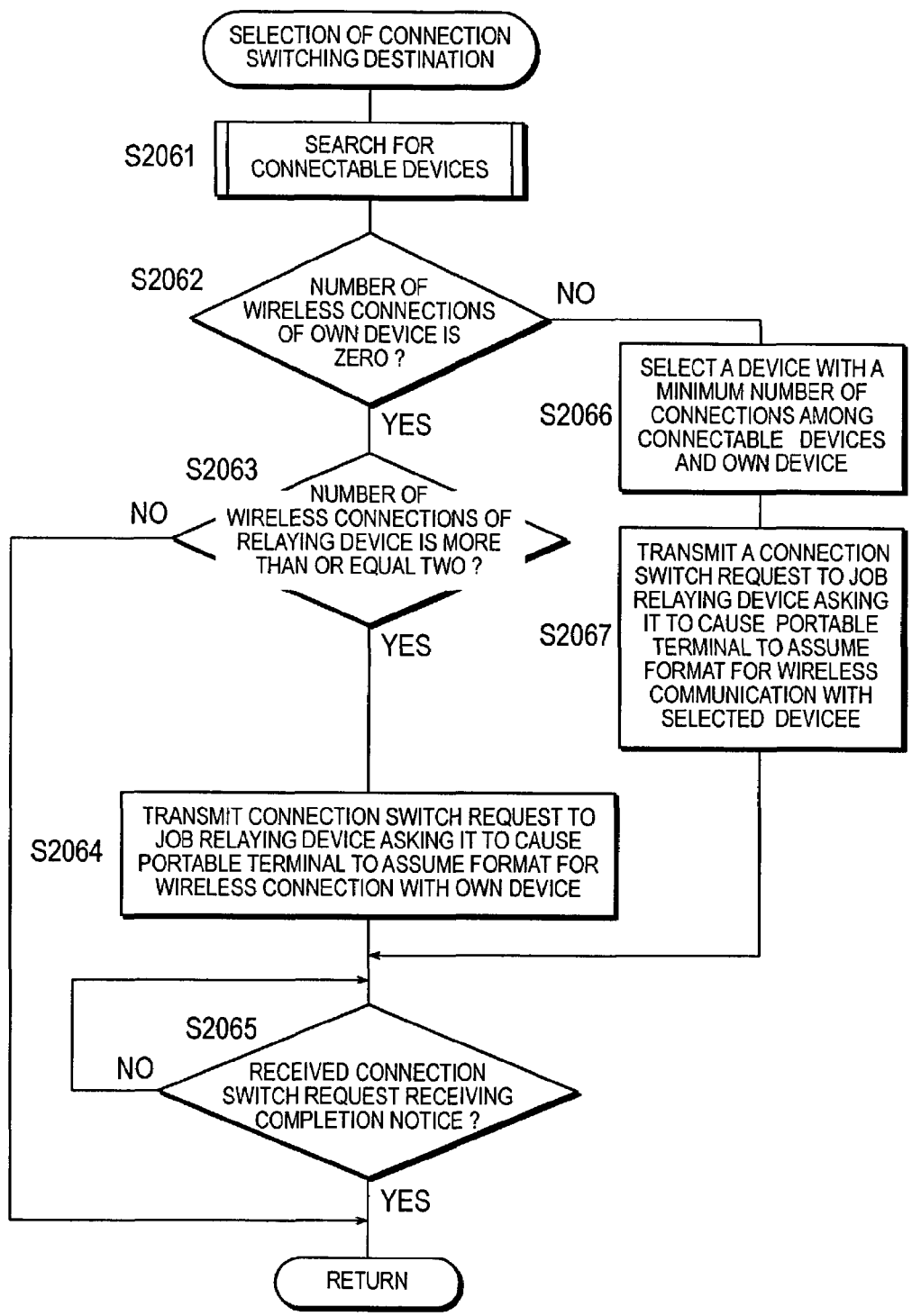
FIG. 33 is a flowchart showing the steps of a process for selecting a connection switching destination.

Next, referring to FIG. 33, the selection process for the connection switching destination in the step 2046 of FIG. 32 will be described.

In the step S2061, wirelessly connectable devices are searched among other devices on the network 60.

In the step S2062, a judgment is made as to whether the number of wirelessly connected partners of the own device, for example, the device 20A, i.e., the number of wireless connections of the own device, is zero. If the number of wireless connections is zero (step S2062: Yes), the process of the step S2063 will be executed; if the number of wireless connections is not zero (step S2062: No), the process of the step S2066 will be executed.

In the step S2063, a judgment is made as to whether the number of wirelessly connected partners of the own device, for example, the device 20B, i.e., the number of wireless connections of the own device, is not less than 2. If the number of wireless connections for the relay device is more than or equal to 2 (step S2063: Yes), the process of the step S2064 is executed; if the number of wireless connections for the relay device is less than 2 (step S2063: No), the control returns to the flowchart shown in FIG. 32.

In the step S2064, the connection switch request is transmitted to the device 20B, which is the job's relay device, so that, for example, the portable terminal 40B can assume a format of wirelessly connecting with the own device, for example, the device 20A.

In the step S2065, the control waits for a connection switch request receiving completion notice that notifies the completion of receiving the connection switch request from the job's relay device.

On the other hand, in the step S2066, a device that currently has a minimum number of connections is selected among connectable devices that are searched in the step S2061 and the own device.

In the step S2067, a connection switch request is transmitted to the job's relay device, for example, the device 20B, so that, for example, the portable terminal 40B can assume a format of wirelessly connecting with the device selected in the step S2066.

Figure 34:
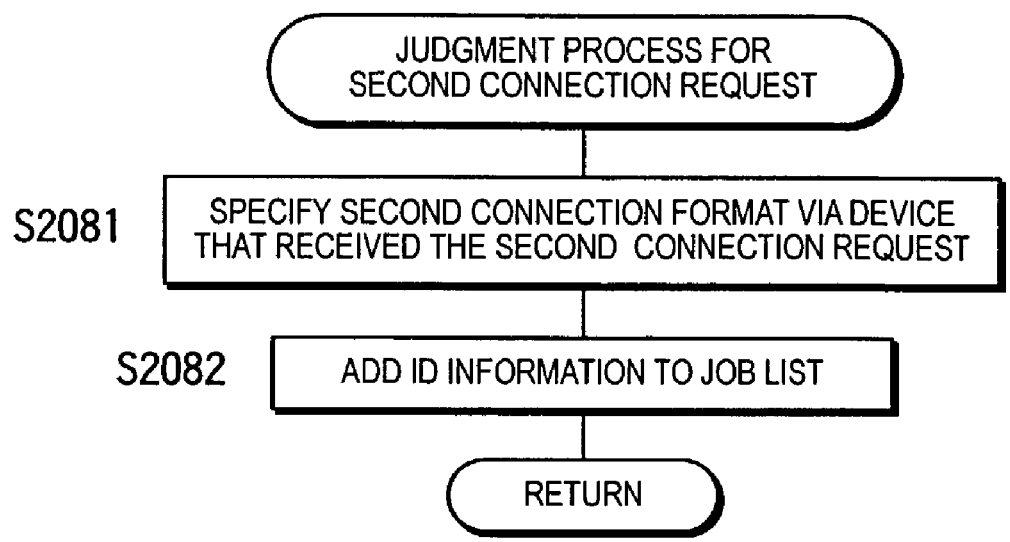
FIG. 34 is a flowchart showing the steps of a judgment process in response to the second connection request.

Next, the judgment process for the second connection request in the step S1142 of FIG. 12 will be described for the second embodiment referring to FIG. 34.

In the step S2081, the second connection format, which goes through, for example, the device 20B that has received the second connection request, is specified.

In the step S2082, the ID information is added to the job list stored, for example, in the memory unit 23 of the device 20B that has received the second connection request.

Next, referring to FIG. 35, the search process for the relay data communication in the step S1148 of FIG. 12 will be described for the second embodiment.

Figure 35:
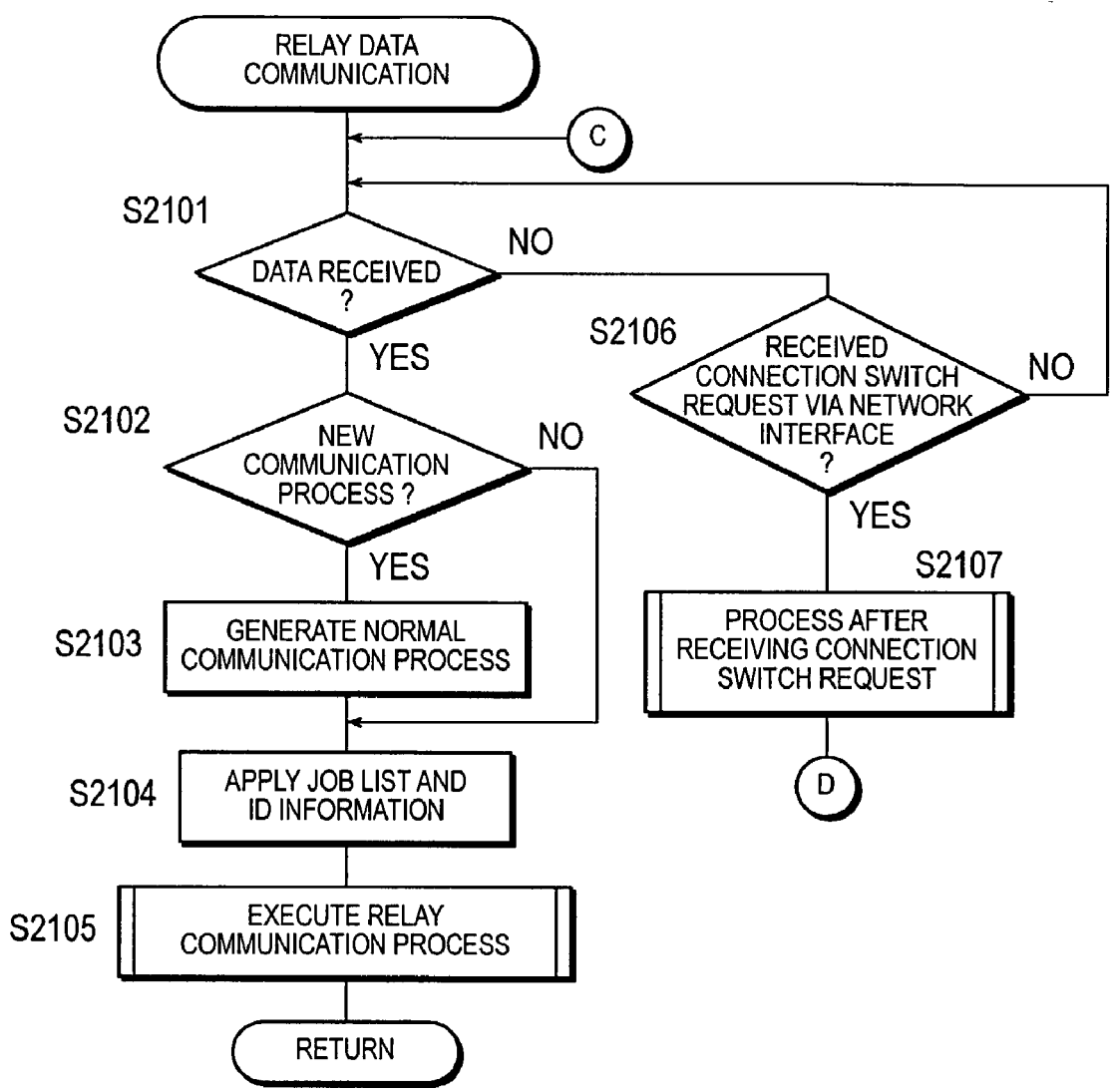
FIG. 35 is a flowchart showing the steps of a relay data communication process.

As shown in FIG. 35, the processes of the steps S2106 and S2107 are added to FIG. 14. The processes except these steps are identical to those shown in FIG. 14, so that their descriptions are omitted.

In the step S2106, a judgment is made as to whether a connection switch request has been received via the network interface 26, when no data is received in the step S2101 (step S2101: No). If a connection switch request is received (step S2106: Yes), the process of the step S2107 is executed; if no connection switch request is received (step S2106: No), the control returns to the step S2101.

In the step S2107, the process that follows the receipt of the connection switch request is executed, and the detail of this process will be described later.

Next, the procedures of the relay communication process in the step S2105 of FIG. 35 will be described referring to FIG. 36.

Figure 15:
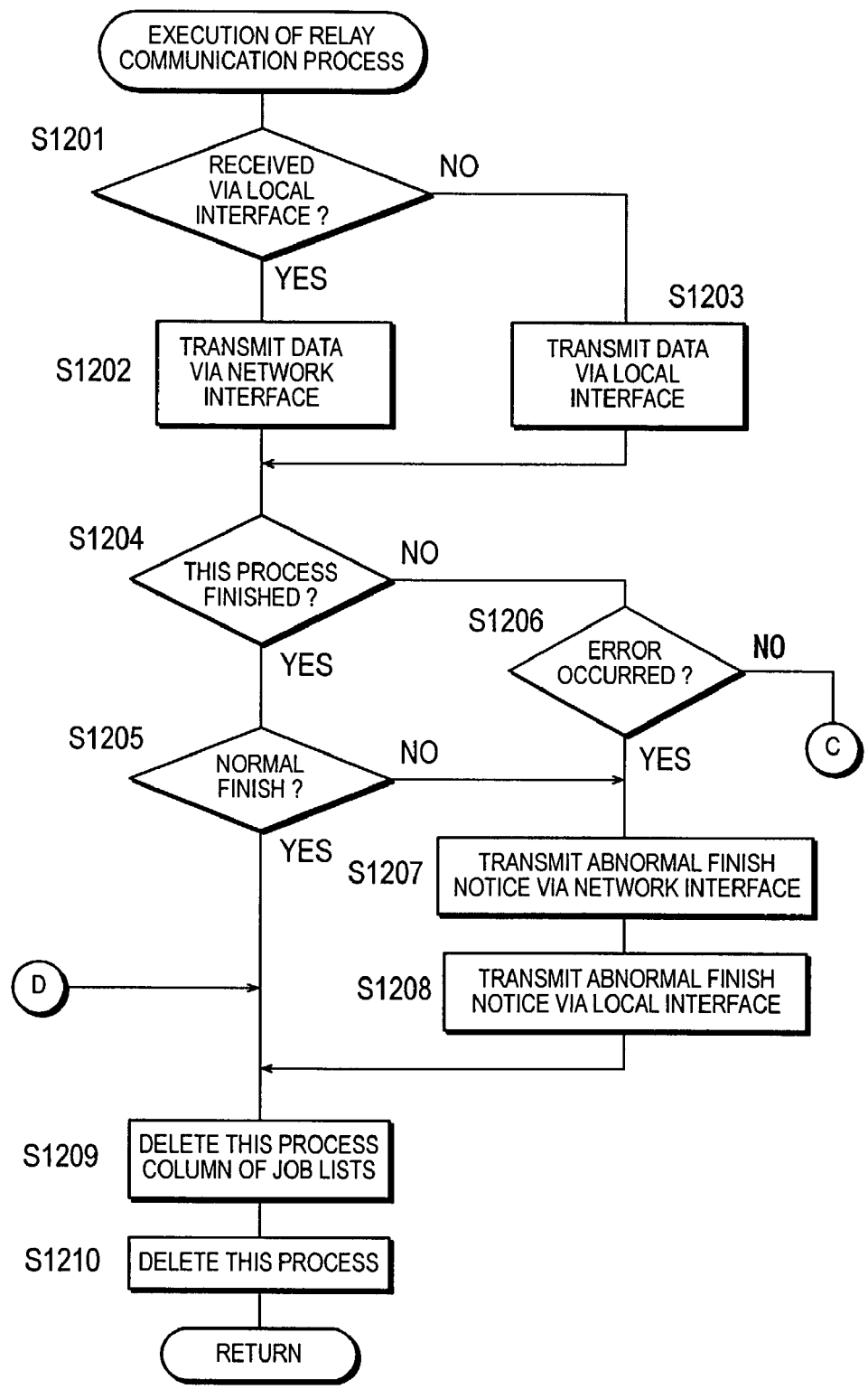
FIG. 15 is a flowchart showing the steps of executing a relay communication process.
Figure 36:
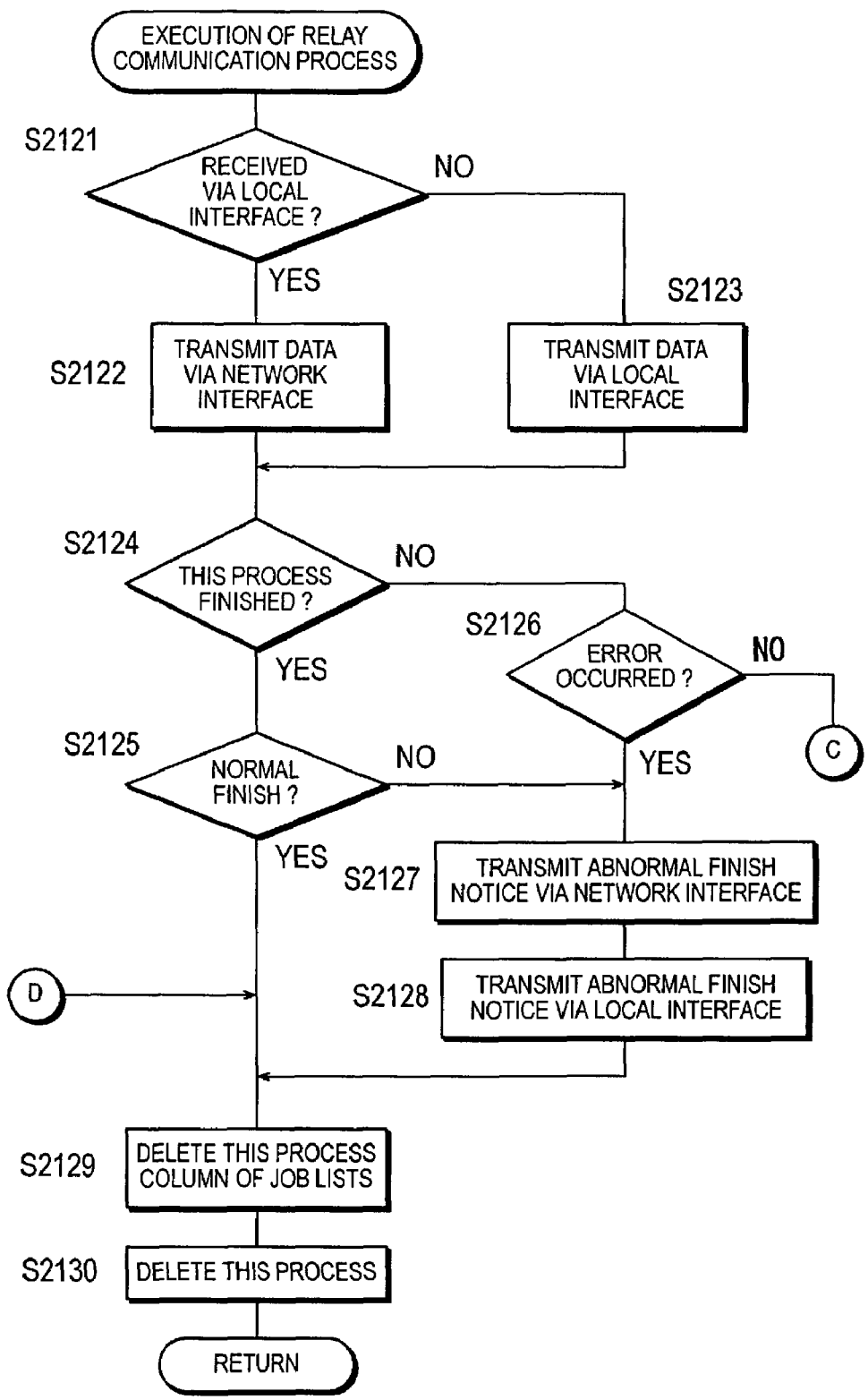
FIG. 36 is a flowchart showing the steps of executing a relay communication process.

As can be seen from FIG. 36, an in-connector indicated by a symbol "D" is added immediately before the step S2129 in comparison with FIG. 15. In other words, the step S2129 of FIG. 36 is executed after the process of the step S2107 of FIG. 35 is completed. The processes except this are identical to those shown in FIG. 15, so that their descriptions are omitted.

Figure 37:
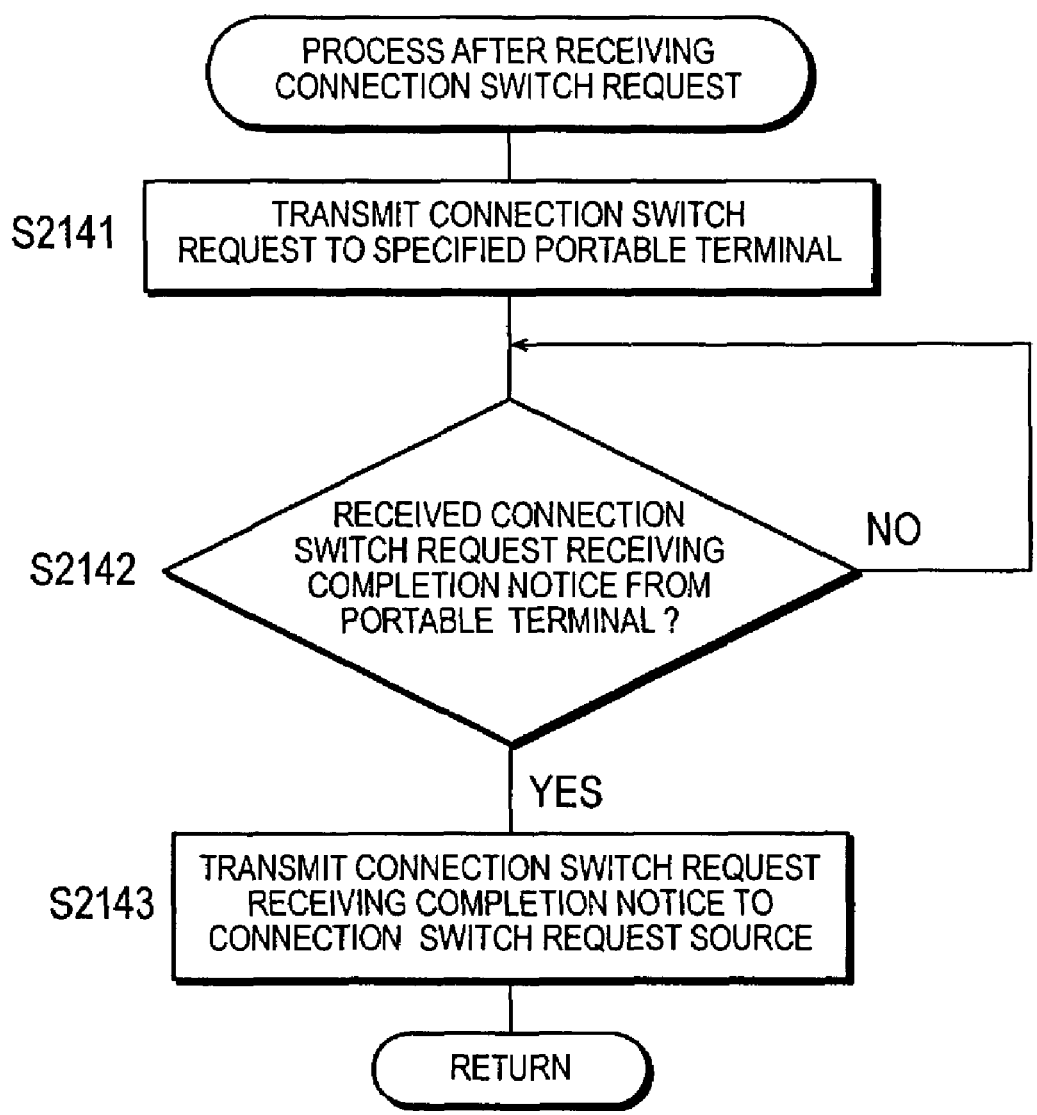
FIG. 37 is a flowchart showing the steps of a process after receiving a connection switch request.

Next, referring to FIG. 37, the process after receiving the connection switch request in the step 2107 of FIG. 35 will be described.

In the step S2141, a connection switch request is transmitted to, for example, the portable terminal 40B, which is the specified portable terminal.

In the step S2142, the program waits for a receiving completion notice of the connection switch request that notifies that the connection switch request has been received from the portable terminal 40B.

In the step S2143, a connection completion notice for notifying the completion of the connection switch request reception is transmitted to the source of the connection switch request, for example, device 20A.

Figure 38:
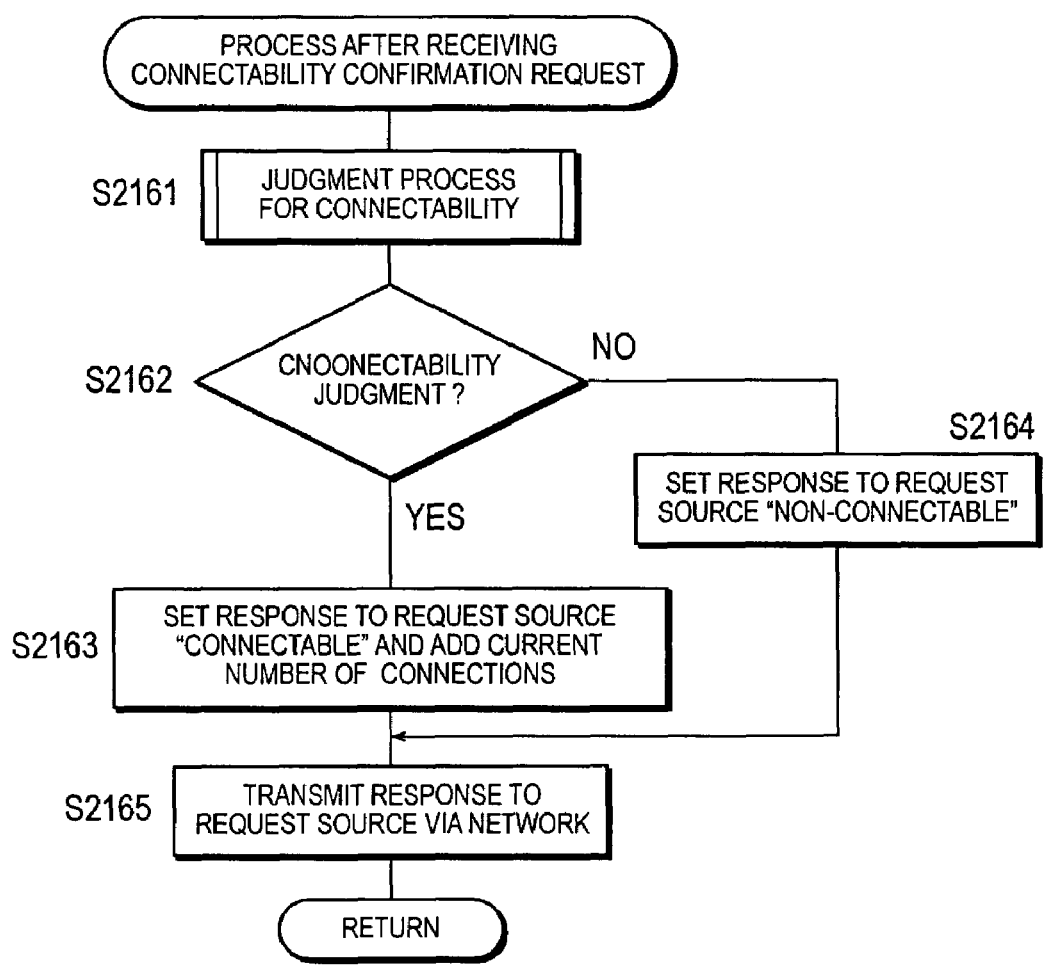
FIG. 38 is a flowchart showing the steps of a process after receiving a request for confirmation of connectability.

Next, we will describe the steps of the process that follows the receipt of the confirmation request for connectability at the device 20B in the step S1006 of FIG. 5 with reference to FIG. 38 for the second embodiment.

The processes except that of the step S2163 are identical to those shown in FIG. 16, so that their descriptions are omitted.

In the step S2163, the response to the device 20A, which is the source of the connection switch request, is set "connectable," and the current number of connections at the device 20B is attached to the response.

Next, referring to FIG. 39, the steps of the judgment process for connectability in the step 2161 of FIG. 38 will be described.

Figure 17:
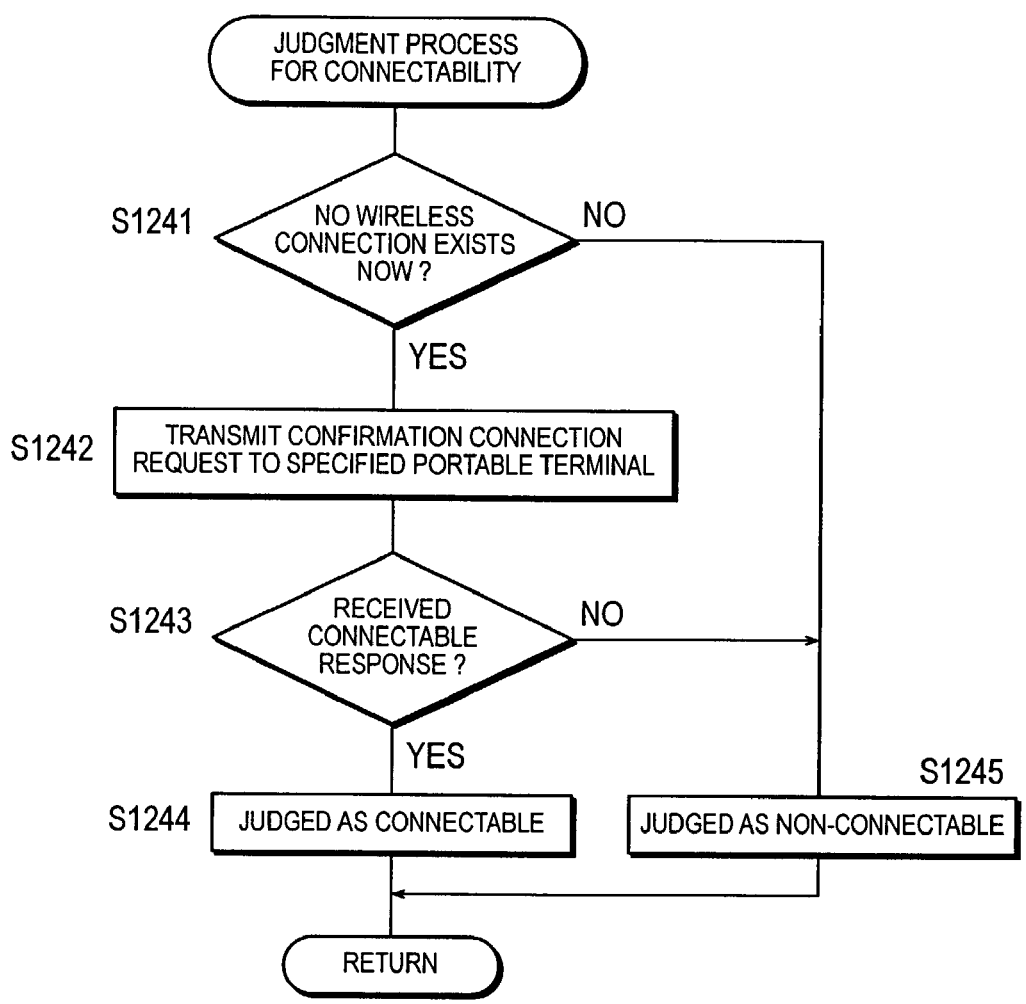
FIG. 17 is a flowchart showing the steps of a process for judging the connectability.

The processes except that of the step S2181 are identical to those shown in FIG. 17, so that their descriptions are omitted.

In the step S2181, the current number of connections, for example, at the device 20B is detected from the job list.

Since the operation at the portable terminal is the same as in the first embodiment, its descriptions are not repeated here. However, if a connection switch request is received during the data communication processing, the connection switch process shall be executed.

In the second embodiment, as can be seen from the above, when the terminal 40B and the portable terminal 40C come to communicate with the device 20A via the device 20B as a result of sequential transmissions of connection requests to the device 20A by the portable terminal 40B and the portable terminal 40C while the portable terminal 40A is already communicating with the device 20A, the device 20A transmits a connection switch request to the device 20B, which is the relaying device, asking it to assume a format to allow the portable terminal 40B, whose request was received earliest, to connect wirelessly with the own device, i.e., the device 20A, when the device 20A finishes its communication with the portable terminal 40A.

Thus, according to the second embodiment, in addition to the advantage of being able to suppress the reduction of the communication speed when a portable terminal communicates with another device using local wireless communication means, it is possible to control in such a way that the earlier the job's wireless connection request is received by the specific device, the higher the communication speed will be.

Next, the third embodiment of the present invention will be described below. The description of the third embodiment below will primarily be concerned with the points which differ from those already described in the first embodiment, avoiding repetitious descriptions on commonality.

The operations of the data communication device of the third embodiment will be described below referring to FIG. 40 through FIG. 45. The algorithm shown in the flowchart of FIGS. 40 through 45 is stored as a program in, for example, the ROM 22 and is executed by the CPU 21.

The flowcharts in FIG. 5, FIG. 8 through FIG. 11, FIG. 14, and FIG. 15 in the first embodiment are used in similar manners in the third embodiment, so that their descriptions will not be repeated.

Figure 40:
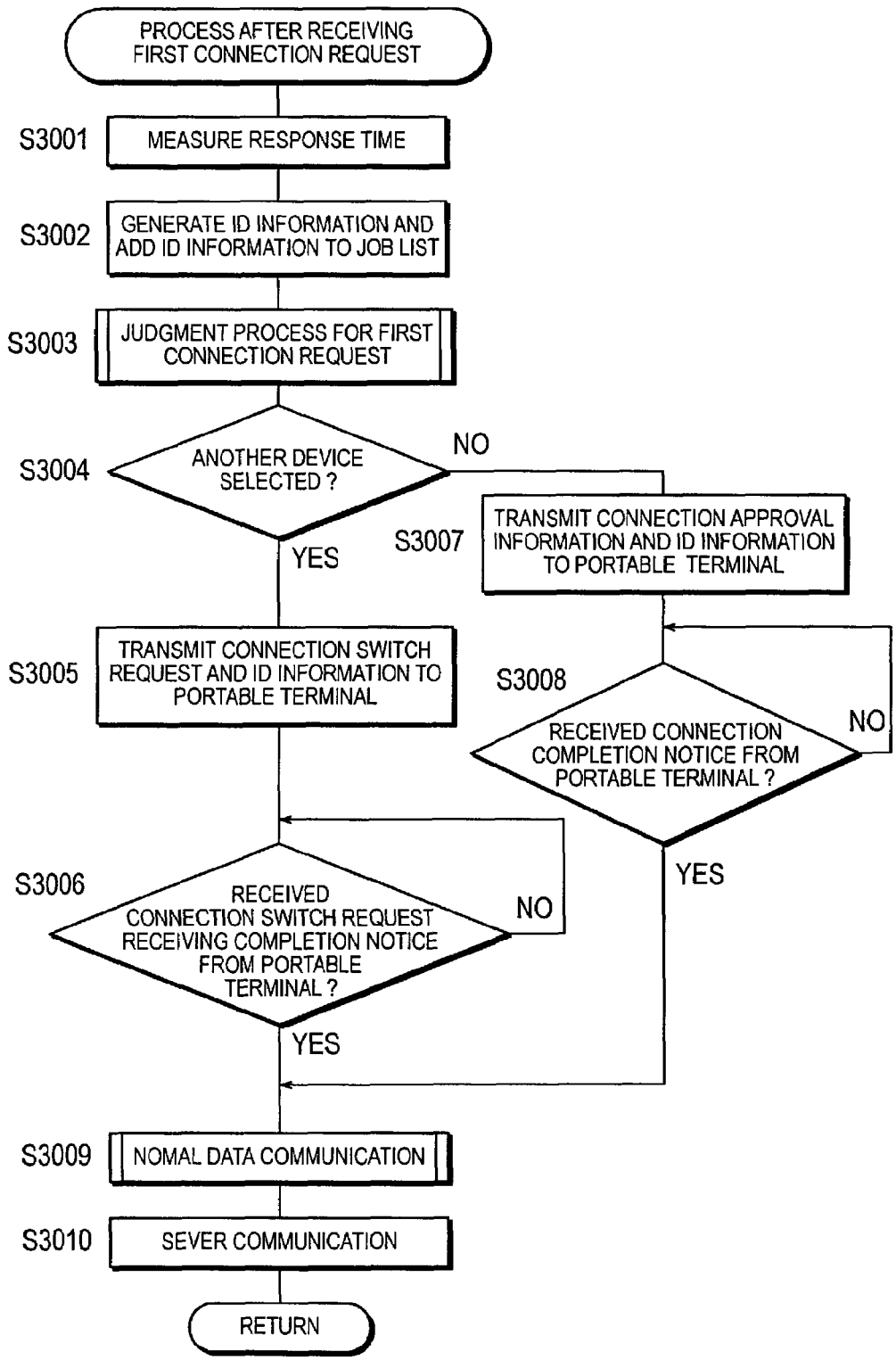
FIG. 40 is a flowchart showing the steps of a process after receiving the first connection request in the third embodiment.

First, the steps of the judgment process for the first connection request in the step S1002 of FIG. 5 will be described referring to FIG. 40 for the third embodiment.

In the step S3001, the measurement of the response time is executed. A specific job request is made by, for example, the device 20A to, for example, the portable terminal 40A, and the time until the reception of the response is measured here. The measurement of the response time is made by using the ping, which is the program for sending out the response request.

The processes except that of the step S3001 are identical to those shown in FIG. 6, so that their descriptions are omitted.

Next, the steps of the judgment process for the first connection request in the step S3003 of FIG. 40 will be described referring to FIG. 41.

Figure 41:
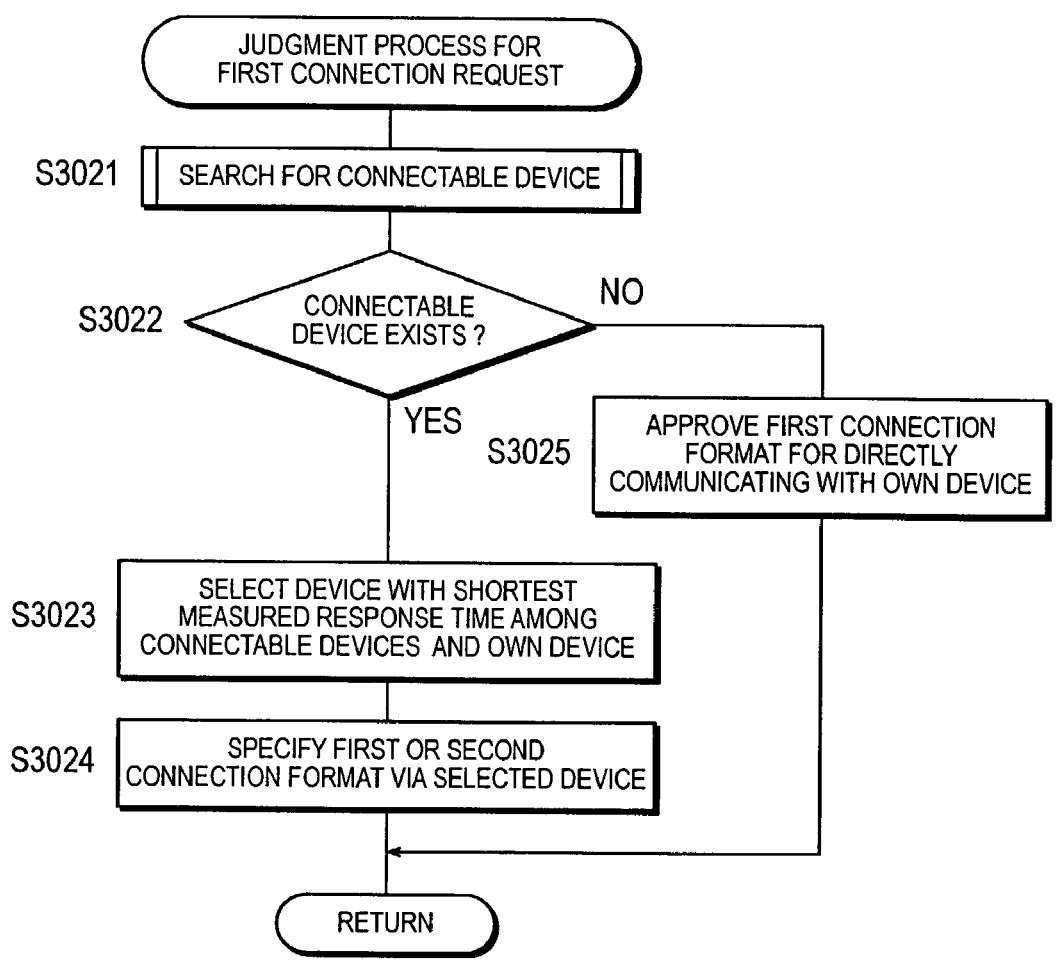
FIG. 41 is a flowchart showing the steps of a judgment process in response to the first connection request.

As shown in FIG. 41, the step S1041 shown in FIG. 7 is omitted in the third embodiment. The processes except those of the steps S3023 and S3024 are identical to those shown in FIG. 7, so that their descriptions are omitted.

In the step S3023, a device that currently has the shortest measured response time is selected among wirelessly connectable devices that are searched in the step S3021.

In the step S3024, the first or second connection format that goes through the device, which was selected in the step S3023, is specified.

Figure 42:
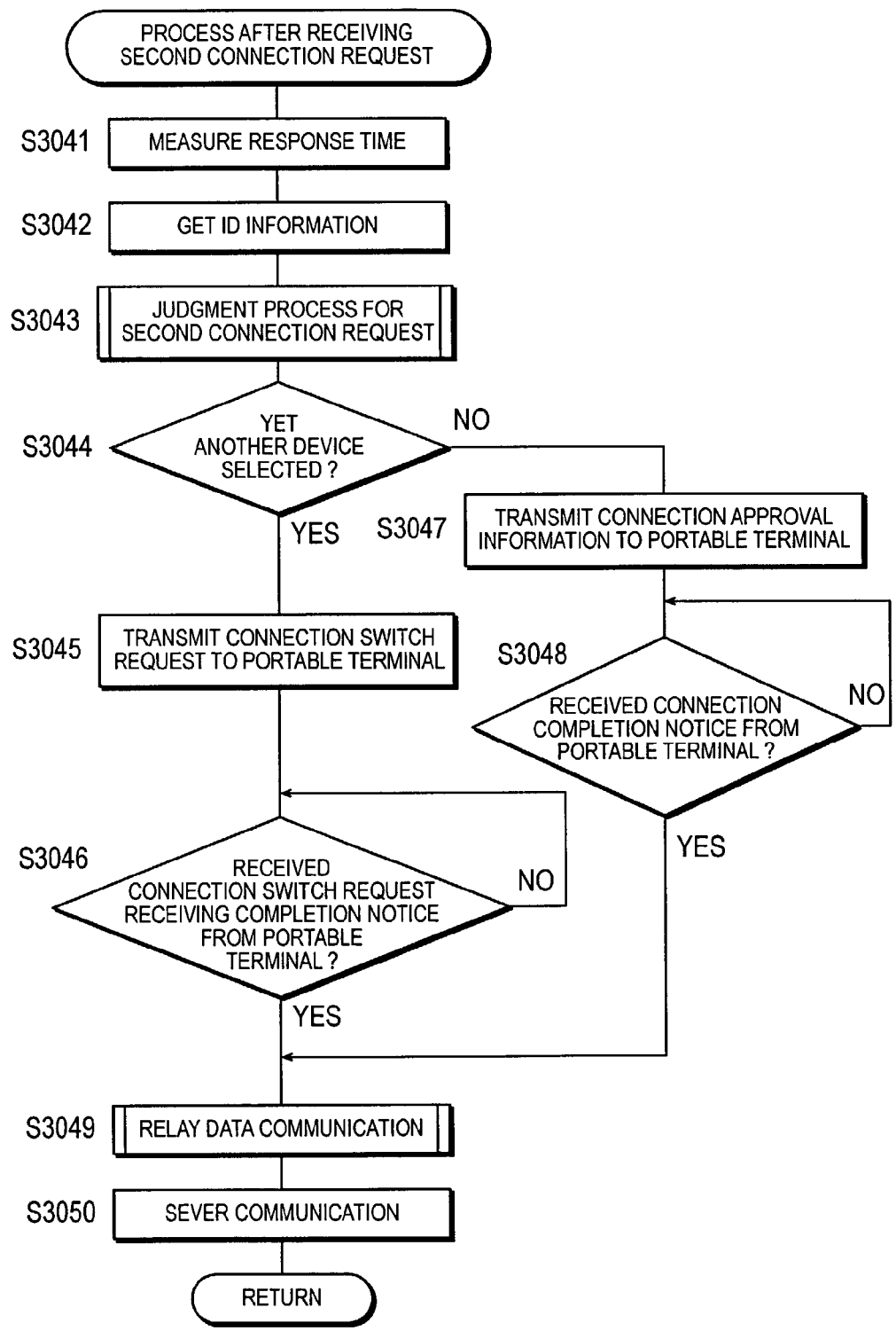
FIG. 42 is a flowchart showing the steps of a process after receiving the second connection request.

Next, the process after receiving the second connection request in the step S1004 of FIG. 5 will be described referring to FIG. 42 for the third embodiment.

In the step S3041, the measurement of the response time is executed. A specific job request is made by, for example, the device 20B to, for example, the portable terminal 40B, and the time until the reception of the response is measured here.

The processes except that of the step S3041 are identical to those shown in FIG. 12, so that their descriptions are omitted.

Figure 43:
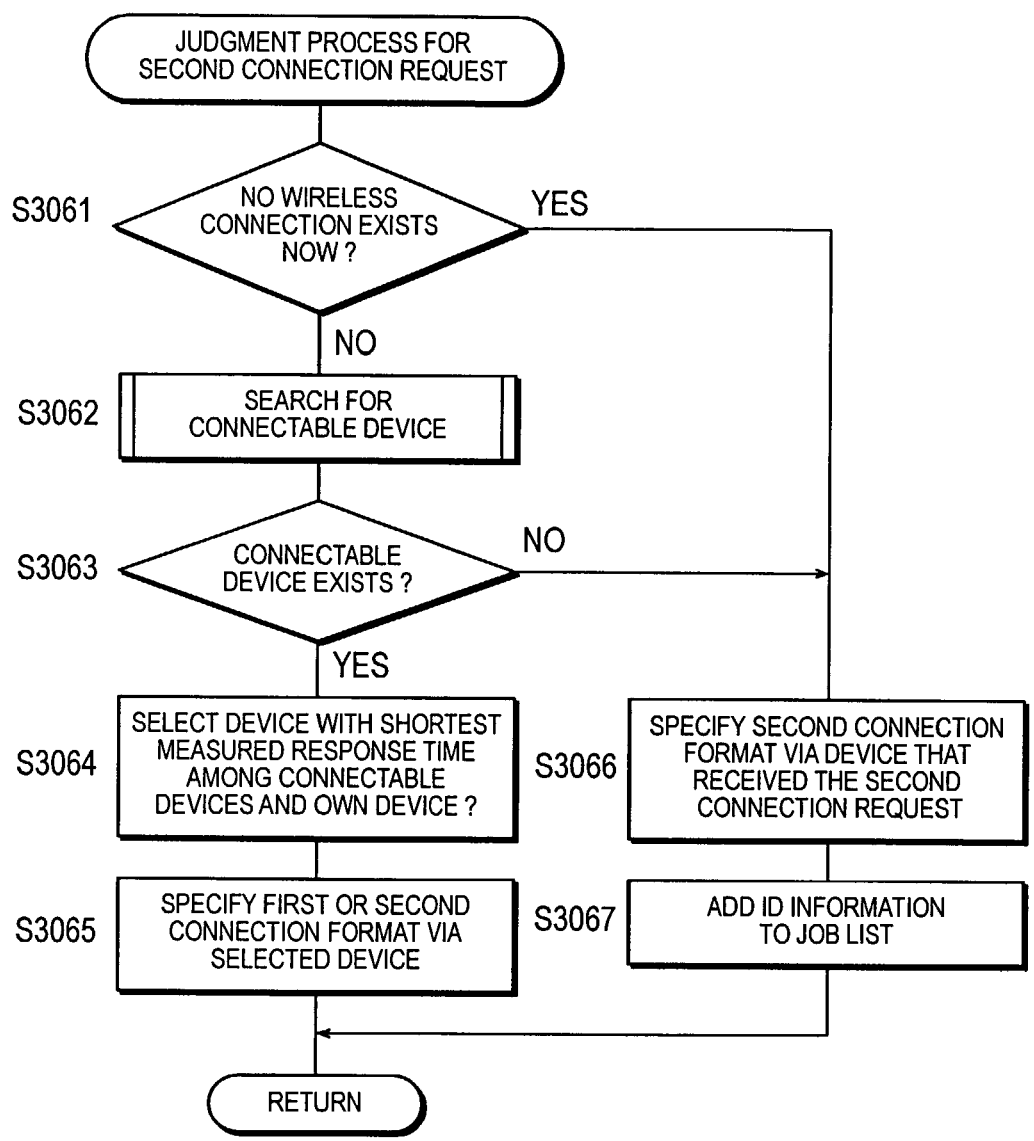
FIG. 43 is a flowchart showing the steps of a judgment process in response to the second connection request.

Next, the steps of the judgment process for the second connection request in the step S3043 of FIG. 42 will be described referring to FIG. 43.

Figure 13:
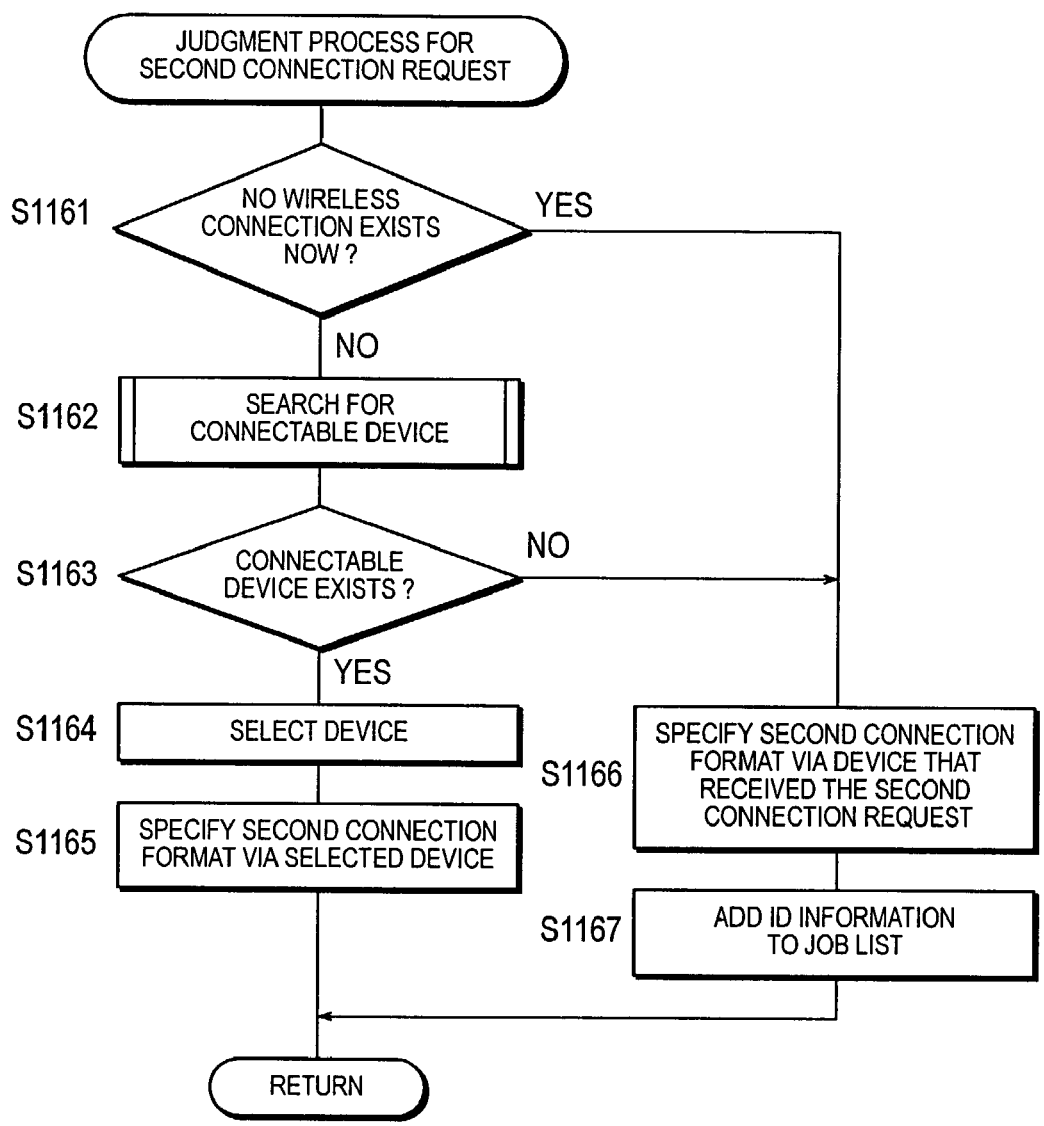
FIG. 13 is a flowchart showing the steps of a judgment process in response to the second connection request.

The processes except those of the steps S3064 and S3065 are identical to those shown in FIG. 13, so that their descriptions are omitted.

In the step S3064, a device that currently has the shortest measured response time is selected among wirelessly connectable devices that are searched in the step S3062.

In the step S3065, the first or second connection format that goes through the device, which was selected in the step S3064, is specified.

Figure 44:
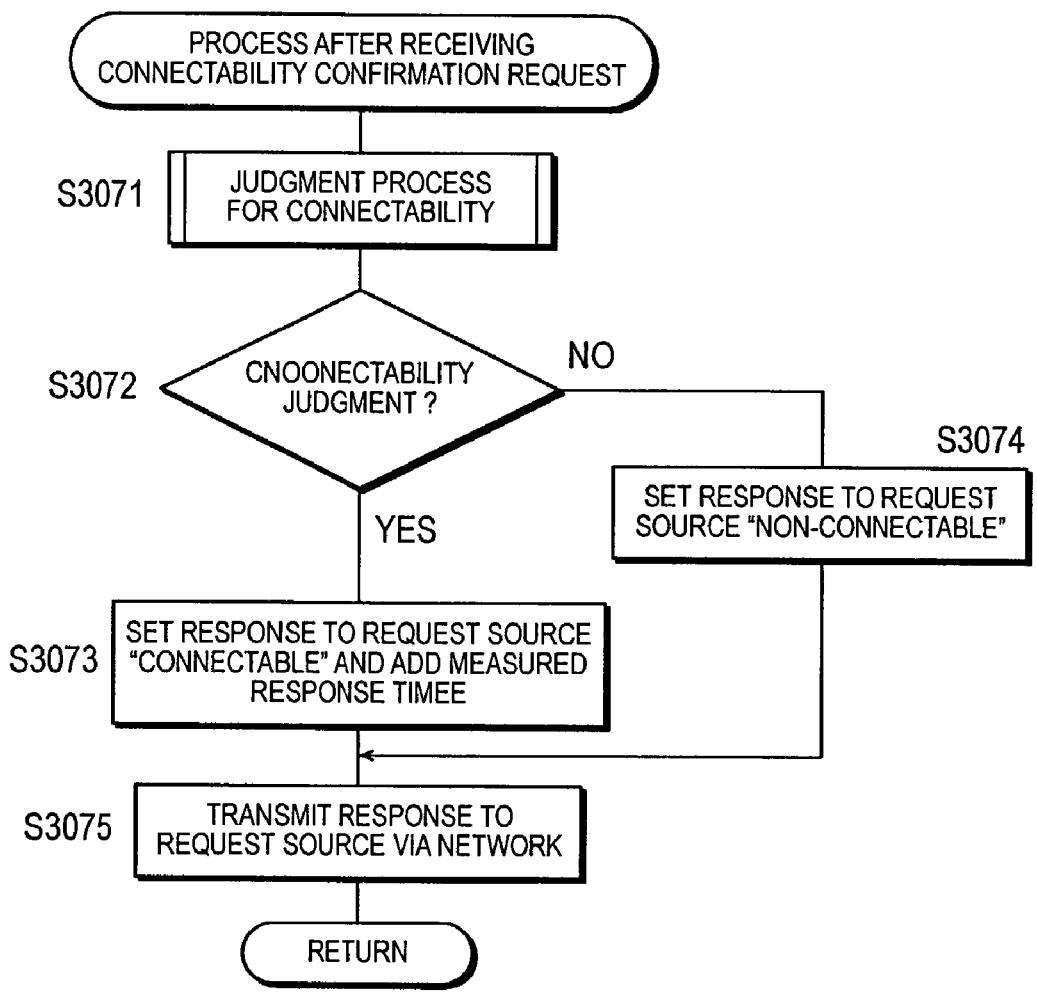
FIG. 44 is a flowchart showing the steps of a process after receiving a request for confirmation of connectability.

Next, we will describe the steps of the process that follows the receipt of the confirmation request for connectability at the device 20B in the step S1006 of FIG. 5 with reference to FIG. 44 for the third embodiment.

The processes except that of the step S3073 are identical to those shown in FIG. 16, so that their descriptions are omitted.

In the step S3073, the response to the device 20A, which is the source of the connection switch request, is set "connectable," and the response time measured at the device 20B is attached to the response.

Next, referring to FIG. 45, the judgment process for connectability in the step S3071 of FIG. 44 will be described.

Figure 45:
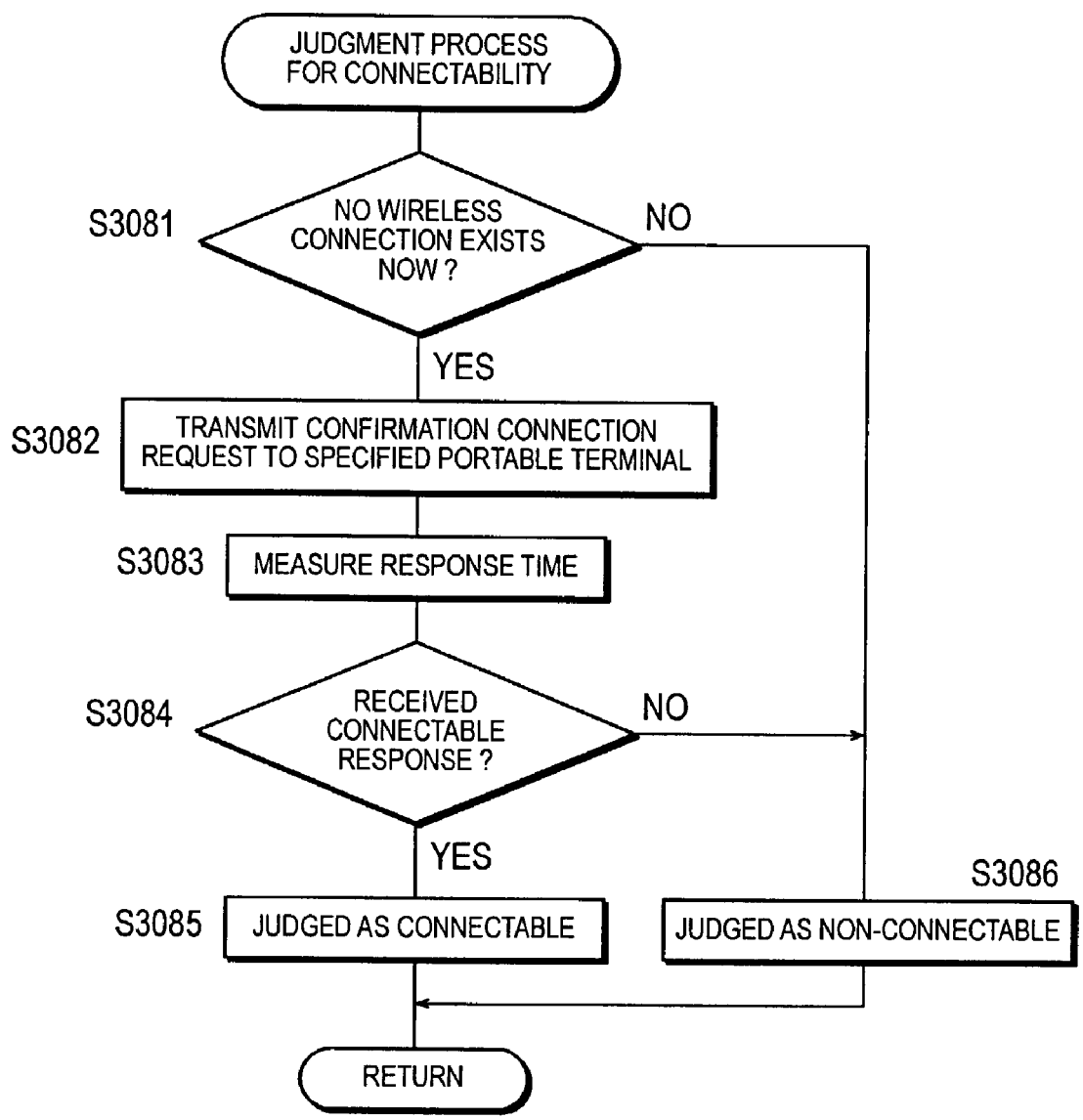
FIG. 45 is a flowchart showing the steps of a process for judging the connectability.

As shown in FIG. 45, the process of the step S3083 is added to FIG. 17. The processes except that of the step S3083 are identical to those shown in FIG. 17, so that their descriptions are omitted.

In the step S3083, the measurement of the response time is executed. A specific job request is made by, for example, the device 20B to, for example, the portable terminal 40B, and the time until the reception of the response is measured here.

Since the operation at the portable terminal is the same as in the first embodiment, its descriptions are not repeated here.

In the third embodiment, as can be seen from the above, when the portable terminal 40A transmits the first connection request to the device 20A, the device 20A asks devices on the network 60 whether they can communicate with the portable terminal 40A. After receiving responses from all the devices that are connectable with the portable terminal 40A, the device 20A selects a device with the shortest wireless communication response time among the connectable devices and the own device, and instructs the portable terminal 40A to connect with the selected device. Also, when the portable terminal 40B requests the first connection request to the device 20A, a process similar to the above will be conducted.

Thus, in the third embodiment, when a portable terminal tries to communicate with a specified device, it is possible to assume a connection format to select a device that has the shortest wireless communication response time among other devices on the network that are connectable with the portable terminal and the own device, and to communicate with the specified device via the selected device. Therefore, it is possible to avoid a situation of communicating via a device with a longer response time due to reasons such as a long communication distance. Consequently, the reduction of the communication speed can be avoided when portable terminals try to communicate with corresponding devices utilizing local wireless communication.

Next, the fourth embodiment of the present invention will be described below. The description of the fourth embodiment below will primarily be concerned with the points which differ from those already described in the second embodiment, avoiding repetitious descriptions on commonality.

The operations of the data communication device of the fourth embodiment will be described below referring to FIG. 46 through FIG. 51. The algorithm shown in the flowchart of FIGS. 46 through 51 is stored as a program in, for example, the ROM 22 and is executed by the CPU 21.

The flowcharts in FIG. 5, FIG. 8 through FIG. 10 (common with the first embodiment), FIG. 31, FIG. 32 and FIG. 34 through FIG. 37 in the second embodiment are used in similar manners in the fourth embodiment, so that their descriptions will not be repeated.

Figure 46:
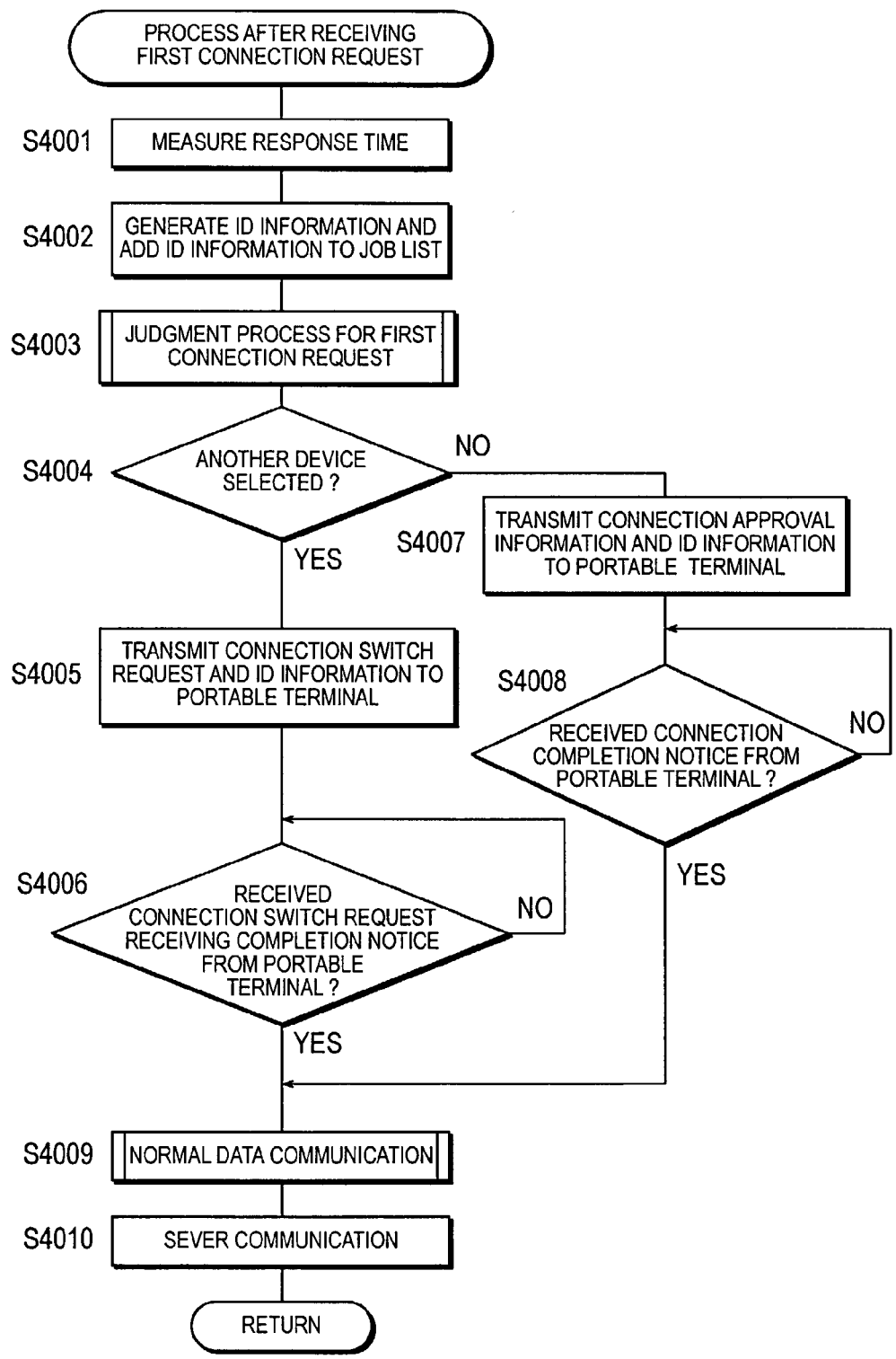
FIG. 46 is a flowchart showing the steps of a process after receiving the first connection request in the fourth embodiment.

FIG. 46 shows the process after receiving the first connection request in the step S1002 of FIG. 5 in the fourth embodiment. The process shown in FIG. 46 is different from that of the second embodiment, but is identical to the process shown in FIG. 40 in the third embodiment, so that the description is omitted here.

Figure 47:
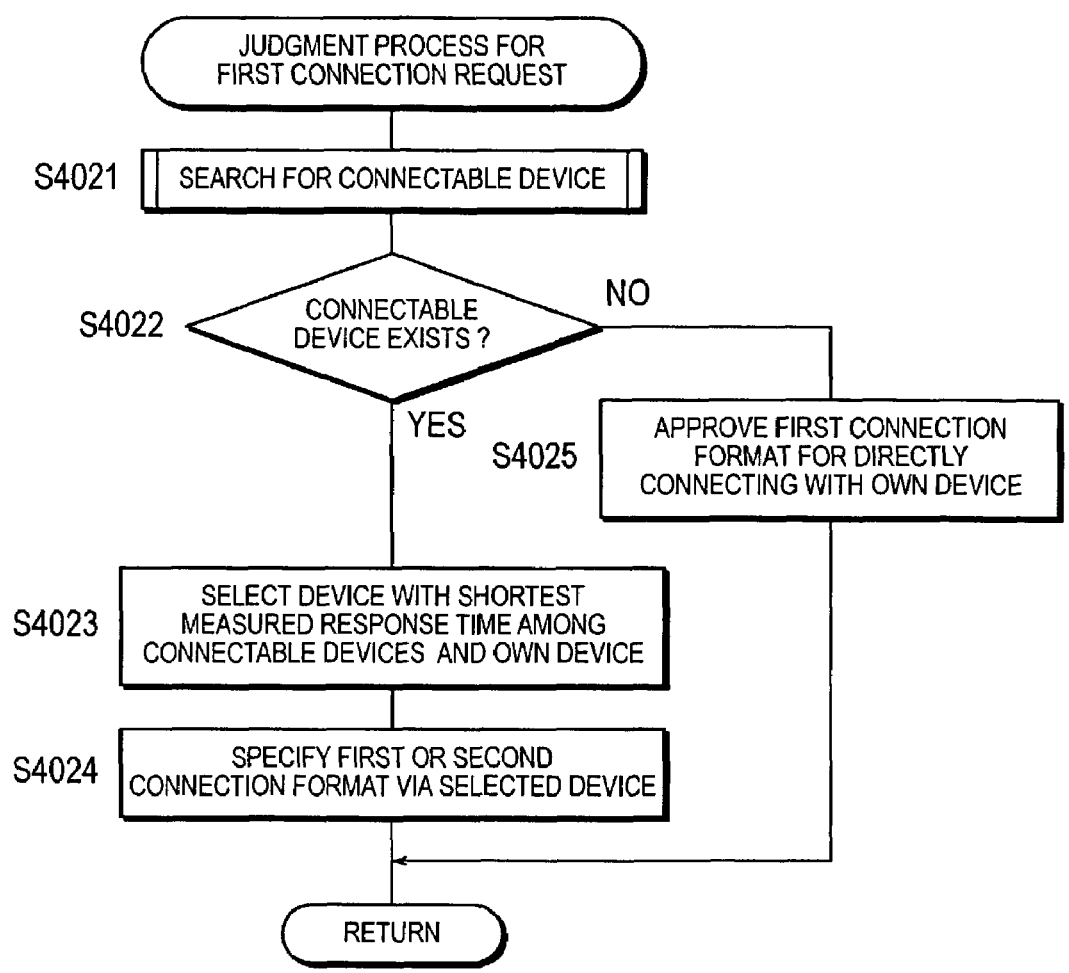
FIG. 47 is a flowchart showing the steps of a judgment process in response to the first connection request.

FIG. 47 is the judgment process for the first connection request in the step S4003 of FIG. 46. The process shown in FIG. 47 is different from that of the second embodiment, but is identical to the process shown in FIG. 41 in the third embodiment, so that the description is omitted here.

Next, referring to FIG. 48, the selection process for the connection switching destination in the step S2046 of FIG. 32 will be described for the fourth embodiment.

In the step S4041, wirelessly connectable devices are searched among other devices on the network 60.

In the step S4042, a device that currently has the shortest measured response time is selected among wirelessly connectable devices that are searched in the step S4041.

In the step S4043, a judgment is made as to whether the number of wireless connections of the selected device is not less than one. If the number of wireless connections of the selected device is more than or equal to one (step S4043: Yes), the process of the step S4044 will be executed; if the number of wireless connections of the selected device is less than one (step S4043: No), the process of the step S4046 will be executed.

In the step S4044, a connection switch request is transmitted to the selected device so that the portable terminal assumes a format of wirelessly connecting with another device. Thus, it is possible to secure the specified communication speed by reducing the number of wireless connections of the device selected by the step S4042.

In the step S4045, the program waits for a receiving completion notice of the connection switch request that notifies that the connection switch request has been received from the selected device.

In the step S4046, a connection switch request is transmitted to the job's relay device, so that the portable terminal assumes a format for wirelessly connecting with the device selected in the step S4042.

In the step S4047, the control waits for a connection switch request receiving completion notice that notifies the completion of receiving the connection switch request from the job's relay device.

Figure 49:
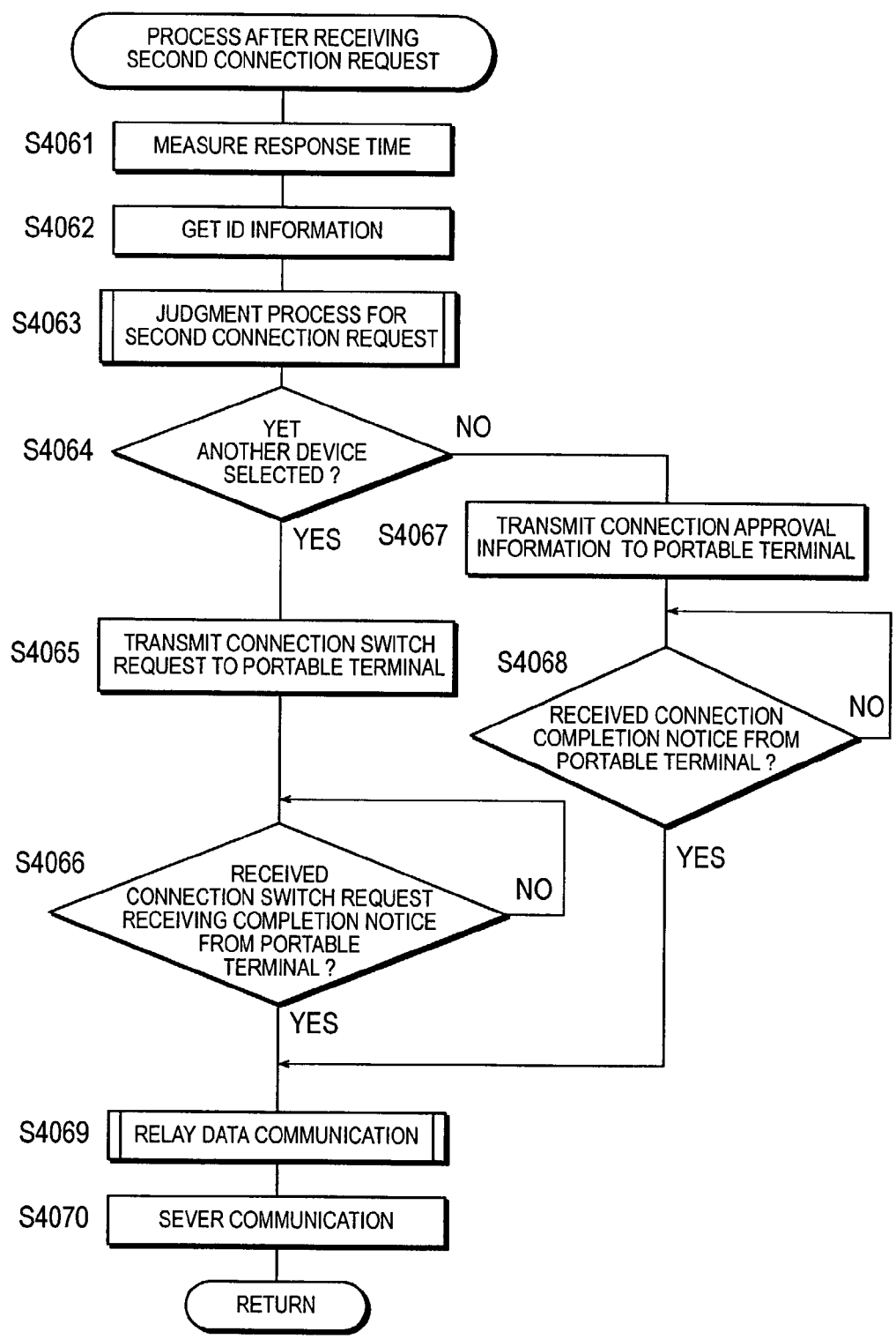
FIG. 49 is a flowchart showing the steps of a process after receiving the second connection request.

FIG. 49 shows the process after receiving the second connection request in the step S1004 of FIG. 5 in the fourth embodiment. The process shown in FIG. 49 is different from that of the second embodiment, but is identical to the process shown in FIG. 42 in the third embodiment, so that the description is omitted here.

Figure 50:
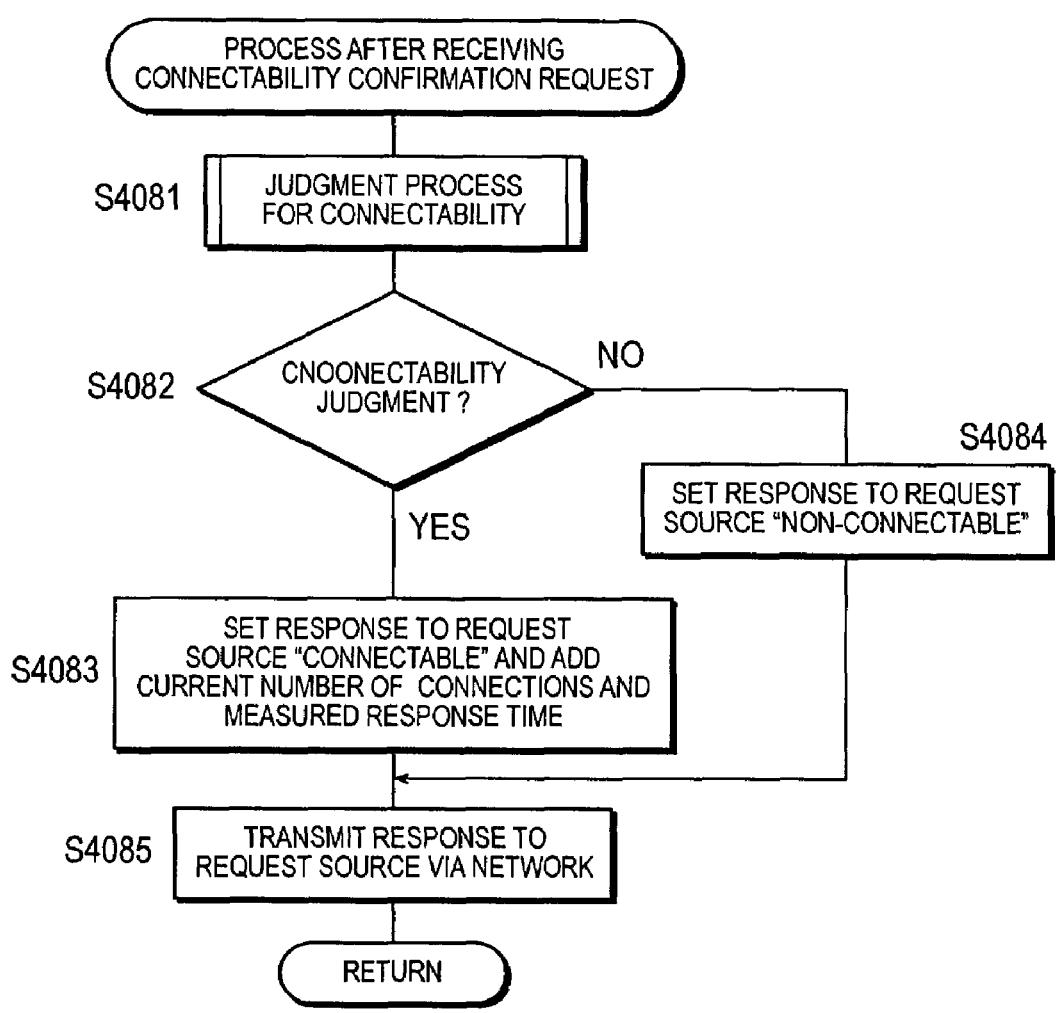
FIG. 50 is a flowchart showing the steps of a process after receiving a request for confirmation of connectability.

Next, we will describe the steps of the process that follows the receipt of the confirmation request for connectability at the device 20B in the step S1006 of FIG. 5 with reference to FIG. 50 for the fourth embodiment.

The processes except that of the step S4083 are identical to those shown in FIG. 38, so that their descriptions are omitted.

In the step S4083, the response to the device 20A, which is the source of the connection switch request, is set "connectable," and the current number of connections at the device 20B and the measured response time are attached to the response.

Next, referring to FIG. 51, the judgment process for connectability in the step S4081 of FIG. 50 will be described.

Figure 39:
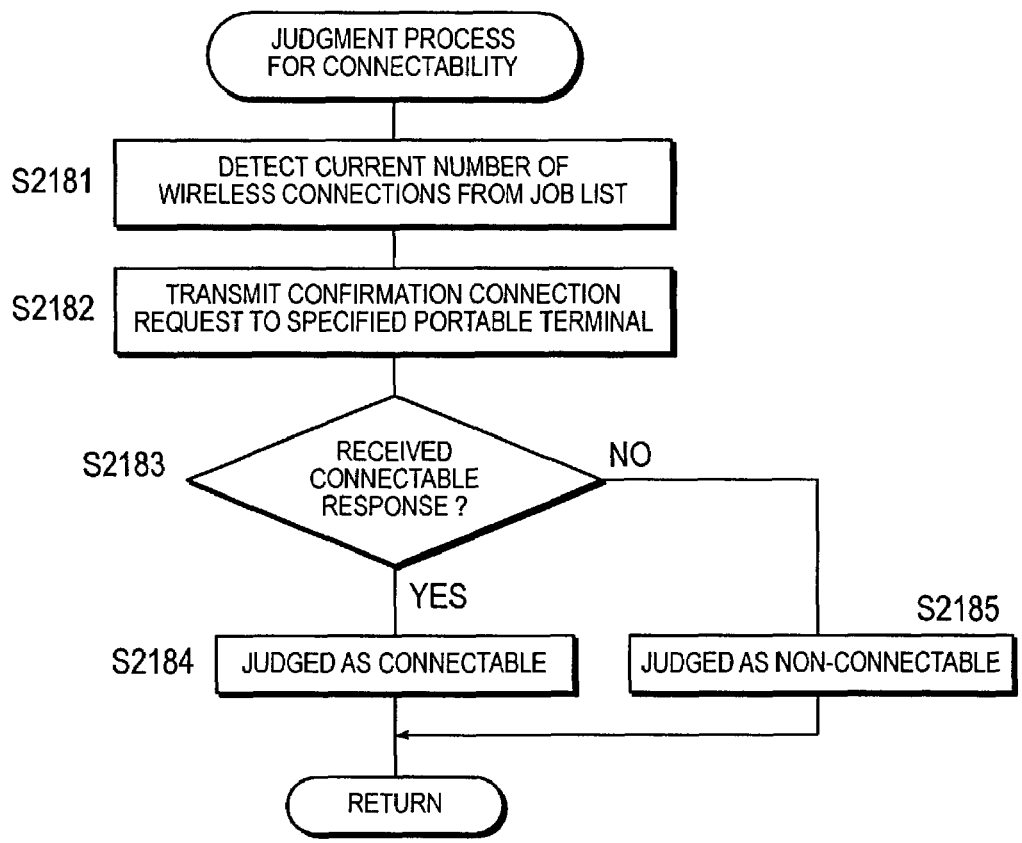
FIG. 39 is a flowchart showing the steps of a process for judging the connectability.
Figure 51:
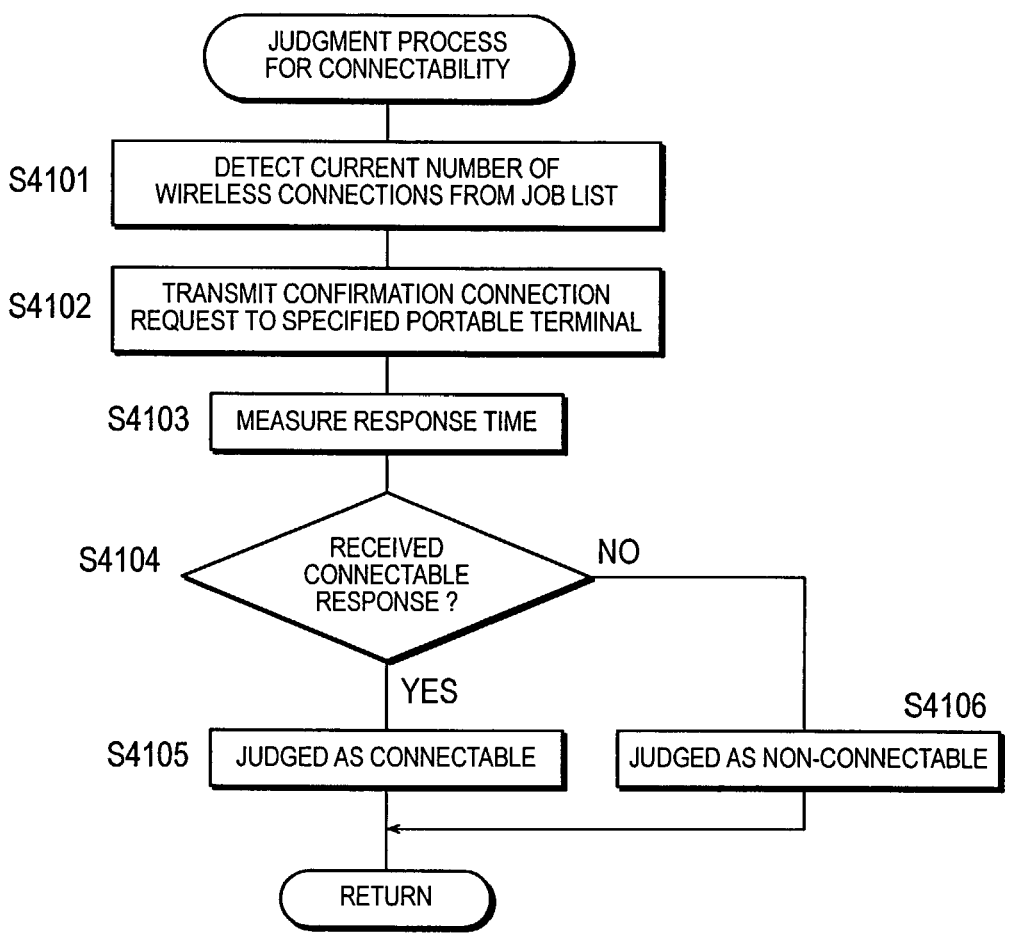
FIG. 51 is a flowchart showing the steps of a process for judging the connectability.

As shown in FIG. 51, the process of the step S4103 is added to FIG. 39. The processes except that of the step S4103 are identical to those shown in FIG. 39, so that their descriptions are omitted.

In the step S4103, the measurement of the response time is executed. A specific job request is made by, for example, the device 20B to, for example, the portable terminal 40B, and the time until the reception of the response is measured here.

Since the operation at the portable terminal is the same as in the second embodiment, its descriptions are not repeated here.

In the fourth embodiment, as can be seen from the above, when, for example, the portable 40A transmits the first connection request to the device 20A, the same process as in the third embodiment will be executed.

Moreover, when the communication with the portable terminal 40A is finished, the device 20A, for example, selects a device having the shortest wireless communication response time among connectable devices and the own device after receiving responses from all devices that are connectable with, for example, the portable terminal 40B that was received earliest, and sends a connection switch request to, for example, the relay device 20B asking it to assume a format to cause the portable terminal 40B to establish a wireless connection with the selected device.

Thus, according to the fourth embodiment as well, in addition to the advantage of being able to suppress the reduction of the communication speed when a portable terminal communicates with another device using local wireless communication means, it is possible to control in such a way that the earlier the job's wireless connection request is received by the specific device, the higher the communication speed will be.

Next, the fifth embodiment of the present invention will be described below. The description of the fifth embodiment below will primarily be concerned with the points which differ from those already described in the fourth embodiment, avoiding repetitious descriptions on commonality.

The operations of the data communication device of the fifth embodiment will be described below referring to FIG. 52 through FIG. 57. The algorithm shown in the flowchart of FIGS. 52 through 57 is stored as a program in, for example, the ROM 22 and is executed by the CPU 21.

Figure 8:
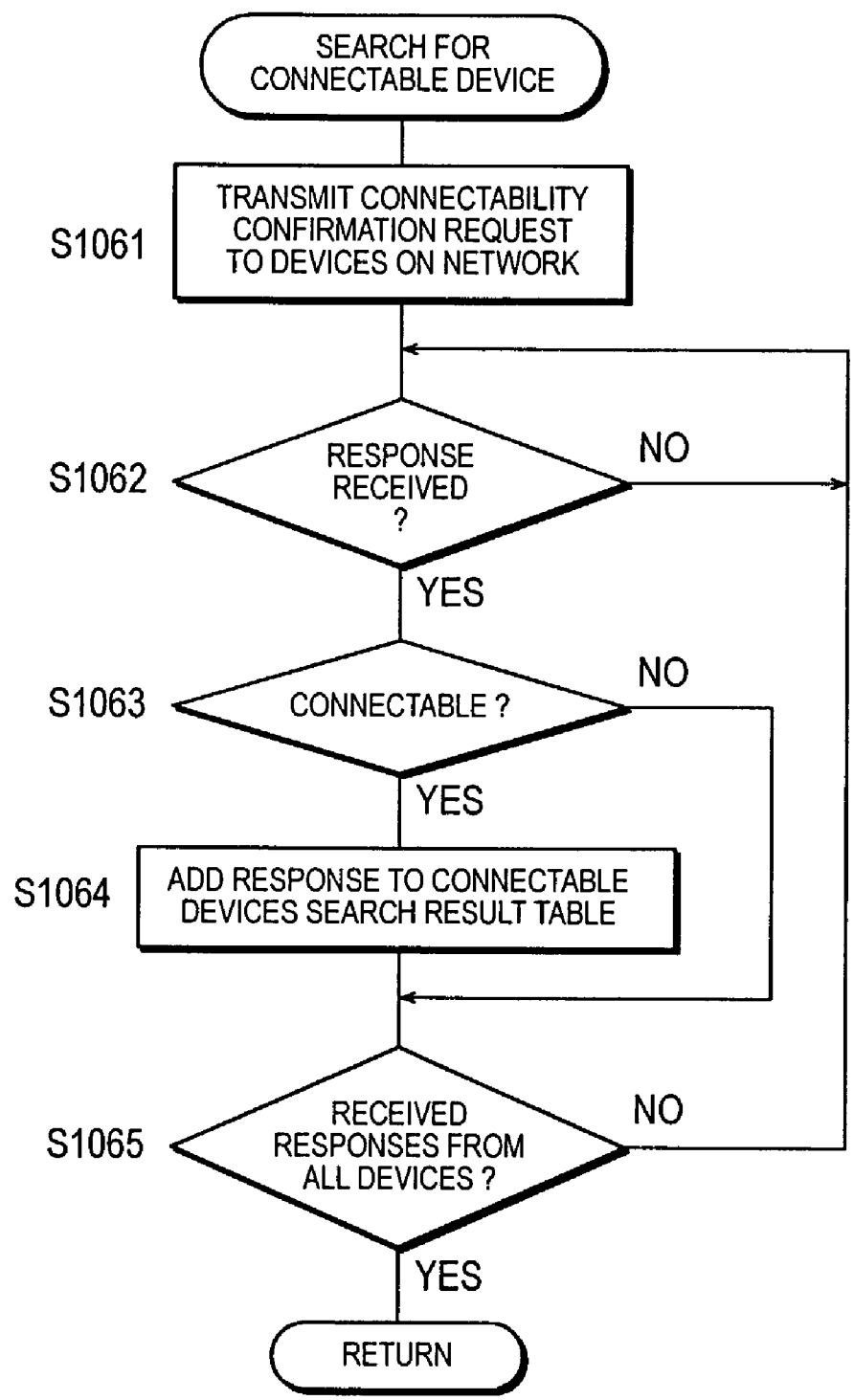
FIG. 8 is a flowchart showing the steps of a process for searching a connectable device.

The flowcharts in FIG. 5, FIG. 8 (common with the first and second embodiments), FIG. 31, FIG. 32, FIG. 34, FIG. 37 (common with the second embodiment), FIG. 46, FIG. 49 through FIG. 51 in the fourth embodiment are used in similar manners in the fifth embodiment, so that their descriptions will not be repeated.

Figure 52:
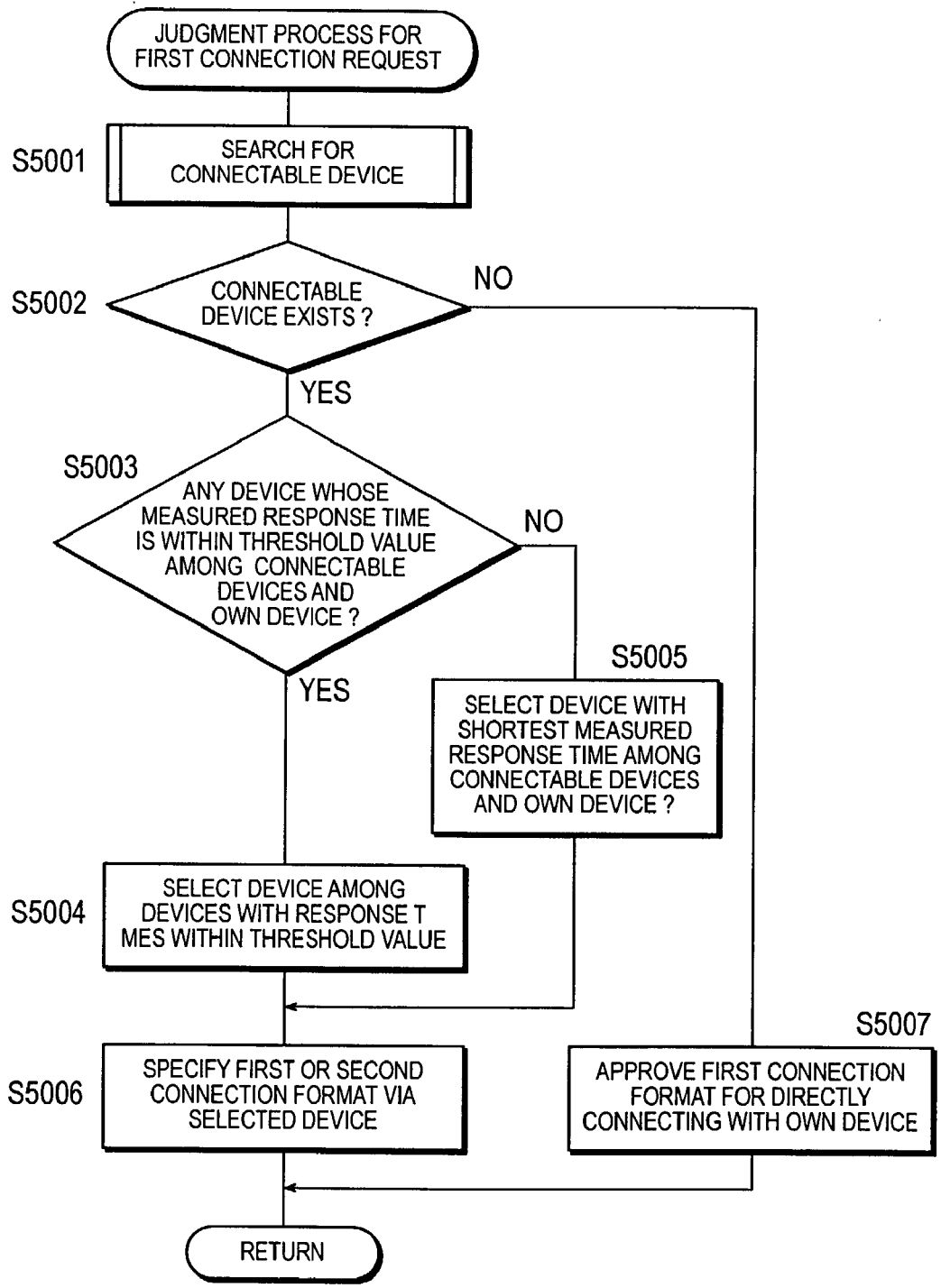
FIG. 52 is a flowchart showing the steps of a judgment procedure in response to the first connection request in the fifth embodiment.

First, the judgment process for the first connection request in the step S4003 of FIG. 46 will be described referring to FIG. 52 for the fifth embodiment.

The processes except those of the steps S5003 through S5005 are identical to those shown in FIG. 47, so that their descriptions are omitted.

However, in the fifth embodiment, responses such as shown in FIG. 58 and FIG. 59 are obtained as the responses for connectability confirmation requests from other devices in the search of connectable devices in the step S5001. FIG. 58 shows the contents of an example response indicating non-connectability containing the response time threshold value information, while FIG. 59 shows the contents of an example response indicating connectability containing the response time threshold value information. As shown in FIG. 60, based on the responses indicating connectability, a connectable device search result table is generated, which includes the column for the response time threshold values showing a list of information concerning other devices wirelessly connectable with, for example, the portable terminal 40B. Thus, in the fifth embodiment, the manager or the user can preset a unique threshold value for each device on the network 60 as shown in FIG. 58 through FIG. 60.

In the step S5003, a judgment is made whether there is any device, whose measured response time is within the device's unique threshold value, among wirelessly connectable devices that are searched in the step S5003 and the own device. If there is a device whose measured response time is within the device's threshold value (step S5003: Yes), the process of the step S5004 is executed; if there is no device whose measured response time is within the device's threshold value (step S5003: No), the process of the step S5005 is executed.

In the step S5004, a specified device is selected from the devices whose measured response times are within their respective threshold values. It is possible to select as the specified device, for example, a device, for which the connectability response is obtained earliest. However, a specified device can be selected based on an arbitrary standard from devices whose measured response times are within their respective threshold values. For example, a device with the least number of wireless connections, the device with the shortest response time, or the highest measure data transfer rate via the local interface can be selected as the specified device from devices whose measured response times are within their respective values. Moreover, another specified device can be selected according to characteristics including at least one of the above mentioned characteristics concerning the local wireless communication with a portable terminal, i.e., the number of wireless connection, response time, and data transmission speed.

In the step S5005, a device that currently has the minimum measured response time is selected among wirelessly connectable devices that are searched in the step S5001.

Next, referring to FIG. 53, the normal data communication process in the step S4009 of FIG. 46 will be described for the fifth embodiment.

Figure 53:
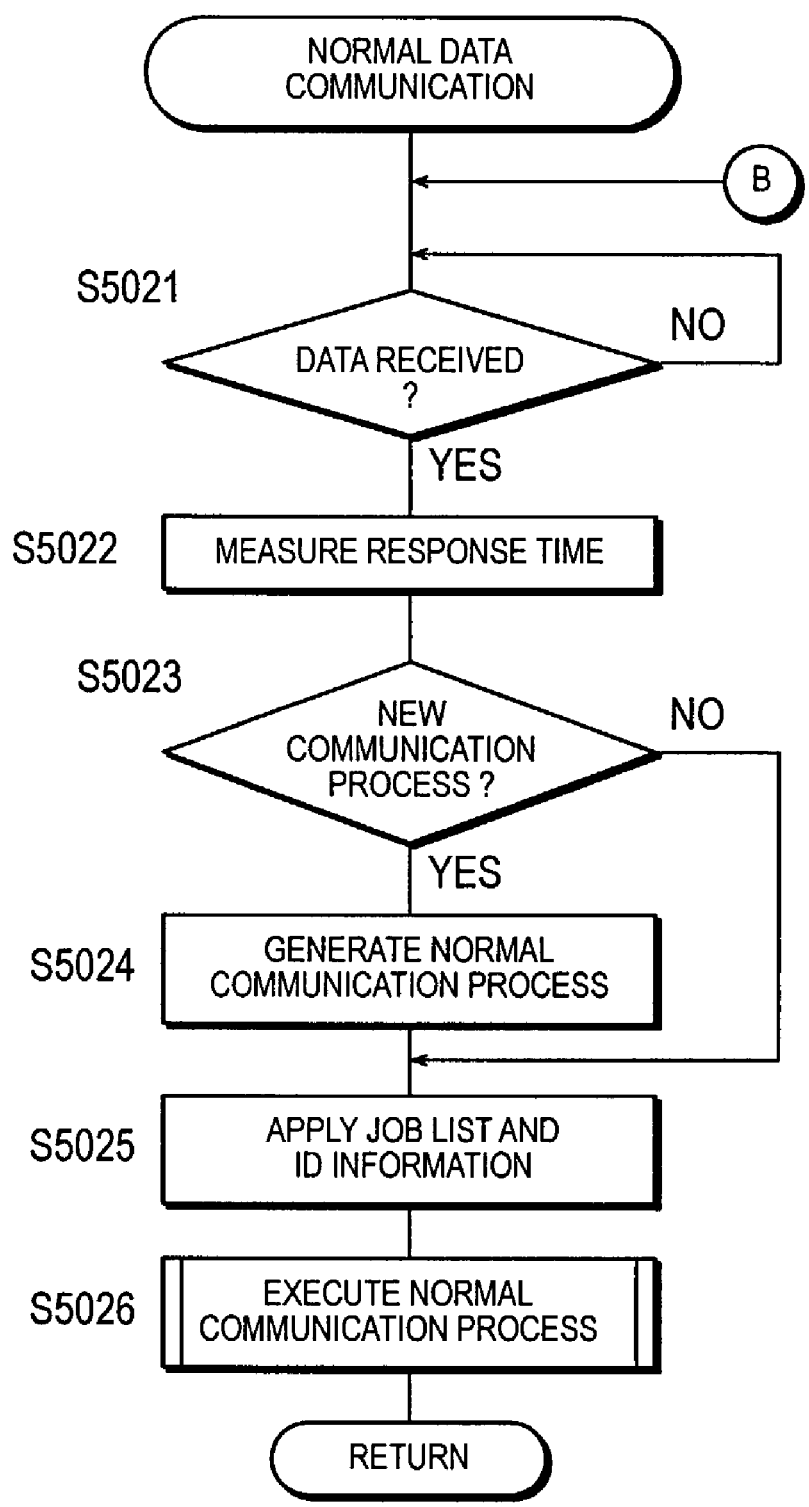
FIG. 53 is a flowchart showing the steps of a normal data communication process.

As shown in FIG. 53, the process of the step S5022 is added to FIG. 9. The processes except that of the step S5022 are identical to those shown in FIG. 9, so that their descriptions are omitted.

In the step S5022, the measurement of the response time is executed. A specific job request is made by, for example, the device 20A to, for example, the portable terminal 40A, and the time until the reception of the response is measured here.

Figure 54:
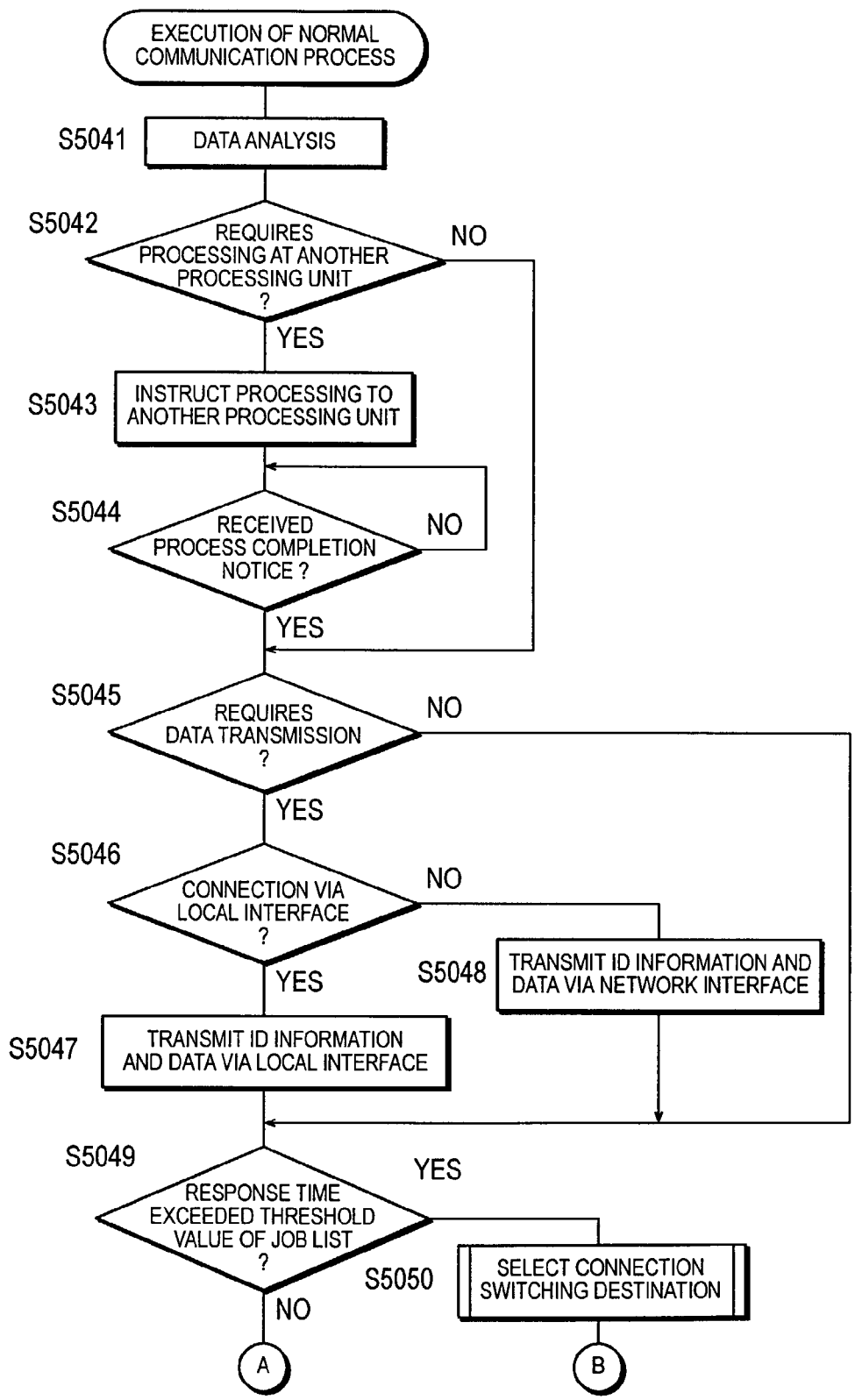
FIG. 54 is a flowchart showing the steps of executing a normal communication process.

Next, the procedures of the normal communication process in the step S5026 of FIG. 53 will be described referring to FIG. 54.

Figure 10:
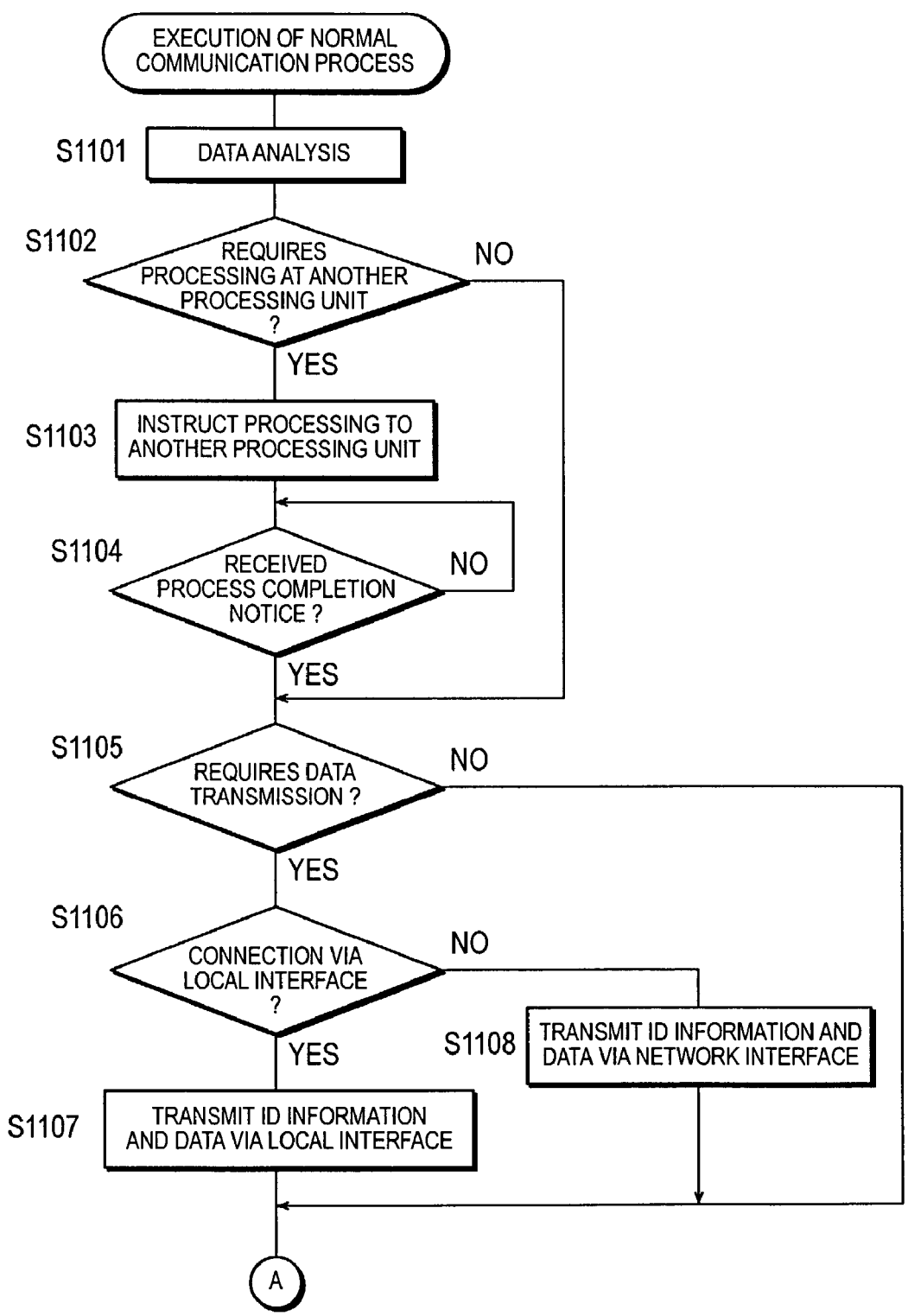
FIG. 10 is a flowchart showing the steps of executing a normal communication process.

The processes of the steps S5041 through S5048 are identical to those shown in FIG. 10, so that their descriptions are omitted.

In the fifth embodiment, the user can preset a unique threshold value for each job. The threshold values are added to the job list as shown in FIG. 61.

In the step S5049, a judgment is made as to whether the response time measured in the step S5022 has exceeded the threshold value prescribed on the job list. If the measured response time exceeds the threshold value (step S5049: Yes), the selection of the connection switching destination is executed (step S5050).

Figure 55:
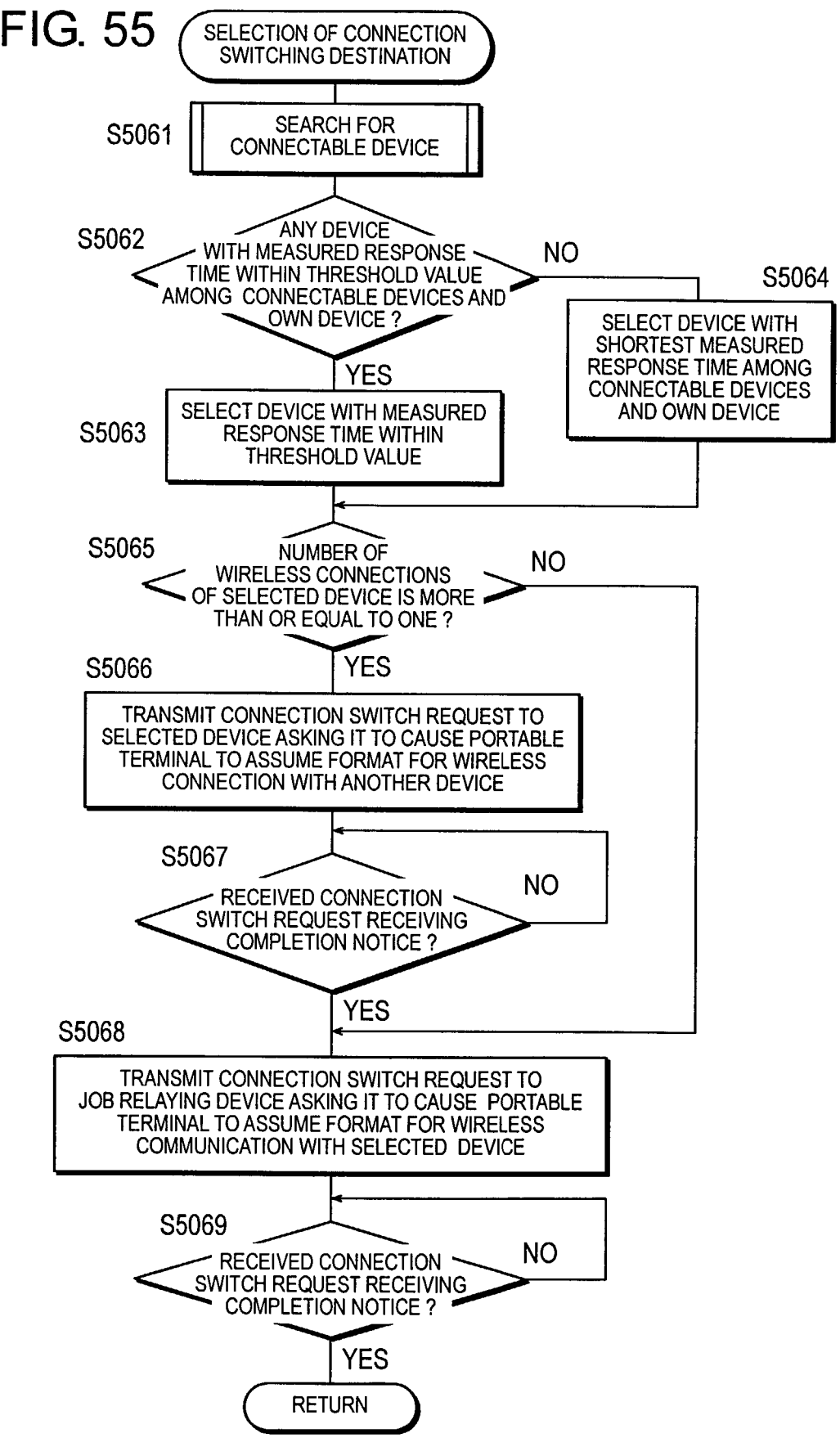
FIG. 55 is a flowchart showing the steps of a process for selecting a connection switching destination.

Next, referring to FIG. 55, the selection process for the connection switching destination in the step S2046 of FIG. 32, or the step S5050 of FIG. 54 will be described for the fifth embodiment.

Figure 48:
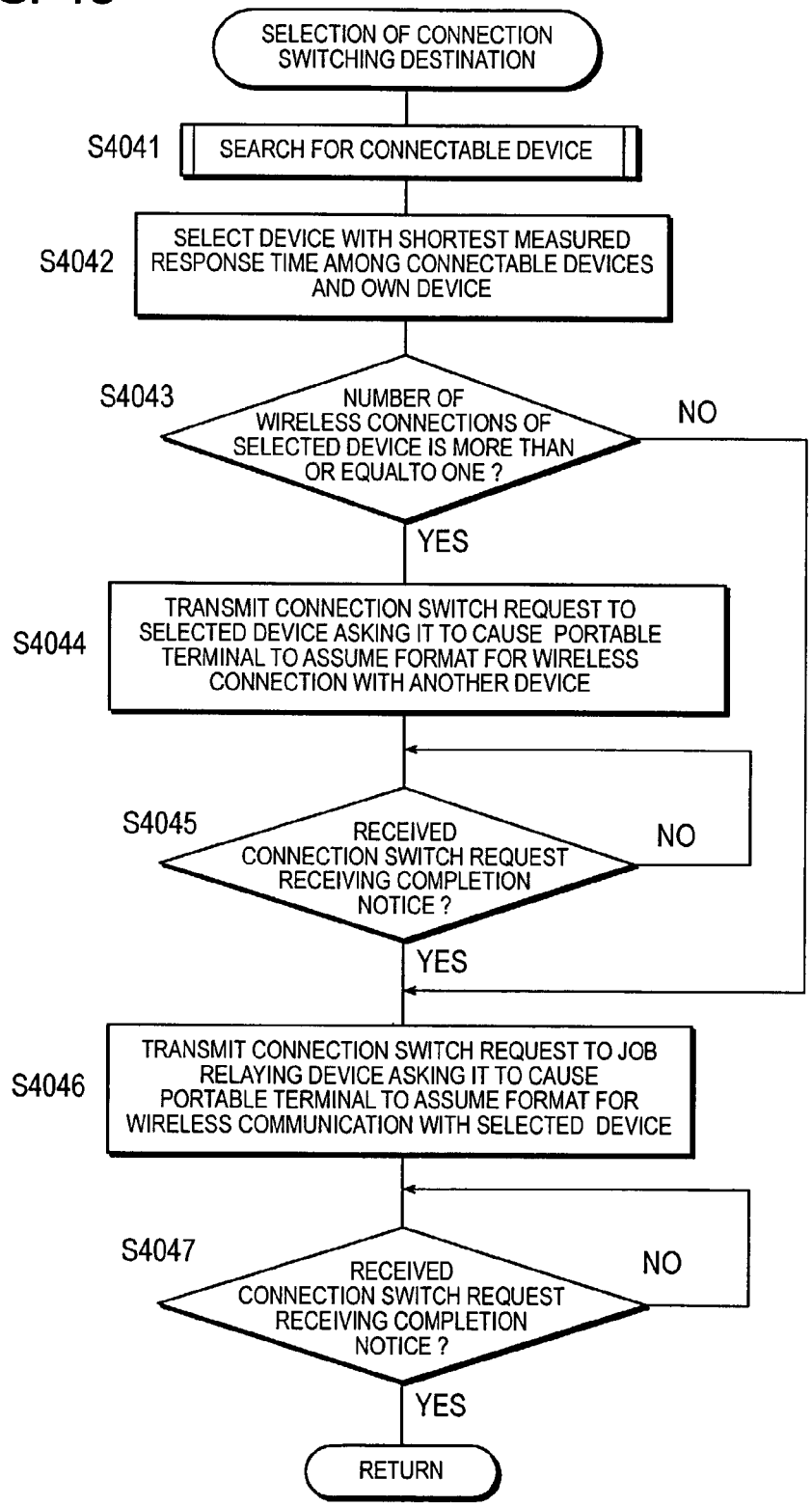
FIG. 48 is a flowchart showing the steps of a process for selecting a connection switching destination.

The processes except those of the steps S5062 through S5064 are identical to those shown in FIG. 48, so that their descriptions are omitted.

In the step S5062, a judgment is made whether there is any device, whose measured response time is within the device's unique threshold value, among wirelessly connectable devices that are searched in the step S5061 and the own device. If there is a device whose measured response time is within the device's threshold value (step S5062: Yes), the process of the step S5063 is executed; if there is no device whose measured response time is within the device's threshold value (step S5062: No), the process of the step S5064 is executed.

In the step S5063, a specified device is selected from the devices whose measured response times are within their respective threshold values. It is possible to select as the specified device, for example, a device, for which the connectability response is obtained earliest. However, a specified device can be selected based on an arbitrary standard from devices whose measured response times are within the job's unique threshold values.

In the step S5064, a device that currently has the shortest measured response time is selected among wirelessly connectable devices that are searched in the step S5061.

Next, referring to FIG. 56, the relay data communication process in the step S4069 of FIG. 49 will be described for the fifth embodiment.

Figure 56:
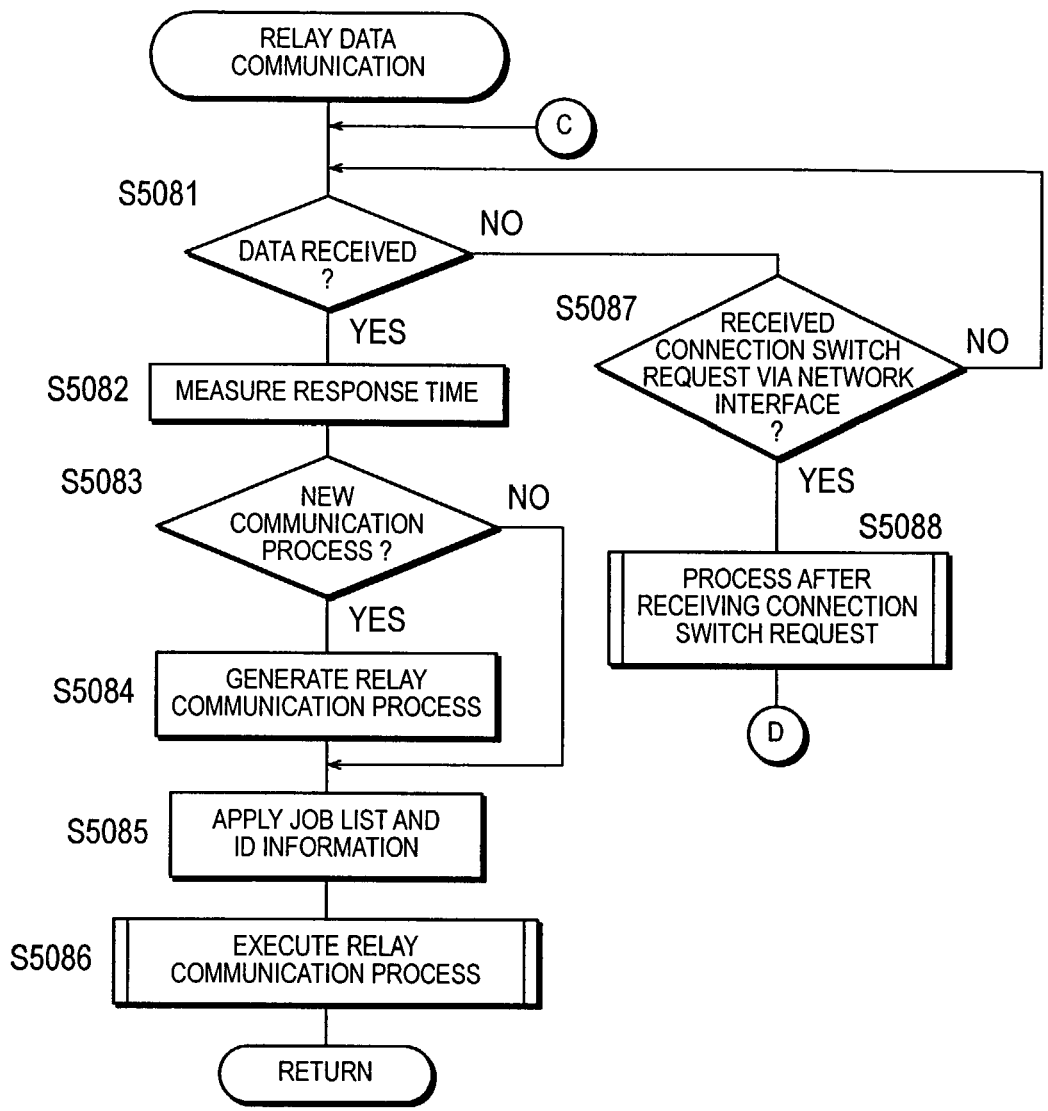
FIG. 56 is a flowchart showing the steps of a relay data communication process.

As shown in FIG. 56, the process of the step S5082 is added to FIG. 35. The processes except that of the step S5082 are identical to those shown in FIG. 35, so that their descriptions are omitted.

In the step S5082, the measurement of the response time is executed. A specific job request is made by, for example, the device 20B to, for example, the portable terminal 40B, and the time until the reception of the response is measured here.

Figure 57:
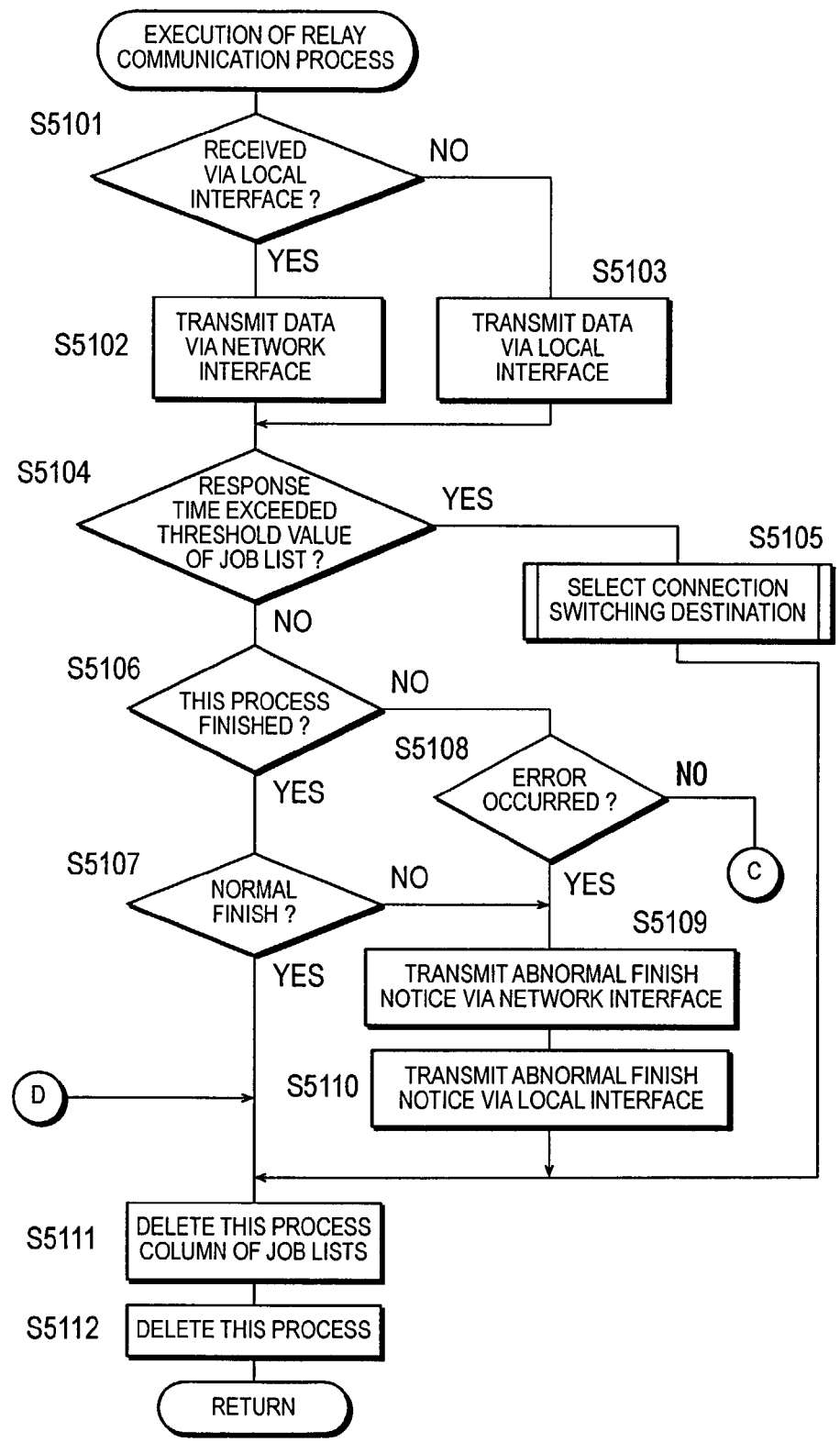
FIG. 57 is a flowchart showing the steps of executing a relay communication process.

Next, the procedures of the relay communication process in the step S5086 of FIG. 56 will be described referring to FIG. 57.

The processes except those of the steps S5101 through S5103 are identical to those shown in FIG. 36, so that their descriptions are omitted.

In the step S5104, a judgment is made as to whether the response time measured in the step S5082 has exceeded the threshold value prescribed on the job list. If the measured response time exceeds the threshold value (step S5104: Yes), the process of the step S5105 will be executed; if the measured response time does no exceed the threshold value (step S5104: No), the process of the step S5106 will be executed.

In the step S5105, a selection of the connection switching destination is executed.

The processes of the step S5106 and thereafter are identical to those shown in FIG. 36, so that their descriptions are omitted.

Although two categories, i.e., the threshold value of the device and the threshold value of the job are considered as the threshold value of the response time in the above description of the fifth embodiment, it is also possible to use only one of them. Also, the threshold value of the job to be added to the job list can be constituted in such a way as to be arbitrarily changed by the user. This way, the communication speed corresponding to the change of status can be assured.

Since the operation at the portable terminal is the same as in the fourth embodiment, its descriptions are not repeated here.

In the fifth embodiment, as can be seen from the above, when the portable terminal 40A transmits the first connection request to the device 20A, the device 20A asks devices on the network 60 whether they can communicate with the portable terminal 40A. After receiving responses from all the devices that are connectable with the portable terminal 40A, the device 20A selects a device with the minimum wireless communication response time among the connectable devices and the own device, and instructs the portable terminal 40A to connect with the selected device. Also, when the portable terminal 40B requests the first connection request to the device 20A, a process similar to the above will be conducted.

Moreover, when the communication with the portable terminal 40A is finished, the device 20A, for example, selects a specified device from devices having wireless communication response times that are within the job specific threshold value among connectable devices and the own device after receiving responses from all devices that are connectable with, for example, the portable terminal 40B that was received earliest, and sends a connection switch request to the portable terminal 40B asking it to establish a wireless connection with the selected device.

Moreover, when the response time exceeds the threshold value specific to the job while communicating with the portable terminal 40A, the device 20A selects a specified device from devices whose response times are within the threshold value specific to the job among connectable devices and the own device after receiving responses from all the devices that are connectable with the portable terminal 40A and are related to the job, and sends a connection switch request to the portable terminal 40A asking it to assume a format to establish a wireless connection with the selected device.

Thus, according to the fifth embodiment as well, it is possible to suppress the reduction of the communication speed when a portable terminal communicates with its communication partner device using local wireless communication means, and also to control in such a way that the earlier the job's wireless connection request is received by the specific device, the higher the communication speed will be.

Moreover, monitoring the response time even during communication can prevent communication severance or communication speed drop that may occur due to an increase of the distance to the device as the user moves around carrying the portable terminal.

Next, the sixth embodiment of the present invention will be described below. The description of the sixth embodiment below will primarily be concerned with the points which differ from those already described in the fifth embodiment, avoiding repetitious descriptions on commonality.

Although the device to be connected with the portable terminal was selected based on the response time measured on each device in the fifth embodiment, the device to be connected with the portable terminal is selected based on the number of wireless connections detected by the job list of each device in the sixth embodiment.

Moreover, although the threshold value of the response time was used in selecting the device to be connected with the portable terminal in the fifth embodiment, the threshold value of the number of connections is used in the sixth embodiment. Specifically, responses such as shown in FIG. 62 or FIG. 63 are obtained as the responses for connectability confirmation requests from other devices in the search of connectable devices in the sixth embodiment. FIG. 62 shows the contents of an example response indicating non-connectability containing the information of the threshold value for the number of connections, while FIG. 63 shows the contents of an example response indicating connectability containing the information of the threshold value for the number of connections. As shown in FIG. 64, based on the responses indicating connectability, a connectable device search result table is generated, which includes the column for the threshold value for the number of connections showing a list of information concerning other devices wirelessly connectable with, for example, the portable terminal 40B. Thus, in the sixth embodiment, the manager or the user can preset a unique threshold value for the number of connections for each device on the network 60 as shown in FIG. 62 through FIG. 64. In the sixth embodiment, the user can preset a unique threshold value for the number of connections for each job. The threshold values are added to the job list as shown in FIG. 65.

According to this sixth embodiment as well, it is possible to suppress the reduction of the communication speed when a portable terminal communicates with its communication partner device using local wireless communication means, and also to control in such a way that the earlier the job's wireless connection request is received by the specific device, the higher the communication speed will be. Moreover, by monitoring the number of wireless connections during the communication, it is possible to prevent the communication speed drop that may be caused by an increase of the number of wireless connections of the communication partner during the communication.

Next, the seventh embodiment of the present invention will be described below. The description of the seventh embodiment below will primarily be concerned with the points which differ from those already described in the fifth embodiment, avoiding repetitious descriptions on commonality.

Although the device to be connected with the portable terminal was selected based on the response time measured on each device in the fifth embodiment, the device to be connected with the portable terminal is selected based on the data transfer rate measured at each device in the seventh embodiment.

Moreover, although the threshold value of the response time was used in selecting the device to be connected with the portable terminal in the fifth embodiment, the threshold value of the data transfer rate is used in the seventh embodiment. Specifically, responses such as shown in FIG. 66 or FIG. 67 are obtained as the responses to the connectability confirmation request from other devices in the search for connectable devices in the seventh embodiment. FIG. 66 shows the contents of an example response indicating non-connectability containing the threshold value of the data transfer rate, while FIG. 67 shows the contents of an example response indicating connectability containing the threshold value of the data transfer rate. As a consequence, based on the responses indicating connectability, a connectable device search result table is generated, which includes the column for the response time threshold values showing a list of information concerning other devices wirelessly connectable with, for example, the portable terminal 40B, and which also contains the threshold values of the data transfer rate as shown in FIG. 68. Thus, in the seventh embodiment, the manager or the user can preset a unique threshold value for each device on the network 60 as shown in FIG. 66 through FIG. 68. In the seventh embodiment, the user can preset a unique threshold value of the data transfer rate for each job. The threshold values are added to the job list as shown in FIG. 69.

According to this seventh embodiment as well, it is possible to suppress the reduction of the communication speed when a portable terminal communicates with its communication partner device using local wireless communication means, and also to control in such a way that the earlier the job's wireless connection request is received by the specific device, the higher the communication speed will be. Moreover, it is possible to prevent the reduction of the communication speed by monitoring the data transfer rate during the communication.

Further, it is possible to select a device to be connected to a specific portable terminal based solely on the data transfer rate without considering the number of connections as in the fifth embodiment as the increase of the number of connections to a device results in the reduction of the data transfer rate. Specifically, it is not necessary to execute the processes corresponding to the steps S5065 through S5067 of FIG. 55 in the seventh embodiment (the same is not required in the sixth embodiment as well).

The present display is not limited to the abovementioned embodiments, but rather can be modified in various ways within its claims. For example, it goes without saying that each flowchart used in describing the above embodiments is but one example in each case and can be changed arbitrarily.

Furthermore, various means of controls and arithmetic processes as well as data communication methods in the data communication system of the present invention can be realized through either a dedicated hardware circuit or a programmed computer. The above program can be provided by means of a computer readable recording medium such as a flexible disk and a CD-ROM. Moreover, the above program can be provided either as independent application software or can be built into the device as a function of the device. A program product herein means a program itself, or a computer readable recording medium on which the program is recorded.

What is claimed is:

1. A data communication device comprising:
a first interface for communicating with a portable terminal;
a second interface for communicating with another communication device; and
a controller that makes a judgment as to whether a first connection format for communication with said portable terminal via the first interface should be allowed when the data communication device receives a first connection request from said portable terminal via the first interface, selects another communication device that is capable of communicating with said portable terminal when the first connection format is not allowed, and transmits to said portable terminal the connection information concerning a second connection format for communication with said portable terminal via said another communication device and the second interface, wherein said controller switches the communication with a second portable terminal to the first connection format when the communication with a first portable terminal ends while the communication with the first portable terminal is conducted in the first connection format and the communication with the second portable terminal is conducted in the second connection format, wherein said controller selects one portable terminal based on a specified order of priority when there are multiple portable terminals that are communicating in the second connection format when the communication with the first portable terminal ends, and switches the communication with the selected portable terminal from the second connection format to the first connection format.

2. A device as claimed in claim 1, wherein said specified order of priority is an order of receiving the first connection request from the portable terminal.

3. A computer readable medium having a program for controlling a data communication device having a first interface for communicating with a portable terminal and a second interface for communicating with another communication device, said program causing the data communication device to execute a process comprising:

making a judgment as to whether a first connection format for communication with said portable terminal via the first interface should be allowed when the data communication device receives a first connection request from said portable terminal via the first interface;

selecting another communication device that is capable of communicating with said portable terminal when the first connection format is not allowed;

transmitting to said portable terminal the connection information concerning a second connection format for communication with said portable terminal via the selected another communication device and the second interface; and switching the communication with a second portable terminal to the first connection format when the communication with a first portable terminal ends while the communication with the first portable terminal is conducted in the first connection format and the communication with the second portable terminal is conducted in the second connection format, wherein, in said switching step, one portable terminal is selected based on a specified order of priority when there are multiple portable terminals that are communicating in the second connection format when the communication with the first portable terminal ends, and the communication with the selected portable terminal is switched from the second connection format to the first connection format.

4. A computer readable medium having a program as claimed in claim 3, wherein said specified order of priority is an order of receiving the first connection request from the portable terminal.

* * * * *